United States Patent [19]

Fujii et al.

[11] Patent Number: 5,465,371

[45] Date of Patent: Nov. 7, 1995

[54] SORTER FOR SORTING DATA BASED ON A PLURALITY OF REFERENCE VALUE DATA

[75] Inventors: Tatsuya Fujii, Nishinomoya; Naoto Shiraishi, Minoo, both of Japan

[73] Assignee: Ricoh Company Ltd., Tokyo, Japan

[21] Appl. No.: 978,925

[22] Filed: Nov. 18, 1992

Related U.S. Application Data

[63] Continuation-in-part of Ser. No. 827,635, Jan. 29, 1992, abandoned.

[30] Foreign Application Priority Data

| Jan. 29, 1991 | [JP] | Japan | 3-029305 |
| Nov. 11, 1991 | [JP] | Japan | 3-323851 |
| Jan. 25, 1992 | [JP] | Japan | 4-034158 |

[51] Int. Cl.$^6$ .................. G06F 7/06; G06F 7/16
[52] U.S. Cl. ................. 395/800; 395/600; 364/DIG. 2; 364/962.3; 364/222.9
[58] Field of Search ...................... 395/600, 800

[56] References Cited

U.S. PATENT DOCUMENTS

| 4,295,206 | 10/1981 | Cain et al. | 395/600 |
| 4,570,221 | 2/1986 | Martens | 395/425 |
| 4,679,139 | 7/1987 | Durbin | 395/425 |
| 4,809,158 | 2/1989 | McCauley | 395/600 |
| 4,977,536 | 12/1990 | Shimamura | 395/800 |
| 5,117,495 | 5/1992 | Liu | 395/600 |
| 5,175,857 | 12/1992 | Inoue | 395/800 |
| 5,179,699 | 1/1993 | Iyer et al. | 395/650 |
| 5,179,717 | 1/1993 | Sato et al. | 395/800 |
| 5,283,893 | 2/1994 | Penn | 395/600 |
| 5,369,762 | 11/1994 | Wolf | 395/600 |

OTHER PUBLICATIONS

Kruse; "Data Structure Program Design"; 1984 by Prentice–Hall, Inc; pp. 155–159, 164–188.
Cooper; "Oh! Pascal!"; 1985 by W. W. Norton & Company, Inc; pp. 527–533.
Dale et al; "Pascal Plus Data Structure"; D. C. Heath and Company pp. 194–199, 428–449.

Primary Examiner—Krisna Lim
Attorney, Agent, or Firm—Cooper & Dunham

[57] ABSTRACT

In a sorter, reference value data are divided into data of upper and lower digits. The reference value data of the upper digit are sorted by a high sorting processing circuit and are written to a distribution counting memory. A clipping controller judges whether the reference value data of the upper digit written to the distribution counting memory should be clipped or not. No reference value data of the lower digit are sorted with respect to the clipped reference value data of the upper digit. A low sorting processing circuit sorts the reference value data of the lower digit with respect to the unclipped reference value data of the upper digit. This sorter can perform sorting processing at a high speed by a simplified structure when three-dimensional clipping processing is performed. The sorter comprises a data number generator for generating a data number corresponding to each of the reference value data, reference value data memory regions for upper and lower digits, counting start and end regions for upper and lower digits, and pointer regions for upper and lower digits.

13 Claims, 63 Drawing Sheets

SMALL → Z DIRECTION LARGE

SMALL → Z-DIRECTION LARGE

SMALL → Z-DIRECTION LARGE

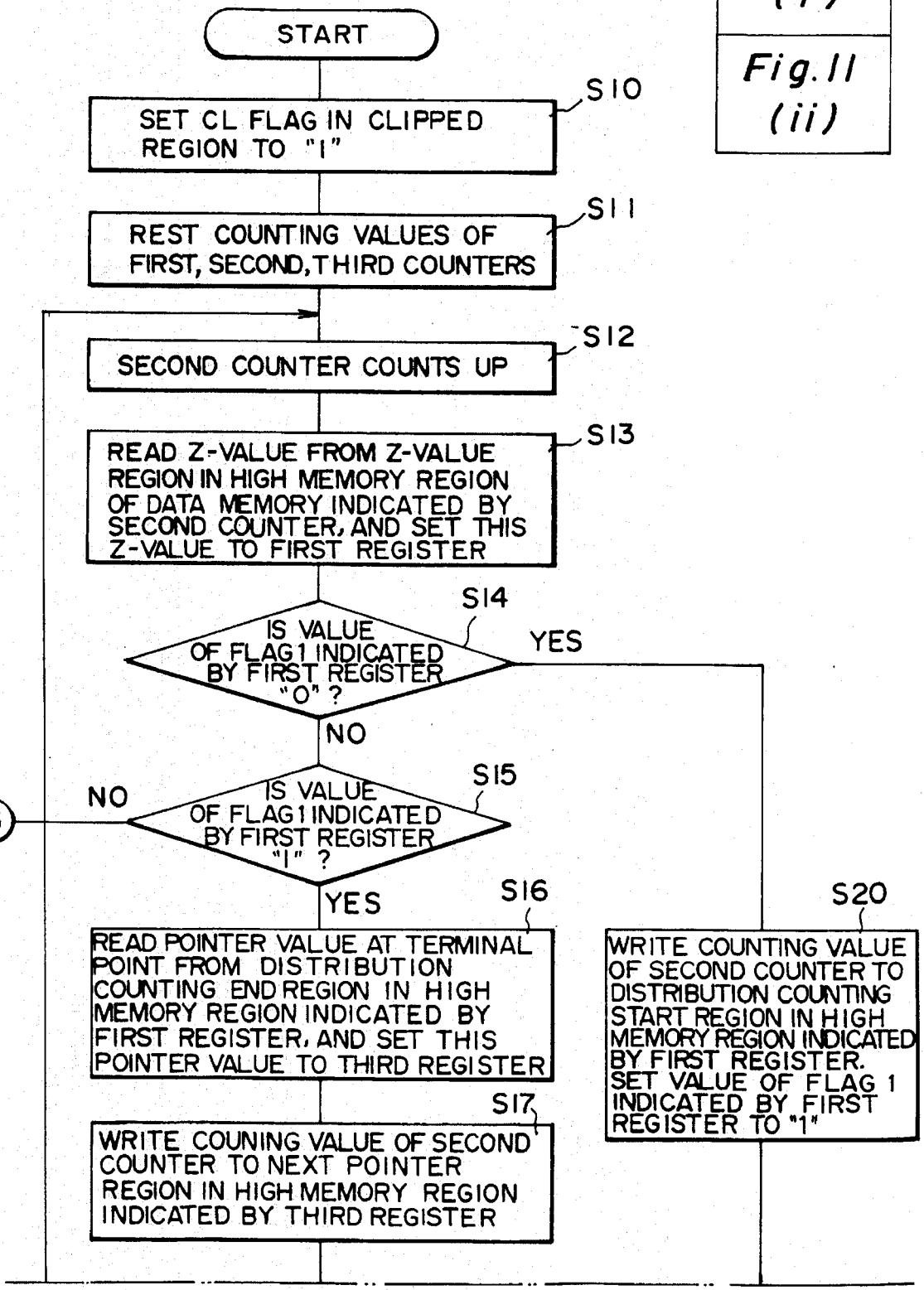

Fig. 11 (ii)
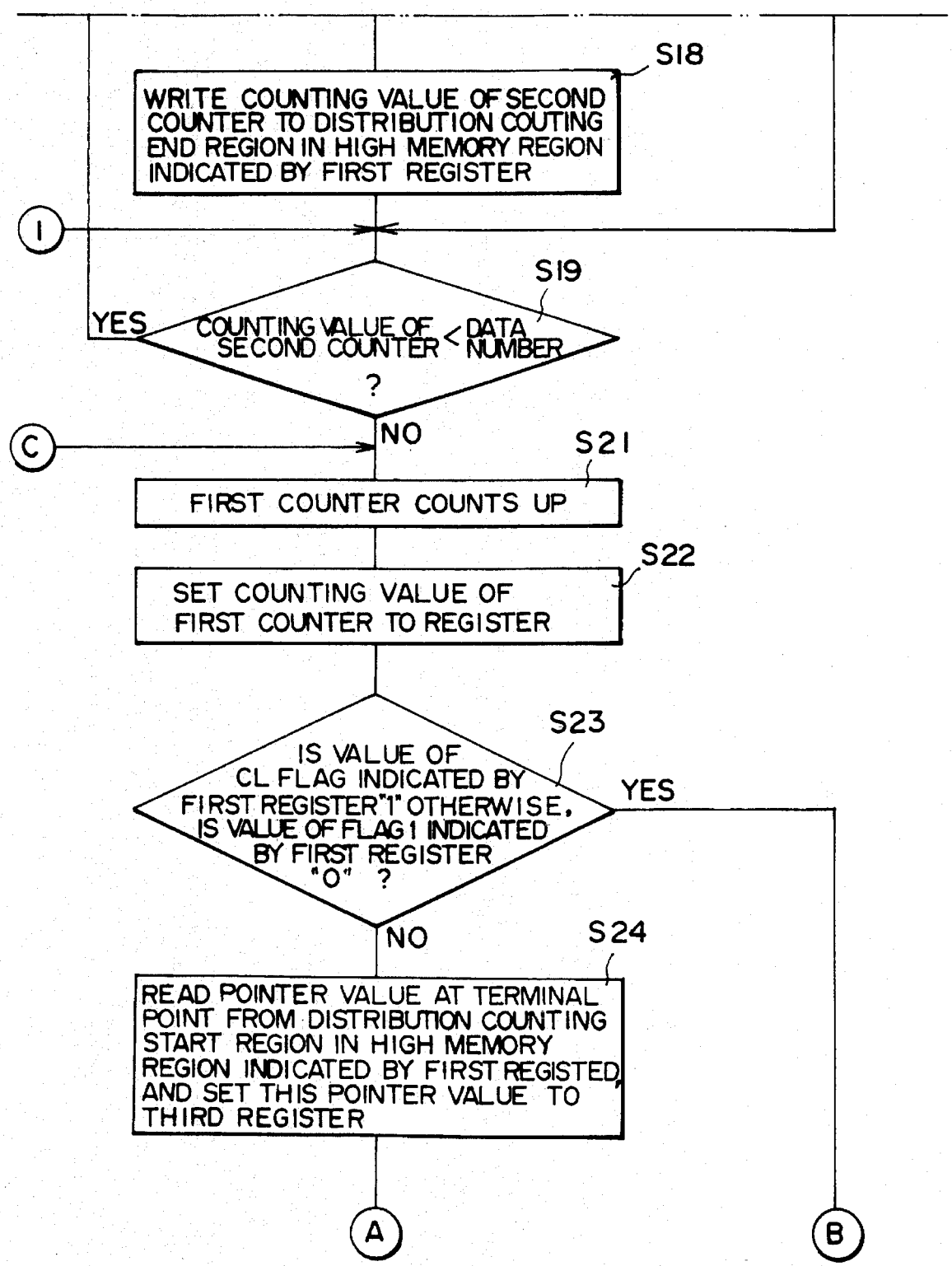

Z-VALUE DATA

Fig. 22

H REGION

| | Z-VALUE | NEXT POINTER | SORTING ADDRESS | | (DIST. COUNTING MEMORY) | DIST. COUNTING START | DIST. COUNTING END | FLAG 1L | FLAG 1H | | |
|---|---|---|---|---|---|---|---|---|---|---|---|
| ADDRESS | DATA H | H POINTER | H DATA | ADDRESS | DATA | DATA | DATA | DATA | | CNTX | |
| 1 | 1 | | | 0 | | | | | | | |
| 2 | 2 | | | 1 | 1 | | | 1 | 0 | | |
| 3 | 4 | | | 2 | | | | | | | |
| 4 | 5 | | | 3 | | | | | | | |
| 5 | 3 | | | 4 | | | | | | | |
| 6 | 0 | | | 5 | | | | | | | |
| 7 | 0 | | | 6 | | | | | | | |
| 8 | 1 | | | 7 | | | | | | | |
| 9 | 5 | | | 8 | | | | | | | |
| 10 | 6 | | | 9 | | | | | | | |
| 11 | 7 | | | 10 | | | | | | | |
| 12 | 9 | | | . | | | | | | | |
| 13 | 10 | | | . | | | | | | | |
| 14 | 1 | | | . | | | | | | | |
| 15 | 2 | | | | | | | | | | |
| 16 | 1 | | | 255 | | | | | | | |

L REGION

| | Z-VALUE | NEXT POINTER | SORTING ADDRESS | | (DIST. COUNTING MEMORY) | DIST. COUNTING START | DIST. COUNTING END | FLAG 2L | FLAG 2H | | |
|---|---|---|---|---|---|---|---|---|---|---|---|
| ADDRESS | DATA L | L POINTER | L DATA | ADDRESS | DATA | DATA | DATA | DATA | | CNTX2 | |
| 1 | 5 | | | 0 | | | | | | | |
| 2 | 6 | | | 1 | | | | | | | |
| 3 | 3 | | | 2 | | | | | | | |
| 4 | 1 | | | 3 | | | | | | | |
| 5 | 5 | | | 4 | | | | | | | |
| 6 | 4 | | | 5 | | | | | | | |
| 7 | 10 | | | 6 | | | | | | | |
| 8 | 2 | | | 7 | | | | | | | |
| 9 | 8 | | | 8 | | | | | | | |
| 10 | 5 | | | 9 | | | | | | | |
| 11 | 7 | | | 10 | | | | | | | |
| 12 | 1 | | | 11 | | | | | | | |
| 13 | 1 | | | . | | | | | | | |
| 14 | 2 | | | . | | | | | | | |
| 15 | 7 | | | . | | | | | | | |
| 16 | 5 | | | 255 | | | | | | | |

Fig. 23

H REGION

| | (DATA MEMORY) | (SORTING MEMORY) | | (DIST. COUNTING MEMORY) | | (DIST. COUNTING MEMORY) | | | |
|---|---|---|---|---|---|---|---|---|---|
| | Z-VALUE | NEXT POINTER | SORTING ADDRESS | DIST. COUNTING START | DIST. COUNTING END | FLAG 1L | FLAG 1H | | |
| ADDRESS | DATA H | H POINTER | H DATA | ADDRESS | DATA | DATA | DATA | DATA | CNTX |
| 1 | 1 | | | 0 | | | | | |
| 2 | 2 | | | 1 | 1 | | | 1 | 0 |
| 3 | 4 | | | 2 | | | | | |
| 4 | 5 | | | 3 | | | | | |
| 5 | 3 | | | 4 | | | | | |
| 6 | 0 | | | 5 | | | | | |
| 7 | 0 | | | 6 | | | | | |
| 8 | 1 | | | 7 | | | | | |
| 9 | 5 | | | 8 | | | | | |
| 10 | 6 | | | 9 | | | | | |
| 11 | 7 | | | 10 | | | | | |
| 12 | 9 | | | . | | | | | |
| 13 | 10 | | | . | | | | | |
| 14 | 1 | | | . | | | | | |
| 15 | 2 | | | . | | | | | |
| 16 | 1 | | | 255 | | | | | |

L REGION

| | (DATA MEMORY) | (SORTING MEMORY) | | (DIST. COUNTING MEMORY) | | (DIST. COUNTING MEMORY) | | | |
|---|---|---|---|---|---|---|---|---|---|
| | Z-VALUE | NEXT POINTER | SORTING ADDRESS | DIST. COUNTING START | DIST. COUNTING END | FLAG 2L | FLAG 2H | | |
| ADDRESS | DATA L | L POINTER | L DATA | ADDRESS | DATA | DATA | DATA | DATA | CNTX2 |
| 1 | 5 | | | 0 | | | | | |
| 2 | 6 | | | 1 | | | | | |
| 3 | 3 | | | 2 | | | | | |
| 4 | 1 | | | 3 | | | | | |
| 5 | 5 | | | 4 | | | | | |
| 6 | 4 | | | 5 | | | | | |
| 7 | 10 | | | 6 | | | | | |
| 8 | 2 | | | 7 | | | | | |
| 9 | 8 | | | 8 | | | | | |
| 10 | 5 | | | 9 | | | | | |
| 11 | 7 | | | 10 | | | | | |
| 12 | 1 | | | 11 | | | | | |
| 13 | 1 | | | . | | | | | |
| 14 | 2 | | | . | | | | | |
| 15 | 7 | | | . | | | | | |
| 16 | 5 | | | 255 | | | | | |

Fig. 24

H REGION

| | (DATA MEMORY) | (SORTING MEMORY) | | (DIST. COUNTING MEMORY) | | | |
|---|---|---|---|---|---|---|---|
| | Z-VALUE | NEXT POINTER | SORTING ADDRESS | DIST. COUNTING START | DIST. COUNTING END | FLAG 1L | FLAG 1H |
| ADDRESS | DATA H | H POINTER | H DATA | ADDRESS | DATA | DATA | DATA | DATA |
| 1 | 1 | | | 0 | | | | |
| 2 | 2 | | | 1 | 1 | 1 | 1 | 0 |
| 3 | 4 | | | 2 | 2 | 2 | 1 | 0 |
| 4 | 5 | | | 3 | | | | |
| 5 | 3 | | | 4 | | | | |
| 6 | 0 | | | 5 | | | | |
| 7 | 0 | | | 6 | | | | |
| 8 | 1 | | | 7 | | | | |
| 9 | 5 | | | 8 | | | | |
| 10 | 6 | | | 9 | | | | |
| 11 | 7 | | | 10 | | | | |
| 12 | 9 | | | . | | | | |
| 13 | 10 | | | . | | | | |
| 14 | 1 | | | . | | | | |
| 15 | 2 | | | . | | | | |
| 16 | 1 | | | 255 | | | | |

CNTX

L REGION

| | (DATA MEMORY) | (SORTING MEMORY) | | (DIST. COUNTING MEMORY) | | | |
|---|---|---|---|---|---|---|---|
| | Z-VALUE | NEXT POINTER | SORTING ADDRESS | DIST COUNTING START | DIST COUNTING END | FLAG 2L | FLAG 2H |
| ADDRESS | DATA L | L POINTER | L DATA | ADDRESS | DATA | DATA | DATA | DATA |
| 1 | 5 | | | 0 | | | | |
| 2 | 6 | | | 1 | | | | |
| 3 | 3 | | | 2 | | | | |
| 4 | 1 | | | 3 | | | | |
| 5 | 5 | | | 4 | | | | |
| 6 | 4 | | | 5 | | | | |
| 7 | 10 | | | 6 | | | | |
| 8 | 2 | | | 7 | | | | |
| 9 | 8 | | | 8 | | | | |
| 10 | 5 | | | 9 | | | | |
| 11 | 7 | | | 10 | | | | |
| 12 | 1 | | | 11 | | | | |
| 13 | 1 | | | . | | | | |
| 14 | 2 | | | . | | | | |
| 15 | 7 | | | . | | | | |
| 16 | 5 | | | 255 | | | | |

CNTX2

Fig. 25

H REGION

| (DATA MEMORY) | | | | (SORTING MEMORY) | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG IL | FLAG IH | |
| ADDRESS | DATA H | H POINTER | H DATA | ADDRESS | DATA | DATA | DATA | DATA | | CNTX |
| 1 | 1 | | | 0 | | | | | | |
| 2 | 2 | | | 1 | 1 | 1 | 1 | 0 | | |
| 3 | 4 | | | 2 | 2 | 2 | 1 | 0 | | |
| 4 | 5 | | | 3 | | | | | | |
| 5 | 3 | | | 4 | 3 | 3 | 1 | 0 | | |
| 6 | 0 | | | 5 | | | | | | |
| 7 | 0 | | | 6 | | | | | | |
| 8 | 1 | | | 7 | | | | | | |
| 9 | 5 | | | 8 | | | | | | |
| 10 | 6 | | | 9 | | | | | | |
| 11 | 7 | | | 10 | | | | | | |
| 12 | 9 | | | . | | | | | | |
| 13 | 10 | | | . | | | | | | |
| 14 | 1 | | | . | | | | | | |
| 15 | 2 | | | | | | | | | |
| 16 | 1 | | | 255 | | | | | | |

L REGION

| (DATA MEMORY) | | | | (SORTING MEMORY) | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H | |
| ADDRESS | DATA L | L POINTER | L DATA | ADDRESS | DATA | DATA | DATA | DATA | | CNTX2 |
| 1 | 5 | | | 0 | | | | | | |
| 2 | 6 | | | 1 | | | | | | |
| 3 | 3 | | | 2 | | | | | | |
| 4 | 1 | | | 3 | | | | | | |
| 5 | 5 | | | 4 | | | | | | |
| 6 | 4 | | | 5 | | | | | | |
| 7 | 10 | | | 6 | | | | | | |
| 8 | 2 | | | 7 | | | | | | |
| 9 | 8 | | | 8 | | | | | | |
| 10 | 5 | | | 9 | | | | | | |
| 11 | 7 | | | 10 | | | | | | |
| 12 | 1 | | | 11 | | | | | | |
| 13 | 1 | | | . | | | | | | |
| 14 | 2 | | | . | | | | | | |
| 15 | 7 | | | . | | | | | | |
| 16 | 5 | | | 255 | | | | | | |

Fig. 26

H REGION

| | (DATA MEMORY) | | (SORTING MEMORY) | | (DIST. COUNTING MEMORY) | | | | | |
|---|---|---|---|---|---|---|---|---|---|---|
| | Z-VALUE | NEXT POINTER | SORTING ADDRESS | | DIST. COUNTING START | DIST. COUNTING END | FLAG 1L | FLAG 1H | | |
| ADDRESS | DATA H | H POINTER | H DATA | ADDRESS | DATA | DATA | DATA | DATA | CNTX | |
| 1 | 1 | | | 0 | | | | | | |
| 2 | 2 | | | 1 | 1 | 1 | 1 | 0 | | |
| 3 | 4 | | | 2 | 2 | 2 | 1 | 0 | | |
| 4 | 5 | | | 3 | | | | | | |
| 5 | 3 | | | 4 | 3 | 3 | 1 | 0 | | |
| 6 | 0 | | | 5 | 4 | 4 | 1 | 0 | | |
| 7 | 0 | | | 6 | | | | | | |
| 8 | 1 | | | 7 | | | | | | |
| 9 | 5 | | | 8 | | | | | | |
| 10 | 6 | | | 9 | | | | | | |
| 11 | 7 | | | 10 | | | | | | |
| 12 | 9 | | | ... | | | | | | |
| 13 | 10 | | | | | | | | | |
| 14 | 1 | | | | | | | | | |
| 15 | 2 | | | | | | | | | |
| 16 | 1 | | | 255 | | | | | | |

L REGION

| | (DATA MEMORY) | | (SORTING MEMORY) | | (DIST. COUNTING MEMORY) | | | | | |
|---|---|---|---|---|---|---|---|---|---|---|
| | Z-VALUE | NEXT POINTER | SORTING ADDRESS | | DIST COUNTING START | DIST COUNTING END | FLAG 2L | FLAG 2H | | |
| ADDRESS | DATA L | L POINTER | L DATA | ADDRESS | DATA | DATA | DATA | DATA | CNTX2 | |
| 1 | 5 | | | 0 | | | | | | |
| 2 | 6 | | | 1 | | | | | | |
| 3 | 3 | | | 2 | | | | | | |
| 4 | 1 | | | 3 | | | | | | |
| 5 | 5 | | | 4 | | | | | | |
| 6 | 4 | | | 5 | | | | | | |
| 7 | 10 | | | 6 | | | | | | |
| 8 | 2 | | | 7 | | | | | | |
| 9 | 8 | | | 8 | | | | | | |
| 10 | 5 | | | 9 | | | | | | |
| 11 | 7 | | | 10 | | | | | | |
| 12 | 1 | | | 11 | | | | | | |
| 13 | 1 | | | ... | | | | | | |
| 14 | 2 | | | | | | | | | |
| 15 | 7 | | | | | | | | | |
| 16 | 5 | | | 255 | | | | | | |

Fig.27

H REGION (DATA MEMORY) (SORTING MEMORY)　　　　(DIST. COUNTING MEMORY)

| | Z-VALUE | NEXT POINTER | SORTING ADDRESS | | | DIST. COUNTING START | DIST. COUNTING END | FLAG 1L | FLAG 1H | | |
|---|---|---|---|---|---|---|---|---|---|---|---|
| ADDRESS | DATA H | H POINTER | H DATA | ADDRESS | DATA | DATA | DATA | DATA | | CNTX | |
| 1 | 1 | | | 0 | | | | | | | |
| 2 | 2 | | | 1 | 1 | 1 | 1 | 0 | | | |
| 3 | 4 | | | 2 | 2 | 2 | 1 | 0 | | | |
| 4 | 5 | | | 3 | 5 | 5 | 1 | 0 | | | |
| 5 | 3 | | | 4 | 3 | 3 | 1 | 0 | | | |
| 6 | 0 | | | 5 | 4 | 4 | 1 | 0 | | | |
| 7 | 0 | | | 6 | | | | | | | |
| 8 | 1 | | | 7 | | | | | | | |
| 9 | 5 | | | 8 | | | | | | | |
| 10 | 6 | | | 9 | | | | | | | |
| 11 | 7 | | | 10 | | | | | | | |
| 12 | 9 | | | ⋮ | ⋮ | ⋮ | ⋮ | ⋮ | | | |
| 13 | 10 | | | | | | | | | | |
| 14 | 1 | | | | | | | | | | |
| 15 | 2 | | | | | | | | | | |
| 16 | 1 | | | 255 | | | | | | | |

L REGION (DATA MEMORY) (SORTING MEMORY)　　　　(DIST. COUNTING MEMORY)

| | Z-VALUE | NEXT POINTER | SORTING ADDRESS | | | DIST. COUNTING START | DIST. COUNTING END | FLAG 2L | FLAG 2H | | |
|---|---|---|---|---|---|---|---|---|---|---|---|
| ADDRESS | DATA L | L POINTER | L DATA | ADDRESS | DATA | DATA | DATA | DATA | | CNTX2 | |
| 1 | 5 | | | 0 | | | | | | | |
| 2 | 6 | | | 1 | | | | | | | |
| 3 | 3 | | | 2 | | | | | | | |
| 4 | 1 | | | 3 | | | | | | | |
| 5 | 5 | | | 4 | | | | | | | |
| 6 | 4 | | | 5 | | | | | | | |
| 7 | 10 | | | 6 | | | | | | | |
| 8 | 2 | | | 7 | | | | | | | |
| 9 | 8 | | | 8 | | | | | | | |
| 10 | 5 | | | 9 | | | | | | | |
| 11 | 7 | | | 10 | | | | | | | |
| 12 | 1 | | | 11 | | | | | | | |
| 13 | 1 | | | ⋮ | ⋮ | ⋮ | ⋮ | ⋮ | | | |
| 14 | 2 | | | | | | | | | | |
| 15 | 7 | | | | | | | | | | |
| 16 | 5 | | | 255 | | | | | | | |

Fig. 28

H REGION

| (DATA MEMORY) | | (SORTING MEMORY) | | (DIST. COUNTING MEMORY) | | | |
|---|---|---|---|---|---|---|---|
| | Z-VALUE | NEXT POINTER | SORTING ADDRESS | | DIST. COUNTING START | DIST. COUNTING END | FLAG 1L | FLAG 1H |
| ADDRESS | DATA H | H POINTER | H DATA | ADDRESS | DATA | DATA | DATA | DATA |
| 1 | 1 | | | 0 | 6 | 6 | 1 | 0 |
| 2 | 2 | | | 1 | 1 | 1 | 1 | 0 |
| 3 | 4 | | | 2 | 2 | 2 | 1 | 0 |
| 4 | 5 | | | 3 | 5 | 5 | 1 | 0 |
| 5 | 3 | | | 4 | 3 | 3 | 1 | 0 |
| 6 | 0 | | | 5 | 4 | 4 | 1 | 0 |
| 7 | 0 | | | 6 | | | | |
| 8 | 1 | | | 7 | | | | |
| 9 | 5 | | | 8 | | | | |
| 10 | 6 | | | 9 | | | | |
| 11 | 7 | | | 10 | | | | |
| 12 | 9 | | | ⋮ | ⋮ | ⋮ | ⋮ | ⋮ |
| 13 | 10 | | | | | | | |
| 14 | 1 | | | | | | | |
| 15 | 2 | | | | | | | |
| 16 | 1 | | | 255 | | | | |

CNTX: [ ]

L REGION

| (DATA MEMORY) | | (SORTING MEMORY) | | (DIST. COUNTING MEMORY) | | | |
|---|---|---|---|---|---|---|---|
| | Z-VALUE | NEXT POINTER | SORTING ADDRESS | | DIST. COUNTING START | DIST. COUNTING END | FLAG 2L | FLAG 2H |
| ADDRESS | DATA L | L POINTER | L DATA | ADDRESS | DATA | DATA | DATA | DATA |
| 1 | 5 | | | 0 | | | | |
| 2 | 6 | | | 1 | | | | |
| 3 | 3 | | | 2 | | | | |
| 4 | 1 | | | 3 | | | | |
| 5 | 5 | | | 4 | | | | |
| 6 | 4 | | | 5 | | | | |
| 7 | 10 | | | 6 | | | | |
| 8 | 2 | | | 7 | | | | |
| 9 | 8 | | | 8 | | | | |
| 10 | 5 | | | 9 | | | | |
| 11 | 7 | | | 10 | | | | |
| 12 | 1 | | | 11 | | | | |
| 13 | 1 | | | ⋮ | ⋮ | ⋮ | ⋮ | ⋮ |
| 14 | 2 | | | | | | | |
| 15 | 7 | | | | | | | |
| 16 | 5 | | | 255 | | | | |

CNTX2: [ ]

Fig. 29

H REGION

| (DATA MEMORY) | | (SORTING MEMORY) | | (DIST. COUNTING MEMORY) | | | | |
|---|---|---|---|---|---|---|---|---|
| | Z-VALUE | NEXT POINTER | SORTING ADDRESS | | | DIST. COUNTING START | DIST. COUNTING END | FLAG IL | FLAG IH |
| ADDRESS | DATA H | H POINTER | H DATA | ADDRESS | DATA | DATA | DATA | DATA |
| 1 | 1 | | | 0 | 6 | 7 | 1 | 1 |
| 2 | 2 | | | 1 | 1 | 1 | 1 | 0 |
| 3 | 4 | | | 2 | 2 | 2 | 1 | 0 |
| 4 | 5 | | | 3 | 5 | 5 | 1 | 0 |
| 5 | 3 | | | 4 | 3 | 3 | 1 | 0 |
| 6 | 0 | 7 | | 5 | 4 | 4 | 1 | 0 |
| 7 | 0 | | | 6 | | | | |
| 8 | 1 | | | 7 | | | | |
| 9 | 5 | | | 8 | | | | |
| 10 | 6 | | | 9 | | | | |
| 11 | 7 | | | 10 | | | | |
| 12 | 9 | | | ... | | | | |
| 13 | 10 | | | | | | | |
| 14 | 1 | | | | | | | |
| 15 | 2 | | | | | | | |
| 16 | 1 | | | 255 | | | | |

CNTX

L REGION

| (DATA MEMORY) | | (SORTING MEMORY) | | (DIST. COUNTING MEMORY) | | | | |
|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATA L | L POINTER | L DATA | ADDRESS | DATA | DATA | DATA | DATA |
| 1 | 5 | | | 0 | | | | |
| 2 | 6 | | | 1 | | | | |
| 3 | 3 | | | 2 | | | | |
| 4 | 1 | | | 3 | | | | |
| 5 | 5 | | | 4 | | | | |
| 6 | 4 | | | 5 | | | | |
| 7 | 10 | | | 6 | | | | |
| 8 | 2 | | | 7 | | | | |
| 9 | 8 | | | 8 | | | | |
| 10 | 5 | | | 9 | | | | |
| 11 | 7 | | | 10 | | | | |
| 12 | 1 | | | 11 | | | | |
| 13 | 1 | | | ... | | | | |
| 14 | 2 | | | | | | | |
| 15 | 7 | | | | | | | |
| 16 | 5 | | | 255 | | | | |

CNTX2

Fig. 30

H REGION

| (DATA MEMORY) | | | (SORTING MEMORY) | | (DIST. COUNTING MEMORY) | | | | | |
|---|---|---|---|---|---|---|---|---|---|---|
| | Z-VALUE | NEXT POINTER | SORTING ADDRESS | | | DIST. COUNTING START | DIST. COUNTING END | FLAG IL | FLAG IH | |
| ADDRESS | DATA H | H POINTER | H DATA | ADDRESS | DATA | DATA | DATA | DATA | | CNTX |
| 1 | 1 | 8 | | 0 | 6 | 7 | 1 | 1 | | |
| 2 | 2 | | | 1 | 1 | 8 | 1 | 1 | | |
| 3 | 4 | | | 2 | 2 | 2 | 1 | 0 | | |
| 4 | 5 | | | 3 | 5 | 5 | 1 | 0 | | |
| 5 | 3 | | | 4 | 3 | 3 | 1 | 0 | | |
| 6 | 0 | 7 | | 5 | 4 | 4 | 1 | 0 | | |
| 7 | 0 | | | 6 | | | | | | |
| 8 | 1 | | | 7 | | | | | | |
| 9 | 5 | | | 8 | | | | | | |
| 10 | 6 | | | 9 | | | | | | |
| 11 | 7 | | | 10 | | | | | | |
| 12 | 9 | | | ... | | | | | | |
| 13 | 10 | | | | | | | | | |
| 14 | 1 | | | | | | | | | |
| 15 | 2 | | | | | | | | | |
| 16 | 1 | | | 255 | | | | | | |

L REGION

| (DATA MEMORY) | | | (SORTING MEMORY) | | (DIST. COUNTING MEMORY) | | | | | |
|---|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H | |
| ADDRESS | DATA L | L POINTER | L DATA | ADDRESS | DATA | DATA | DATA | DATA | | CNTX2 |
| 1 | 5 | | | 0 | | | | | | |
| 2 | 6 | | | 1 | | | | | | |
| 3 | 3 | | | 2 | | | | | | |
| 4 | 1 | | | 3 | | | | | | |
| 5 | 5 | | | 4 | | | | | | |
| 6 | 4 | | | 5 | | | | | | |
| 7 | 10 | | | 6 | | | | | | |
| 8 | 2 | | | 7 | | | | | | |
| 9 | 8 | | | 8 | | | | | | |
| 10 | 5 | | | 9 | | | | | | |
| 11 | 7 | | | 10 | | | | | | |
| 12 | 1 | | | 11 | | | | | | |
| 13 | 1 | | | ... | | | | | | |
| 14 | 2 | | | | | | | | | |
| 15 | 7 | | | | | | | | | |
| 16 | 5 | | | 255 | | | | | | |

Fig. 31

H REGION

| | (DATA.MEMORY) | | (SORTING MEMORY) | | | (DIST.COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATA H | H POINTER | H DATA | ADDRESS | DATA | DATA | DATA | DATA | |
| 1 | 1 | 8 | | 0 | 6 | 7 | 1 | 1 | |
| 2 | 2 | | | 1 | 1 | 8 | 1 | 1 | |
| 3 | 4 | | | 2 | 2 | 2 | 1 | 0 | |
| 4 | 5 | 9 | | 3 | 5 | 5 | 1 | 0 | |
| 5 | 3 | | | 4 | 3 | 3 | 1 | 0 | |
| 6 | 0 | 7 | | 5 | 4 | 9 | 1 | 1 | |
| 7 | 0 | | | 6 | | | | | |
| 8 | 1 | | | 7 | | | | | |
| 9 | 5 | | | 8 | | | | | |
| 10 | 6 | | | 9 | | | | | |
| 11 | 7 | | | 10 | | | | | |
| 12 | 9 | | | ⋮ | | | | | |
| 13 | 10 | | | ⋮ | | | | | |
| 14 | 1 | | | ⋮ | | | | | |
| 15 | 2 | | | ⋮ | | | | | |
| 16 | 1 | | | 255 | | | | | |

CNTX

L REGION

| | (DATA MEMORY) | | (SORTING MEMORY) | | | (DIST.COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATA L | L POINTER | L DATA | ADDRESS | DATA | DATA | DATA | DATA | |
| 1 | 5 | | | 0 | | | | | |
| 2 | 6 | | | 1 | | | | | |
| 3 | 3 | | | 2 | | | | | |
| 4 | 1 | | | 3 | | | | | |
| 5 | 5 | | | 4 | | | | | |
| 6 | 4 | | | 5 | | | | | |
| 7 | 10 | | | 6 | | | | | |
| 8 | 2 | | | 7 | | | | | |
| 9 | 8 | | | 8 | | | | | |
| 10 | 5 | | | 9 | | | | | |
| 11 | 7 | | | 10 | | | | | |
| 12 | 1 | | | 11 | | | | | |
| 13 | 1 | | | ⋮ | | | | | |
| 14 | 2 | | | ⋮ | | | | | |
| 15 | 7 | | | ⋮ | | | | | |
| 16 | 5 | | | 255 | | | | | |

CNTX2

Fig. 32

H REGION

| (DATA MEMORY) | | (SORTING MEMORY) | | (DIST. COUNTING MEMORY) | | | | |
|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATA H | H POINTER | H DATA | ADDRESS | DATA | DATA | DATA | DATA |
| 1 | 1 | 8 | | 0 | 6 | 7 | 1 | 1 |
| 2 | 2 | | | 1 | 1 | 8 | 1 | 1 |
| 3 | 4 | | | 2 | 2 | 2 | 1 | 0 |
| 4 | 5 | 9 | | 3 | 5 | 5 | 1 | 0 |
| 5 | 3 | | | 4 | 3 | 3 | 1 | 0 |
| 6 | 0 | 7 | | 5 | 4 | 9 | 1 | 1 |
| 7 | 0 | | | 6 | 10 | 10 | 1 | 0 |
| 8 | 1 | | | 7 | | | | |
| 9 | 5 | | | 8 | | | | |
| 10 | 6 | | | 9 | | | | |
| 11 | 7 | | | 10 | | | | |
| 12 | 9 | | | . | | | | |
| 13 | 10 | | | . | | | | |
| 14 | 1 | | | . | | | | |
| 15 | 2 | | | | | | | |
| 16 | 1 | | | 255 | | | | |

CNTX [ ]

L REGION

| (DATA MEMORY) | | (SORTING MEMORY) | | (DIST. COUNTING MEMORY) | | | | |
|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATA L | L POINTER | L DATA | ADDRESS | DATA | DATA | DATA | DATA |
| 1 | 5 | | | 0 | | | | |
| 2 | 6 | | | 1 | | | | |
| 3 | 3 | | | 2 | | | | |
| 4 | 1 | | | 3 | | | | |
| 5 | 5 | | | 4 | | | | |
| 6 | 4 | | | 5 | | | | |
| 7 | 10 | | | 6 | | | | |
| 8 | 2 | | | 7 | | | | |
| 9 | 8 | | | 8 | | | | |
| 10 | 5 | | | 9 | | | | |
| 11 | 7 | | | 10 | | | | |
| 12 | 1 | | | 11 | | | | |
| 13 | 1 | | | . | | | | |
| 14 | 2 | | | . | | | | |
| 15 | 7 | | | . | | | | |
| 16 | 5 | | | 255 | | | | |

CNTX2 [ ]

Fig. 33

H REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATAH | H POINTER | H DATA | ADDRESS | DATA | DATA | DATA | DATA | |
| 1 | 1 | 8 | | 0 | 6 | 7 | 1 | 1 | |
| 2 | 2 | | | 1 | 1 | 8 | 1 | 1 | |
| 3 | 4 | | | 2 | 2 | 2 | 1 | 0 | |
| 4 | 5 | 9 | | 3 | 5 | 5 | 1 | 0 | |
| 5 | 3 | | | 4 | 3 | 3 | 1 | 0 | |
| 6 | 0 | 7 | | 5 | 4 | 9 | 1 | 1 | |
| 7 | 0 | | | 6 | 10 | 10 | 1 | 0 | |
| 8 | 1 | | | 7 | 11 | 11 | 1 | 0 | |
| 9 | 5 | | | 8 | | | | | |
| 10 | 6 | | | 9 | | | | | |
| 11 | 7 | | | 10 | | | | | |
| 12 | 9 | | | ⋮ | | | | | |
| 13 | 10 | | | | | | | | |
| 14 | 1 | | | | | | | | |
| 15 | 2 | | | | | | | | |
| 16 | 1 | | | 255 | | | | | |

CNTX

L REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATAL | L POINTER | L DATA | ADDRESS | DATA | DATA | DATA | DATA | |
| 1 | 5 | | | 0 | | | | | |
| 2 | 6 | | | 1 | | | | | |
| 3 | 3 | | | 2 | | | | | |
| 4 | 1 | | | 3 | | | | | |
| 5 | 5 | | | 4 | | | | | |
| 6 | 4 | | | 5 | | | | | |
| 7 | 10 | | | 6 | | | | | |
| 8 | 2 | | | 7 | | | | | |
| 9 | 8 | | | 8 | | | | | |
| 10 | 5 | | | 9 | | | | | |
| 11 | 7 | | | 10 | | | | | |
| 12 | 1 | | | 11 | | | | | |
| 13 | 1 | | | ⋮ | | | | | |
| 14 | 2 | | | | | | | | |
| 15 | 7 | | | | | | | | |
| 16 | 5 | | | 255 | | | | | |

CNTX2

Fig. 34

H REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 1L | FLAG 1H | | |
|---|---|---|---|---|---|---|---|---|---|---|---|
| ADDRESS | DATA H | H POINTER | H DATA | ADDRESS | DATA | DATA | DATA | DATA | | CNTX | |
| 1 | 1 | 8 | | 0 | 6 | 7 | 1 | 1 | | | |
| 2 | 2 | | | 1 | 1 | 8 | 1 | 1 | | | |
| 3 | 4 | | | 2 | 2 | 2 | 1 | 0 | | | |
| 4 | 5 | 9 | | 3 | 5 | 5 | 1 | 0 | | | |
| 5 | 3 | | | 4 | 3 | 3 | 1 | 0 | | | |
| 6 | 0 | 7 | | 5 | 4 | 9 | 1 | 1 | | | |
| 7 | 0 | | | 6 | 10 | 10 | 1 | 0 | | | |
| 8 | 1 | | | 7 | 11 | 11 | 1 | 0 | | | |
| 9 | 5 | | | 8 | | | | | | | |
| 10 | 6 | | | 9 | 12 | 12 | 1 | 0 | | | |
| 11 | 7 | | | 10 | | | | | | | |
| 12 | 9 | | | ... | | ... | | | | | |
| 13 | 10 | | | ... | | | | | | | |
| 14 | 1 | | | ... | | | | | | | |
| 15 | 2 | | | | | | | | | | |
| 16 | 1 | | | 255 | | | | | | | |

L REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 2L | FLAG 2H | | |
|---|---|---|---|---|---|---|---|---|---|---|---|
| ADDRESS | DATA L | L POINTER | L DATA | ADDRESS | DATA | DATA | DATA | DATA | | CNTX2 | |
| 1 | 5 | | | 0 | | | | | | | |
| 2 | 6 | | | 1 | | | | | | | |
| 3 | 3 | | | 2 | | | | | | | |
| 4 | 1 | | | 3 | | | | | | | |
| 5 | 5 | | | 4 | | | | | | | |
| 6 | 4 | | | 5 | | | | | | | |
| 7 | 10 | | | 6 | | | | | | | |
| 8 | 2 | | | 7 | | | | | | | |
| 9 | 8 | | | 8 | | | | | | | |
| 10 | 5 | | | 9 | | | | | | | |
| 11 | 7 | | | 10 | | | | | | | |
| 12 | 1 | | | 11 | | | | | | | |
| 13 | 1 | | | ... | | ... | | | | | |
| 14 | 2 | | | ... | | | | | | | |
| 15 | 7 | | | ... | | | | | | | |
| 16 | 5 | | | 255 | | | | | | | |

Fig. 35

H REGION

| | (DATA MEMORY) | | | (SORTING MEMORY) | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H | |
| ADDRESS | DATA H | H POINTER | H DATA | ADDRESS | DATA | DATA | DATA | DATA | CNTX | |
| 1 | 1 | 8 | | 0 | 6 | 7 | 1 | 1 | | |
| 2 | 2 | | | 1 | 1 | 8 | 1 | 1 | | |
| 3 | 4 | | | 2 | 2 | 2 | 1 | 0 | | |
| 4 | 5 | 9 | | 3 | 5 | 5 | 1 | 0 | | |
| 5 | 3 | | | 4 | 3 | 3 | 1 | 0 | | |
| 6 | 0 | 7 | | 5 | 4 | 9 | 1 | 1 | | |
| 7 | 0 | | | 6 | 10 | 10 | 1 | 0 | | |
| 8 | 1 | | | 7 | 11 | 11 | 1 | 0 | | |
| 9 | 5 | | | 8 | | | | | | |
| 10 | 6 | | | 9 | 12 | 12 | 1 | 0 | | |
| 11 | 7 | | | 10 | 13 | 13 | 1 | 0 | | |
| 12 | 9 | | | ⋮ | ⋮ | ⋮ | ⋮ | ⋮ | | |
| 13 | 10 | | | | | | | | | |
| 14 | 1 | | | | | | | | | |
| 15 | 2 | | | | | | | | | |
| 16 | 1 | | | 255 | | | | | | |

L REGION

| | (DATA MEMORY) | | | (SORTING MEMORY) | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H | |
| ADDRESS | DATA L | L POINTER | L DATA | ADDRESS | DATA | DATA | DATA | DATA | CNTX2 | |
| 1 | 5 | | | 0 | | | | | | |
| 2 | 6 | | | 1 | | | | | | |
| 3 | 3 | | | 2 | | | | | | |
| 4 | 1 | | | 3 | | | | | | |
| 5 | 5 | | | 4 | | | | | | |
| 6 | 4 | | | 5 | | | | | | |
| 7 | 10 | | | 6 | | | | | | |
| 8 | 2 | | | 7 | | | | | | |
| 9 | 8 | | | 8 | | | | | | |
| 10 | 5 | | | 9 | | | | | | |
| 11 | 7 | | | 10 | | | | | | |
| 12 | 1 | | | 11 | | | | | | |
| 13 | 1 | | | ⋮ | ⋮ | ⋮ | ⋮ | ⋮ | | |
| 14 | 2 | | | | | | | | | |
| 15 | 7 | | | | | | | | | |
| 16 | 5 | | | 255 | | | | | | |

Fig. 36

H REGION

| (DATA MEMORY) | | (SORTING MEMORY) | | (DIST. COUNTING MEMORY) | | | | |
|---|---|---|---|---|---|---|---|---|
| Z-VALUE | NEXT POINTER | SORTING ADDRESS | | | | DIST. COUNTING START | DIST. COUNTING END | FLAG IL | FLAG IH |
| ADDRESS | DATA H | H POINTER | H DATA | ADDRESS | DATA | DATA | DATA | DATA | CNTX |
| 1 | 1 | 8 | | 0 | 6 | 7 | 1 | 1 | |
| 2 | 2 | | | 1 | 1 | 14 | 1 | 1 | |
| 3 | 4 | | | 2 | 2 | 2 | 1 | 0 | |
| 4 | 5 | 9 | | 3 | 5 | 5 | 1 | 0 | |
| 5 | 3 | | | 4 | 3 | 3 | 1 | 0 | |
| 6 | 0 | | | 5 | 4 | 9 | 1 | 1 | |
| 7 | 0 | | | 6 | 10 | 10 | 1 | 0 | |
| 8 | 1 | 14 | | 7 | 11 | 11 | 1 | 0 | |
| 9 | 5 | | | 8 | | | | | |
| 10 | 6 | | | 9 | 12 | 12 | 1 | 0 | |
| 11 | 7 | | | 10 | 13 | 13 | 1 | 0 | |
| 12 | 9 | | | . | . | . | . | . | |
| 13 | 10 | | | . | . | . | . | . | |
| 14 | 1 | | | . | . | . | . | . | |
| 15 | 2 | | | | | | | | |
| 16 | 1 | | | 255 | | | | | |

L REGION

| (DATA MEMORY) | | (SORTING MEMORY) | | (DIST. COUNTING MEMORY) | | | | |
|---|---|---|---|---|---|---|---|---|
| Z-VALUE | NEXT POINTER | SORTING ADDRESS | | | | DIST. COUNTING START | DIST. COUNTING END | FLAG 2L | FLAG 2H |
| ADDRESS | DATA L | L POINTER | L DATA | ADDRESS | DATA | DATA | DATA | DATA | CNTX2 |
| 1 | 5 | | | 0 | | | | | |
| 2 | 6 | | | 1 | | | | | |
| 3 | 3 | | | 2 | | | | | |
| 4 | 1 | | | 3 | | | | | |
| 5 | 5 | | | 4 | | | | | |
| 6 | 4 | | | 5 | | | | | |
| 7 | 10 | | | 6 | | | | | |
| 8 | 2 | | | 7 | | | | | |
| 9 | 8 | | | 8 | | | | | |
| 10 | 5 | | | 9 | | | | | |
| 11 | 7 | | | 10 | | | | | |
| 12 | 1 | | | 11 | | | | | |
| 13 | 1 | | | . | . | . | . | . | |
| 14 | 2 | | | . | . | . | . | . | |
| 15 | 7 | | | . | . | . | . | . | |
| 16 | 5 | | | 255 | | | | | |

Fig. 37

H REGION (DATA MEMORY) (SORTING MEMORY) (DIST. COUNTING MEMORY)

| ADDRESS | Z-VALUE DATA H | NEXT POINTER H POINTER | SORTING ADDRESS H DATA | ADDRESS | DATA | DIST. COUNTING START DATA | DIST. COUNTING END DATA | FLAG 1L DATA | FLAG 1H DATA | CNTX |
|---|---|---|---|---|---|---|---|---|---|---|
| 1 | 1 | 8 | | 0 | 6 | 7 | 1 | 1 | | |
| 2 | 2 | 15 | | 1 | 1 | 14 | 1 | 1 | | |
| 3 | 4 | | | 2 | 2 | 15 | 1 | 1 | | |
| 4 | 5 | 9 | | 3 | 5 | 5 | 1 | 0 | | |
| 5 | 3 | | | 4 | 3 | 3 | 1 | 0 | | |
| 6 | 0 | 7 | | 5 | 4 | 9 | 1 | 1 | | |
| 7 | 0 | | | 6 | 10 | 10 | 1 | 0 | | |
| 8 | 1 | 14 | | 7 | 11 | 11 | 1 | 0 | | |
| 9 | 5 | | | 8 | | | | | | |
| 10 | 6 | | | 9 | 12 | 12 | 1 | 0 | | |
| 11 | 7 | | | 10 | 13 | 13 | 1 | 0 | | |
| 12 | 9 | | | . | . | . | . | . | | |
| 13 | 10 | | | . | . | . | . | . | | |
| 14 | 1 | | | . | . | . | . | . | | |
| 15 | 2 | | | . | | | | | | |
| 16 | 1 | | | 255 | | | | | | |

L REGION (DATA MEMORY) (SORTING MEMORY) (DIST. COUNTING MEMORY)

| ADDRESS | Z-VALUE DATA L | NEXT POINTER L POINTER | SORTING ADDRESS L DATA | ADDRESS | DATA | DIST. COUNTING START DATA | DIST. COUNTING END DATA | FLAG 2L DATA | FLAG 2H DATA | CNTX2 |
|---|---|---|---|---|---|---|---|---|---|---|
| 1 | 5 | | | 0 | | | | | | |
| 2 | 6 | | | 1 | | | | | | |
| 3 | 3 | | | 2 | | | | | | |
| 4 | 1 | | | 3 | | | | | | |
| 5 | 5 | | | 4 | | | | | | |
| 6 | 4 | | | 5 | | | | | | |
| 7 | 10 | | | 6 | | | | | | |
| 8 | 2 | | | 7 | | | | | | |
| 9 | 8 | | | 8 | | | | | | |
| 10 | 5 | | | 9 | | | | | | |
| 11 | 7 | | | 10 | | | | | | |
| 12 | 1 | | | 11 | | | | | | |
| 13 | 1 | | | . | | . | . | . | | |
| 14 | 2 | | | . | | . | . | . | | |
| 15 | 7 | | | . | | . | . | . | | |
| 16 | 5 | | | 255 | | | | | | |

Fig. 38

H REGION

| (DATA MEMORY) Z-VALUE | | (SORTING MEMORY) NEXT POINTER | SORTING ADDRESS | | (DIST. COUNTING MEMORY) DIST. COUNTING START | | DIST. COUNTING END | FLAG IL | FLAG IH | | |
|---|---|---|---|---|---|---|---|---|---|---|---|
| ADDRESS | DATA H | H POINTER | H DATA | ADDRESS | DATA | DATA | DATA | DATA | | CNTX | |
| 1 | 1 | 8 | | 0 | 6 | 7 | 1 | 1 | | | |
| 2 | 2 | 15 | | 1 | 1 | 16 | 1 | 1 | | | |
| 3 | 4 | | | 2 | 2 | 15 | 1 | 1 | | | |
| 4 | 5 | 9 | | 3 | 5 | 5 | 1 | 0 | | | |
| 5 | 3 | | | 4 | 3 | 3 | 1 | 0 | | | |
| 6 | 0 | 7 | | 5 | 4 | 9 | 1 | 1 | | | |
| 7 | 0 | | | 6 | 10 | 10 | 1 | 0 | | | |
| 8 | 1 | 14 | | 7 | 11 | 11 | 1 | 0 | | | |
| 9 | 5 | | | 8 | | | | | | | |
| 10 | 6 | | | 9 | 12 | 12 | 1 | 0 | | | |
| 11 | 7 | | | 10 | 13 | 13 | 1 | 0 | | | |
| 12 | 9 | | | . | . | . | . | . | | | |
| 13 | 10 | | | . | . | . | . | . | | | |
| 14 | 1 | 16 | | . | . | . | . | . | | | |
| 15 | 2 | | | . | . | . | . | . | | | |
| 16 | 1 | | | 255 | | | | | | | |

L REGION

| (DATA MEMORY) Z-VALUE | | (SORTING MEMORY) NEXT POINTER | SORTING ADDRESS | | (DIST. COUNTING MEMORY) DIST. COUNTING START | | DIST. COUNTING END | FLAG 2L | FLAG 2H | | |
|---|---|---|---|---|---|---|---|---|---|---|---|
| ADDRESS | DATA L | L POINTER | L DATA | ADDRESS | DATA | DATA | DATA | DATA | | CNTX2 | |
| 1 | 5 | | | 0 | | | | | | | |
| 2 | 6 | | | 1 | | | | | | | |
| 3 | 3 | | | 2 | | | | | | | |
| 4 | 1 | | | 3 | | | | | | | |
| 5 | 5 | | | 4 | | | | | | | |
| 6 | 4 | | | 5 | | | | | | | |
| 7 | 10 | | | 6 | | | | | | | |
| 8 | 2 | | | 7 | | | | | | | |
| 9 | 8 | | | 8 | | | | | | | |
| 10 | 5 | | | 9 | | | | | | | |
| 11 | 7 | | | 10 | | | | | | | |
| 12 | 1 | | | 11 | | | | | | | |
| 13 | 1 | | | . | . | . | . | . | | | |
| 14 | 2 | | | . | . | . | . | . | | | |
| 15 | 7 | | | . | . | . | . | . | | | |
| 16 | 5 | | | 255 | | | | | | | |

Fig. 39

H REGION (DATA MEMORY) (SORTING MEMORY) (DIST. COUNTING MEMORY)

| ADDRESS | Z-VALUE DATA H | NEXT POINTER H POINTER | SORTING ADDRESS H DATA | ADDRESS | DATA | DIST. COUNTING START DATA | DIST. COUNTING END DATA | FLAG 1L DATA | FLAG 1H DATA |
|---|---|---|---|---|---|---|---|---|---|
| 1 | 1 | 8 | 6 | 0 | 6 | 7 | 1 | 1 | |
| 2 | 2 | 15 | 7 | 1 | 1 | 16 | 1 | 1 | |
| 3 | 4 | | | 2 | 2 | 15 | 1 | 1 | |
| 4 | 5 | 9 | | 3 | 5 | 5 | 1 | 0 | |
| 5 | 3 | | | 4 | 3 | 3 | 1 | 0 | |
| 6 | 0 | 7 | | 5 | 4 | 9 | 1 | 1 | |
| 7 | 0 | | | 6 | 10 | 10 | 1 | 0 | |
| 8 | 1 | 14 | | 7 | 11 | 11 | 1 | 0 | |
| 9 | 5 | | | 8 | | | | | |
| 10 | 6 | | | 9 | 12 | 12 | 1 | 0 | |
| 11 | 7 | | | 10 | 13 | 13 | 1 | 0 | |
| 12 | 9 | | | . | . | . | . | . | |
| 13 | 10 | | | . | . | . | . | . | |
| 14 | 1 | 16 | | . | . | . | . | . | |
| 15 | 2 | | | | | | | | |
| 16 | 1 | | | 255 | | | | | |

CNTX | 2

L REGION (DATA MEMORY) (SORTING MEMORY) (DIST. COUNTING MEMORY)

| ADDRESS | Z-VALUE DATA L | NEXT POINTER L POINTER | SORTING ADDRESS L DATA | ADDRESS | DATA | DIST. COUNTING START DATA | DIST. COUNTING END DATA | FLAG 2L DATA | FLAG 2H DATA |
|---|---|---|---|---|---|---|---|---|---|
| 1 | 5 | | 6 | 0 | | | | | |
| 2 | 6 | | 7 | 1 | | | | | |
| 3 | 3 | | | 2 | | | | | |
| 4 | 1 | | | 3 | | | | | |
| 5 | 5 | | | 4 | 6 | 6 | 1 | 0 | |
| 6 | 4 | | | 5 | | | | | |
| 7 | 10 | | | 6 | | | | | |
| 8 | 2 | | | 7 | | | | | |
| 9 | 8 | | | 8 | | | | | |
| 10 | 5 | | | 9 | | | | | |
| 11 | 7 | | | 10 | 7 | 7 | 1 | 0 | |
| 12 | 1 | | | 11 | | | | | |
| 13 | 1 | | | . | . | . | . | . | |
| 14 | 2 | | | . | . | . | . | . | |
| 15 | 7 | | | . | . | . | . | . | |
| 16 | 5 | | | 255 | | | | | |

CNTX2 | 2

Fig. 40

H REGION (DATA MEMORY) (SORTING MEMORY) (DIST. COUNTING MEMORY)

| | Z-VALUE | NEXT POINTER | SORTING ADDRESS | | DIST. COUNTING START | DIST. COUNTING END | FLAG IL | FLAG IH |
|---|---|---|---|---|---|---|---|---|
| ADDRESS | DATAH | H POINTER | H DATA | ADDRESS | DATA | DATA | DATA | DATA |
| 1 | 1 | 8 | 1 | 0 | 6 | 7 | 1 | 1 |
| 2 | 2 | 15 | 8 | 1 | 1 | 16 | 1 | 1 |
| 3 | 4 | | 14 | 2 | 2 | 15 | 1 | 1 |
| 4 | 5 | 9 | 16 | 3 | 5 | 5 | 1 | 0 |
| 5 | 3 | | | 4 | 3 | 3 | 1 | 0 |
| 6 | 0 | 7 | | 5 | 4 | 9 | 1 | 1 |
| 7 | 0 | | | 6 | 10 | 10 | 1 | 0 |
| 8 | 1 | 14 | | 7 | 11 | 11 | 1 | 0 |
| 9 | 5 | | | 8 | | | | |
| 10 | 6 | | | 9 | 12 | 12 | 1 | 0 |
| 11 | 7 | | | 10 | 13 | 13 | 1 | 0 |
| 12 | 9 | | | ⋮ | ⋮ | ⋮ | ⋮ | ⋮ |
| 13 | 10 | | | | | | | |
| 14 | 1 | 16 | | | | | | |
| 15 | 2 | | | | | | | |
| 16 | 1 | | | 255 | | | | |

CNTX 4

L REGION (DATA MEMORY) (SORTING MEMORY) (DIST. COUNTING MEMORY)

| | Z-VALUE | NEXT POINTER | SORTING ADDRESS | | DIST COUNTING START | DIST COUNTING END | FLAG 2L | FLAG 2H |
|---|---|---|---|---|---|---|---|---|
| ADDRESS | DATAL | L POINTER | L DATA | ADDRESS | DATA | DATA | DATA | DATA |
| 1 | 5 | 16 | 6 | 0 | | | | |
| 2 | 6 | | 7 | 1 | | | | |
| 3 | 3 | | 8 | 2 | 8 | 14 | 1 | 1 |
| 4 | 1 | | 14 | 3 | | | | |
| 5 | 5 | | 1 | 4 | | | | |
| 6 | 4 | | 16 | 5 | 1 | 16 | 1 | 1 |
| 7 | 10 | | | 6 | | | | |
| 8 | 2 | 14 | | 7 | | | | |
| 9 | 8 | | | 8 | | | | |
| 10 | 5 | | | 9 | | | | |
| 11 | 7 | | | 10 | | | | |
| 12 | 1 | | | ⋮ | ⋮ | ⋮ | ⋮ | ⋮ |
| 13 | 1 | | | | | | | |
| 14 | 2 | | | | | | | |
| 15 | 7 | | | | | | | |
| 16 | 5 | | | 255 | | | | |

CNTX2 6

Fig. 41

H REGION

| | (DATA MEMORY) | | (SORTING MEMORY) | | (DIST. COUNTING MEMORY) | | | |
|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATA H | H POINTER | H DATA | ADDRESS | DATA | DATA | DATA | DATA |
| 1 | 1 | 8 | 2 | 0 | 6 | 7 | 1 | 1 |
| 2 | 2 | 15 | 15 | 1 | 1 | 16 | 1 | 1 |
| 3 | 4 | | | 2 | 2 | 15 | 1 | 1 |
| 4 | 5 | 9 | | 3 | 5 | 5 | 1 | 0 |
| 5 | 3 | | | 4 | 3 | 3 | 1 | 0 |
| 6 | 0 | 7 | | 5 | 4 | 9 | 1 | 1 |
| 7 | 0 | | | 6 | 10 | 10 | 1 | 0 |
| 8 | 1 | 14 | | 7 | 11 | 11 | 1 | 0 |
| 9 | 5 | | | 8 | | | | |
| 10 | 6 | | | 9 | 12 | 12 | 1 | 0 |
| 11 | 7 | | | 10 | 13 | 13 | 1 | 0 |
| 12 | 9 | | | . | . | . | . | . |
| 13 | 10 | | | . | . | . | . | . |
| 14 | 1 | 16 | | . | . | . | . | . |
| 15 | 2 | | | | | | | |
| 16 | 1 | | | 255 | | | | |

CNTX 1 | 2

L REGION

| | (DATA MEMORY) | | (SORTING MEMORY) | | (DIST. COUNTING MEMORY) | | | |
|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATA L | L POINTER | L DATA | ADDRESS | DATA | DATA | DATA | DATA |
| 1 | 5 | | 6 | 0 | | | | |
| 2 | 6 | | 7 | 1 | | | | |
| 3 | 3 | | 8 | 2 | | | | |
| 4 | 1 | | 14 | 3 | | | | |
| 5 | 5 | | 1 | 4 | | | | |
| 6 | 4 | | 16 | 5 | | | | |
| 7 | 10 | | 2 | 6 | 2 | 2 | 1 | 0 |
| 8 | 2 | | 15 | 7 | 15 | 15 | 1 | 0 |
| 9 | 8 | | | 8 | | | | |
| 10 | 5 | | | 9 | | | | |
| 11 | 7 | | | 10 | | | | |
| 12 | 1 | | | . | . | . | . | . |
| 13 | 1 | | | . | . | . | . | . |
| 14 | 2 | | | . | . | . | . | . |
| 15 | 7 | | | | | | | |
| 16 | 5 | | | 255 | | | | |

CNTX2 | 8

Fig. 42

H REGION

| (DATA MEMORY) | | | (SORTING MEMORY) | | (DIST. COUNTING MEMORY) | | | | |
|---|---|---|---|---|---|---|---|---|---|
| | Z-VALUE | NEXT POINTER | SORTING ADDRESS | | DIST. COUNTING START | DIST. COUNTING END | FLAG 1L | FLAG 1H | |
| ADDRESS | DATA H | H POINTER | H DATA | ADDRESS | DATA | DATA | DATA | DATA | CNTX  1 |
| 1 | 1 | 8 | 5 | 0 | 6 | 7 | 1 | 1 | |
| 2 | 2 | 15 | | 1 | 1 | 16 | 1 | 1 | |
| 3 | 4 | | | 2 | 2 | 15 | 1 | 1 | |
| 4 | 5 | 9 | | 3 | 5 | 5 | 1 | 0 | |
| 5 | 3 | | | 4 | 3 | 3 | 1 | 0 | |
| 6 | 0 | 7 | | 5 | 4 | 9 | 1 | 1 | |
| 7 | 0 | | | 6 | 10 | 10 | 1 | 0 | |
| 8 | 1 | 14 | | 7 | 11 | 11 | 1 | 0 | |
| 9 | 5 | | | 8 | | | | | |
| 10 | 6 | | | 9 | 12 | 12 | 1 | 0 | |
| 11 | 7 | | | 10 | 13 | 13 | 1 | 0 | |
| 12 | 9 | | | . | . | . | . | . | |
| 13 | 10 | | | . | . | . | . | . | |
| 14 | 1 | 16 | | . | . | . | . | . | |
| 15 | 2 | | | | | | | | |
| 16 | 1 | | | 255 | | | | | |

L REGION

| (DATA MEMORY) | | | (SORTING MEMORY) | | (DIST. COUNTING MEMORY) | | | | |
|---|---|---|---|---|---|---|---|---|---|
| | Z-VALUE | NEXT POINTER | SORTING ADDRESS | | DIST. COUNTING START | DIST. COUNTING END | FLAG 2L | FLAG 2H | |
| ADDRESS | DATA L | L POINTER | L DATA | ADDRESS | DATA | DATA | DATA | DATA | CNTX2  9 |
| 1 | 5 | 16 | 6 | 0 | | | | | |
| 2 | 6 | | 7 | 1 | | | | | |
| 3 | 3 | | 8 | 2 | | | | | |
| 4 | 1 | | 14 | 3 | | | | | |
| 5 | 5 | | 1 | 4 | | | | | |
| 6 | 4 | | 16 | 5 | 5 | 5 | 1 | 0 | |
| 7 | 10 | | 2 | 6 | | | | | |
| 8 | 2 | 14 | 15 | 7 | | | | | |
| 9 | 8 | | 5 | 8 | | | | | |
| 10 | 5 | | | 9 | | | | | |
| 11 | 7 | | | 10 | | | | | |
| 12 | 1 | | | . | . | . | . | . | |
| 13 | 1 | | | . | . | . | . | . | |
| 14 | 2 | | | . | . | . | . | . | |
| 15 | 7 | | | | | | | | |
| 16 | 5 | | | 255 | | | | | |

Fig. 43

H REGION

| | (DATA MEMORY) | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATA H | H POINTER | H DATA | ADDRESS | DATA | DATA | DATA | DATA | |
| 1 | 1 | 8 | 3 | 0 | 6 | 7 | 1 | 1 | |
| 2 | 2 | 15 | | 1 | 1 | 16 | 1 | 1 | |
| 3 | 4 | | | 2 | 2 | 15 | 1 | 1 | |
| 4 | 5 | 9 | | 3 | 5 | 5 | 1 | 0 | |
| 5 | 3 | | | 4 | 3 | 3 | 1 | 0 | |
| 6 | 0 | 7 | | 5 | 4 | 9 | 1 | 1 | |
| 7 | 0 | | | 6 | 10 | 10 | 1 | 0 | |
| 8 | 1 | 14 | | 7 | 11 | 11 | 1 | 0 | |
| 9 | 5 | | | 8 | | | | | |
| 10 | 6 | | | 9 | 12 | 12 | 1 | 0 | |
| 11 | 7 | | | 10 | 13 | 13 | 1 | 0 | |
| 12 | 9 | | | ⋮ | ⋮ | ⋮ | ⋮ | ⋮ | |
| 13 | 10 | | | | | | | | |
| 14 | 1 | 16 | | | | | | | |
| 15 | 2 | | | | | | | | |
| 16 | 1 | | | 255 | | | | | |

CNTX1 | 1

L REGION

| | (DATA MEMORY) | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATA L | L POINTER | L DATA | ADDRESS | DATE | DATA | DATA | DATA | |
| 1 | 5 | | 6 | 0 | | | | | |
| 2 | 6 | | 7 | 1 | | | | | |
| 3 | 3 | | 8 | 2 | | | | | |
| 4 | 1 | | 14 | 3 | 3 | 3 | 1 | 0 | |
| 5 | 5 | | 1 | 4 | | | | | |
| 6 | 4 | | 16 | 5 | | | | | |
| 7 | 10 | | 2 | 6 | | | | | |
| 8 | 2 | 14 | 15 | 7 | | | | | |
| 9 | 8 | | 5 | 8 | | | | | |
| 10 | 5 | | 3 | 9 | | | | | |
| 11 | 7 | | | 10 | | | | | |
| 12 | 1 | | | ⋮ | ⋮ | ⋮ | ⋮ | ⋮ | |
| 13 | 1 | | | | | | | | |
| 14 | 2 | | | | | | | | |
| 15 | 7 | | | | | | | | |
| 16 | 5 | | | 255 | | | | | |

CNTX2 | 10

Fig. 44

H REGION

| | (DATA MEMORY) | | (SORTING MEMORY) | | (DIST. COUNTING MEMORY) | | | |
|---|---|---|---|---|---|---|---|---|
| | Z-VALUE | NEXT POINTER | SORTING ADDRESS | DIST. COUNTING START | | DIST. COUNTING END | FLAG 1L | FLAG 1H |
| ADDRESS | DATA H | H POINTER | H DATA | ADDRESS | DATA | DATA | DATA | DATA |
| 1 | 1 | 8 | 4 | 0 | 6 | 7 | 1 | 1 |
| 2 | 2 | 15 | 9 | 1 | 1 | 16 | 1 | 1 |
| 3 | 4 | | | 2 | 2 | 15 | 1 | 1 |
| 4 | 5 | 9 | | 3 | 5 | 5 | 1 | 0 |
| 5 | 3 | | | 4 | 3 | 3 | 1 | 0 |
| 6 | 0 | 7 | | 5 | 4 | 9 | 1 | 1 |
| 7 | 0 | | | 6 | 10 | 10 | 1 | 0 |
| 8 | 1 | 14 | | 7 | 11 | 11 | 1 | 0 |
| 9 | 5 | | | 8 | | | | |
| 10 | 6 | | | 9 | 12 | 12 | 1 | 0 |
| 11 | 7 | | | 10 | 13 | 13 | 1 | 0 |
| 12 | 9 | | | . | . | . | . | . |
| 13 | 10 | | | . | . | . | . | . |
| 14 | 1 | 16 | | . | . | . | . | . |
| 15 | 2 | | | | | | | |
| 16 | 1 | | | 255 | | | | |

CNTX 2

L REGION

| | (DATA MEMORY) | | (SORTING MEMORY) | | (DIST. COUNTING MEMORY) | | | |
|---|---|---|---|---|---|---|---|---|
| | Z-VALUE | NEXT POINTER | SORTING ADDRESS | DIST. COUNTING START | | DIST. COUNTING END | FLAG 2L | FLAG 2H |
| ADDRESS | DATA L | L POINTER | L DATA | ADDRESS | DATA | DATA | DATA | DATA |
| 1 | 5 | | 6 | 0 | | | | |
| 2 | 6 | | 7 | 1 | 4 | 4 | 1 | 0 |
| 3 | 3 | | 8 | 2 | | | | |
| 4 | 1 | | 14 | 3 | | | | |
| 5 | 5 | | 1 | 4 | | | | |
| 6 | 4 | | 16 | 5 | | | | |
| 7 | 10 | | 2 | 6 | | | | |
| 8 | 2 | | 15 | 7 | | | | |
| 9 | 8 | | 5 | 8 | 9 | 9 | 1 | 0 |
| 10 | 5 | | 3 | 9 | | | | |
| 11 | 7 | | 4 | 10 | | | | |
| 12 | 1 | | 9 | . | . | . | . | . |
| 13 | 1 | | | . | . | . | . | . |
| 14 | 2 | | | . | . | . | . | . |
| 15 | 7 | | | | | | | |
| 16 | 5 | | | 255 | | | | |

CNTX2 12

Fig. 45

H REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 1L | FLAG 1H | | |
|---|---|---|---|---|---|---|---|---|---|---|---|
| ADDRESS | DATA H | H POINTER | H DATA | ADDRESS | DATA | DATA | DATA | DATA | | CNTX | 1 |
| 1 | 1 | 8 | 10 | 0 | 6 | 7 | 1 | 1 | | | |
| 2 | 2 | 15 | | 1 | 1 | 16 | 1 | 1 | | | |
| 3 | 4 | | | 2 | 2 | 15 | 1 | 1 | | | |
| 4 | 5 | 9 | | 3 | 5 | 5 | 1 | 0 | | | |
| 5 | 3 | | | 4 | 3 | 3 | 1 | 0 | | | |
| 6 | 0 | 7 | | 5 | 4 | 9 | 1 | 1 | | | |
| 7 | 0 | | | 6 | 10 | 10 | 1 | 0 | | | |
| 8 | 1 | 14 | | 7 | 11 | 11 | 1 | 0 | | | |
| 9 | 5 | | | 8 | | | | | | | |
| 10 | 6 | | | 9 | 12 | 12 | 1 | 0 | | | |
| 11 | 7 | | | 10 | 13 | 13 | 1 | 0 | | | |
| 12 | 9 | | | . | . | . | . | . | | | |
| 13 | 10 | | | . | . | . | . | . | | | |
| 14 | 1 | 16 | | . | . | . | . | . | | | |
| 15 | 2 | | | | | | | | | | |
| 16 | 1 | | | 255 | | | | | | | |

L REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 2L | FLAG 2H | | |
|---|---|---|---|---|---|---|---|---|---|---|---|
| ADDRESS | DATA L | L POINTER | L DATA | ADDRESS | DATA | DATA | DATA | DATA | | CNTX2 | 13 |
| 1 | 5 | | 6 | 0 | | | | | | | |
| 2 | 6 | | 7 | 1 | | | | | | | |
| 3 | 3 | | 8 | 2 | | | | | | | |
| 4 | 1 | | 14 | 3 | | | | | | | |
| 5 | 5 | | 1 | 4 | | | | | | | |
| 6 | 4 | | 16 | 5 | 10 | 10 | 1 | 0 | | | |
| 7 | 10 | | 2 | 6 | | | | | | | |
| 8 | 2 | | 15 | 7 | | | | | | | |
| 9 | 8 | | 5 | 8 | | | | | | | |
| 10 | 5 | | 3 | 9 | | | | | | | |
| 11 | 7 | | 4 | 10 | | | | | | | |
| 12 | 1 | | 9 | . | . | . | . | . | | | |
| 13 | 1 | | 10 | . | . | . | . | . | | | |
| 14 | 2 | | | . | . | . | . | . | | | |
| 15 | 7 | | | | | | | | | | |
| 16 | 5 | | | 255 | | | | | | | |

Fig. 46

H REGION

| | (DATA MEMORY) | | (SORTING MEMORY) | | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H | |
| ADDRESS | DATA H | H POINTER | H DATA | ADDRESS | DATA | DATA | DATA | DATA | | CNTX1 1 |
| 1 | 1 | 8 | 11 | 0 | 6 | 7 | 1 | 1 | | |
| 2 | 2 | 15 | | 1 | 1 | 16 | 1 | 1 | | |
| 3 | 4 | | | 2 | 2 | 15 | 1 | 1 | | |
| 4 | 5 | 9 | | 3 | 5 | 5 | 1 | 0 | | |
| 5 | 3 | | | 4 | 3 | 3 | 1 | 0 | | |
| 6 | 0 | 7 | | 5 | 4 | 9 | 1 | 1 | | |
| 7 | 0 | | | 6 | 10 | 10 | 1 | 0 | | |
| 8 | 1 | 14 | | 7 | 11 | 11 | 1 | 0 | | |
| 9 | 5 | | | 8 | | | | | | |
| 10 | 6 | | | 9 | 12 | 12 | 1 | 0 | | |
| 11 | 7 | | | 10 | 13 | 13 | 1 | 0 | | |
| 12 | 9 | | | ... | | | | | | |
| 13 | 10 | | | ... | | | | | | |
| 14 | 1 | 16 | | ... | | | | | | |
| 15 | 2 | | | | | | | | | |
| 16 | 1 | | | 255 | | | | | | |

L REGION

| | (DATA MEMORY) | | (SORTING MEMOY) | | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H | |
| ADDRESS | DATA L | L POINTER | L DATA | ADDRESS | DATA | DATA | DATA | DATA | | CNTX2 14 |
| 1 | 5 | | 6 | 0 | | | | | | |
| 2 | 6 | | 7 | 1 | | | | | | |
| 3 | 3 | | 8 | 2 | | | | | | |
| 4 | 1 | | 14 | 3 | | | | | | |
| 5 | 5 | | 1 | 4 | | | | | | |
| 6 | 4 | | 16 | 5 | | | | | | |
| 7 | 10 | | 2 | 6 | | | | | | |
| 8 | 2 | | 15 | 7 | 11 | 11 | 1 | 0 | | |
| 9 | 8 | | 5 | 8 | | | | | | |
| 10 | 5 | | 3 | 9 | | | | | | |
| 11 | 7 | | 4 | 10 | | | | | | |
| 12 | 1 | | 9 | ... | | | | | | |
| 13 | 1 | | 10 | ... | | | | | | |
| 14 | 2 | | 11 | ... | | | | | | |
| 15 | 7 | | | | | | | | | |
| 16 | 5 | | | 255 | | | | | | |

Fig. 47

H REGION (DATA MEMORY) (SORTING MEMORY)  (DIST. COUNTING MEMORY)

| ADDRESS | Z-VALUE DATA H | NEXT POINTER H POINTER | SORTING ADDRESS H DATA | ADDRESS | DIST. COUNTING START DATA | DIST. COUNTING END DATA | FLAG 1L DATA | FLAG 1H DATA |
|---|---|---|---|---|---|---|---|---|
| 1 | 1 | 8 | 12 | 0 | 6 | 7 | 1 | 1 |
| 2 | 2 | 15 |  | 1 | 1 | 16 | 1 | 1 |
| 3 | 4 |  |  | 2 | 2 | 15 | 1 | 1 |
| 4 | 5 | 9 |  | 3 | 5 | 5 | 1 | 0 |
| 5 | 3 |  |  | 4 | 3 | 3 | 1 | 0 |
| 6 | 0 | 7 |  | 5 | 4 | 9 | 1 | 1 |
| 7 | 0 |  |  | 6 | 10 | 10 | 1 | 0 |
| 8 | 1 | 14 |  | 7 | 11 | 11 | 1 | 0 |
| 9 | 5 |  |  | 8 |  |  |  |  |
| 10 | 6 |  |  | 9 | 12 | 12 | 1 | 0 |
| 11 | 7 |  |  | 10 | 13 | 13 | 1 | 0 |
| 12 | 9 |  |  | . | . | . | . | . |
| 13 | 10 |  |  | . | . | . | . | . |
| 14 | 1 | 16 |  | . | . | . | . | . |
| 15 | 2 |  |  |  |  |  |  |  |
| 16 | 1 |  |  | 255 |  |  |  |  |

CNTX1 = 1

L REGION (DATA MEMORY) (SORTING MEMORY)  (DIST. COUNTING MEMORY)

| ADDRESS | Z-VALUE DATA L | NEXT POINTER L POINTER | SORTING ADDRESS L DATA | ADDRESS | DIST. COUNTING START DATA | DIST. COUNTING END DATA | FLAG 2L DATA | FLAG 2H DATA |
|---|---|---|---|---|---|---|---|---|
| 1 | 5 |  | 6 | 0 |  |  |  |  |
| 2 | 6 |  | 7 | 1 | 12 | 12 | 1 | 0 |
| 3 | 3 |  | 8 | 2 |  |  |  |  |
| 4 | 1 |  | 14 | 3 |  |  |  |  |
| 5 | 5 |  | 1 | 4 |  |  |  |  |
| 6 | 4 |  | 16 | 5 |  |  |  |  |
| 7 | 10 |  | 2 | 6 |  |  |  |  |
| 8 | 2 |  | 15 | 7 |  |  |  |  |
| 9 | 8 |  | 5 | 8 |  |  |  |  |
| 10 | 5 |  | 3 | 9 |  |  |  |  |
| 11 | 7 |  | 4 | 10 |  |  |  |  |
| 12 | 1 |  | 9 | . | . | . | . | . |
| 13 | 1 |  | 10 | . | . | . | . | . |
| 14 | 2 |  | 11 | . | . | . | . | . |
| 15 | 7 |  | 12 |  |  |  |  |  |
| 16 | 5 |  |  | 255 |  |  |  |  |

CNTX2 = 15

Fig. 48

H REGION (DATA MEMORY) (SORTING MEMORY) (DIST. COUNTING MEMORY)

| ADDRESS | Z-VALUE DATA H | NEXT POINTER H POINTER | SORTING ADDRESS H DATA | | ADDRESS | DIST. COUNTING START DATA | DIST. COUNTING END DATA | FLAG 1L DATA | FLAG 1H DATA |
|---|---|---|---|---|---|---|---|---|---|
| 1 | 1 | 8 | 13 | | 0 | 6 | 7 | 1 | 1 |
| 2 | 2 | 15 | | | 1 | 1 | 16 | 1 | 1 |
| 3 | 4 | | | | 2 | 2 | 15 | 1 | 1 |
| 4 | 5 | 9 | | | 3 | 5 | 5 | 1 | 0 |
| 5 | 3 | | | | 4 | 3 | 3 | 1 | 0 |
| 6 | 0 | 7 | | | 5 | 4 | 9 | 1 | 1 |
| 7 | 0 | | | | 6 | 10 | 10 | 1 | 0 |
| 8 | 1 | 14 | | | 7 | 11 | 11 | 1 | 0 |
| 9 | 5 | | | | 8 | | | | |
| 10 | 6 | | | | 9 | 12 | 12 | 1 | 0 |
| 11 | 7 | | | | 10 | 13 | 13 | 1 | 0 |
| 12 | 9 | | | | . | . | . | . | . |
| 13 | 10 | | | | . | . | . | . | . |
| 14 | 1 | 16 | | | . | . | . | . | . |
| 15 | 2 | | | | | | | | |
| 16 | 1 | | | | 255 | | | | |

CNTX1 | 1

L REGION (DATA MEMORY) (SORTING MEMORY) (DIST. COUNTING MEMORY)

| ADDRESS | Z-VALUE DATA L | NEXT POINTER L POINTER | SORTING ADDRESS L DATA | | ADDRESS | DIST. COUNTING START DATA | DIST. COUNTING END DATA | FLAG 2L DATA | FLAG 2H DATA |
|---|---|---|---|---|---|---|---|---|---|
| 1 | 5 | | 6 | | 0 | | | | |
| 2 | 6 | | 7 | | 1 | 13 | 13 | 1 | 0 |
| 3 | 3 | | 8 | | 2 | | | | |
| 4 | 1 | | 14 | | 3 | | | | |
| 5 | 5 | | 1 | | 4 | | | | |
| 6 | 4 | | 16 | | 5 | | | | |
| 7 | 10 | | 2 | | 6 | | | | |
| 8 | 2 | | 15 | | 7 | | | | |
| 9 | 8 | | 5 | | 8 | | | | |
| 10 | 5 | | 3 | | 9 | | | | |
| 11 | 7 | | 4 | | 10 | | | | |
| 12 | 1 | | 9 | | . | . | . | . | . |
| 13 | 1 | | 10 | | . | . | . | . | . |
| 14 | 2 | | 11 | | . | . | . | . | . |
| 15 | 7 | | 12 | | | | | | |
| 16 | 5 | | 13 | | 255 | | | | |

CNTX2 | 16

Fig. 49

H REGION (DATA MEMORY) (SORTING MEMORY) (DIST. COUNTING MEMORY)

| | Z-VALUE | NEXT POINTER | SORTING ADDRESS | | DIST. COUNTING START | DIST. COUNTING END | FLAG IL | FLAG IH | | |
|---|---|---|---|---|---|---|---|---|---|---|
| ADDRESS | DATA H | H POINTER | H DATA | ADDRESS | DATA | DATA | DATA | DATA | CNTX | |
| 1 | 1 | 8 | | 0 | 6 | 7 | 1 | 1 | | |
| 2 | 2 | 15 | | 1 | 1 | 16 | 1 | 1 | | |
| 3 | 4 | | | 2 | 2 | 15 | 1 | 1 | | |
| 4 | 5 | 9 | | 3 | 5 | | 1 | 0 | | |
| 5 | 6 | | | 4 | 3 | | 1 | 0 | | |
| 6 | 0 | 7 | | 5 | 4 | 9 | 1 | 1 | | |
| 7 | 0 | | | 6 | 10 | | 1 | 0 | | |
| 8 | 1 | 14 | | 7 | 11 | | 1 | 0 | | |
| 9 | 5 | | | 8 | | | | | | |
| 10 | 6 | | | 9 | 12 | | 1 | 0 | | |
| 11 | 7 | | | 10 | 13 | | 1 | 0 | | |
| 12 | 9 | | | . | . | . | . | . | | |
| 13 | 10 | | | . | . | . | . | . | | |
| 14 | 1 | 16 | | . | . | . | . | . | | |
| 15 | 2 | | | | | | | | | |
| 16 | 1 | | | 255 | | | | | | |

L REGION (DATA MEMORY) (SORTING MEMORY) (DIST. COUNTING MEMORY)

| | Z-VALUE | NEXT POINTER | SORTING ADDRESS | | DIST. COUNTING START | DIST. COUNTING END | FLAG 2L | FLAG 2H | | |
|---|---|---|---|---|---|---|---|---|---|---|
| ADDRESS | DATA L | L POINTER | L DATA | ADDRESS | DATA | DATA | DATA | DATA | CNTX2 | |
| 1 | 5 | | 5 | 0 | | | | | | |
| 2 | 6 | | 3 | 1 | | | | | | |
| 3 | 3 | | 4 | 2 | | | | | | |
| 4 | 1 | | 9 | 3 | | | | | | |
| 5 | 5 | | 10 | 4 | | | | | | |
| 6 | 4 | | 11 | 5 | | | | | | |
| 7 | 10 | | 12 | 6 | | | | | | |
| 8 | 2 | | 13 | 7 | | | | | | |
| 9 | 8 | | | 8 | | | | | | |
| 10 | 5 | | | 9 | | | | | | |
| 11 | 7 | | | 10 | | | | | | |
| 12 | 1 | | | . | | | | | | |
| 13 | 1 | | | . | | | | | | |
| 14 | 2 | | | . | | | | | | |
| 15 | 7 | | | | | | | | | |
| 16 | 5 | | | 255 | | | | | | |

| 0 | 1 | 2 | 3 | 4 | 5 | ... | 254 | 255 |
|---|---|---|---|---|---|---|---|---|
| 1 | 1 | 1 | 0 | 0 | 0 | | | |

Fig. 58

| | |
|---|---|
| HIGH MEMORY REGION | DISTRIBUTION COUNTING START REGION |
| | DISTRIBUTION COUNTING END REGION |
| MIDDLE MEMORY REGION | DISTRIBUTION COUNTING START REGION |
| | DISTRIBUTION COUNTING END REGION |
| LOW MEMORY REGION | DISTRIBUTION COUNTING START REGION |
| | DISTRIBUTION COUNTING END REGION |

Fig. 61

H REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATAH | H POINTER | H DATA | ADDRESS | DATA | DATA | DATA | DATA | CNTX |
| 1 | 1 | | | 0 | | | | | |
| 2 | 2 | | | 1 | 1 | 1 | 1 | 0 | |
| 3 | 4 | | | 2 | | | | | |
| 4 | 5 | | | 3 | | | | | |
| 5 | 3 | | | 4 | | | | | |
| 6 | 0 | | | 5 | | | | | |
| 7 | 0 | | | 6 | | | | | |
| 8 | 7 | | | 7 | | | | | |
| 9 | 9 | | | 8 | | | | | |
| 10 | 1 | | | 9 | | | | | |
| 11 | 2 | | | | | | | | |
| 12 | 1 | | | 31 | | | | | |

M REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 3L | FLAG 3H |
| ADDRESS | DATAM | M POINTER | M DATA | ADDRESS | DATA | DATA | DATA | DATA | CNTX2 |
| 1 | 1 | | | 0 | | | | | |
| 2 | 2 | | | 1 | | | | | |
| 3 | 3 | | | 2 | | | | | |
| 4 | 4 | | | 3 | | | | | |
| 5 | 6 | | | 4 | | | | | |
| 6 | 7 | | | 5 | | | | | |
| 7 | 8 | | | 6 | | | | | |
| 8 | 2 | | | 7 | | | | | |
| 9 | 3 | | | 8 | | | | | |
| 10 | 1 | | | 9 | | | | | |
| 11 | 5 | | | | | | | | |
| 12 | 6 | | | 31 | | | | | |

L REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATAL | L POINTER | L DATA | ADDRESS | DATA | DATA | DATA | DATA | CNTX3 |
| 1 | 5 | | | 0 | | | | | |
| 2 | 6 | | | 1 | | | | | |
| 3 | 3 | | | 2 | | | | | |
| 4 | 1 | | | 3 | | | | | |
| 5 | 5 | | | 4 | | | | | |
| 6 | 4 | | | 5 | | | | | |
| 7 | 5 | | | 6 | | | | | |
| 8 | 1 | | | 7 | | | | | |
| 9 | 1 | | | 8 | | | | | |
| 10 | 2 | | | 9 | | | | | |
| 11 | 7 | | | | | | | | |
| 12 | 5 | | | 63 | | | | | |

Fig. 62

H REGION (DATA MEMORY) (SORTING MEMORY) (DIST. COUNTING MEMORY)

| ADDRESS | Z-VALUE DATA H | NEXT POINTER H POINTER | SORTING ADDRESS H DATA | ADDRESS | DATA | DIST. COUNTING START DATA | DIST. COUNTING END DATA | FLAG 1L DATA | FLAG 1H DATA | CNTX |
|---|---|---|---|---|---|---|---|---|---|---|
| 1 | 1 | | | 0 | 6 | 7 | | | | |
| 2 | 2 | | | 1 | 1 | 1 | | | | |
| 3 | 4 | | | 2 | 2 | 2 | | | | |
| 4 | 5 | | | 3 | 5 | 5 | | | | |
| 5 | 3 | | | 4 | 3 | 3 | | | | |
| 6 | 0 | 7 | | 5 | | | | | | |
| 7 | 0 | | | 6 | | | | | | |
| 8 | 7 | | | 7 | | | | | | |
| 9 | 9 | | | 8 | | | | | | |
| 10 | 1 | | | 9 | | | | | | |
| 11 | 2 | | | | | | | | | |
| 12 | 1 | | | 31 | | | | | | |

M REGION (DATA MEMORY) (SORTING MEMORY) (DIST. COUNTING MEMORY)

| ADDRESS | Z-VALUE DATA M | NEXT POINTER M POINTER | SORTING ADDRESS M DATA | ADDRESS | DATA | DIST. COUNTING START DATA | DIST. COUNTING END DATA | FLAG 3L DATA | FLAG 3H DATA | CNTX2 |
|---|---|---|---|---|---|---|---|---|---|---|
| 1 | 1 | | | 0 | | | | | | |
| 2 | 2 | | | 1 | | | | | | |
| 3 | 3 | | | 2 | | | | | | |
| 4 | 4 | | | 3 | | | | | | |
| 5 | 6 | | | 4 | | | | | | |
| 6 | 7 | | | 5 | | | | | | |
| 7 | 8 | | | 6 | | | | | | |
| 8 | 2 | | | 7 | | | | | | |
| 9 | 3 | | | 8 | | | | | | |
| 10 | 1 | | | 9 | | | | | | |
| 11 | 5 | | | | | | | | | |
| 12 | 6 | | | 31 | | | | | | |

L REGION (DATA MEMORY) (SORTING MEMORY) (DIST. COUNTING MEMORY)

| ADDRESS | Z-VALUE DATA L | NEXT POINTER L POINTER | SORTING ADDRESS L DATA | ADDRESS | DATA | DIST. COUNTING START DATA | DIST. COUNTING END DATA | FLAG 2L DATA | FLAG 2H DATA | CNTX3 |
|---|---|---|---|---|---|---|---|---|---|---|
| 1 | 5 | | | 0 | | | | | | |
| 2 | 6 | | | 1 | | | | | | |
| 3 | 3 | | | 2 | | | | | | |
| 4 | 1 | | | 3 | | | | | | |
| 5 | 5 | | | 4 | | | | | | |
| 6 | 4 | | | 5 | | | | | | |
| 7 | 5 | | | 6 | | | | | | |
| 8 | 1 | | | 7 | | | | | | |
| 9 | 1 | | | 8 | | | | | | |
| 10 | 2 | | | 9 | | | | | | |
| 11 | 7 | | | | | | | | | |
| 12 | 5 | | | 63 | | | | | | |

Fig. 63

H REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 1L | FLAG 1H | | |
|---|---|---|---|---|---|---|---|---|---|---|---|
| ADDRESS | DATA H | H POINTER | H DATA | ADDRESS | DATA | DATA | DATA | DATA | | CNTX | |
| 1 | 1 | | | 0 | 6 | 7 | 1 | 1 | | | |
| 2 | 2 | | | 1 | 1 | 1 | 1 | 0 | | | |
| 3 | 4 | | | 2 | 2 | 2 | 1 | 0 | | | |
| 4 | 5 | | | 3 | 5 | 5 | 1 | 0 | | | |
| 5 | 3 | | | 4 | 3 | 3 | 1 | 0 | | | |
| 6 | 0 | 7 | | 5 | | | | | | | |
| 7 | 0 | | | 6 | | | | | | | |
| 8 | 7 | | | 7 | 8 | 8 | 1 | 0 | | | |
| 9 | 9 | | | 8 | | | | | | | |
| 10 | 1 | | | 9 | | | | | | | |
| 11 | 2 | | | | | | | | | | |
| 12 | 1 | | | 31 | | | | | | | |

M REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 3L | FLAG 3H | | |
|---|---|---|---|---|---|---|---|---|---|---|---|
| ADDRESS | DATA M | M POINTER | M DATA | ADDRESS | DATA | DATA | DATA | DATA | | CNTX2 | |
| 1 | 1 | | | 0 | | | | | | | |
| 2 | 2 | | | 1 | | | | | | | |
| 3 | 3 | | | 2 | | | | | | | |
| 4 | 4 | | | 3 | | | | | | | |
| 5 | 6 | | | 4 | | | | | | | |
| 6 | 7 | | | 5 | | | | | | | |
| 7 | 8 | | | 6 | | | | | | | |
| 8 | 2 | | | 7 | | | | | | | |
| 9 | 3 | | | 8 | | | | | | | |
| 10 | 1 | | | 9 | | | | | | | |
| 11 | 5 | | | | | | | | | | |
| 12 | 6 | | | 31 | | | | | | | |

L REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 2L | FLAG 2H | | |
|---|---|---|---|---|---|---|---|---|---|---|---|
| ADDRESS | DATA L | L POINTER | L DATA | ADDRESS | DATA | DATA | DATA | DATA | | CNTX3 | |
| 1 | 5 | | | 0 | | | | | | | |
| 2 | 6 | | | 1 | | | | | | | |
| 3 | 3 | | | 2 | | | | | | | |
| 4 | 1 | | | 3 | | | | | | | |
| 5 | 5 | | | 4 | | | | | | | |
| 6 | 4 | | | 5 | | | | | | | |
| 7 | 5 | | | 6 | | | | | | | |
| 8 | 1 | | | 7 | | | | | | | |
| 9 | 1 | | | 8 | | | | | | | |
| 10 | 2 | | | 9 | | | | | | | |
| 11 | 7 | | | | | | | | | | |
| 12 | 5 | | | 63 | | | | | | | |

Fig. 64

H REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATA H | H POINTER | H DATA | ADDRESS | DATA | DATA | DATA | DATA | CNTX |
| 1 | 1 | 10 | | 0 | 6 | 7 | 1 | 1 | |
| 2 | 2 | 11 | | 1 | 1 | 12 | 1 | 0 | |
| 3 | 4 | | | 2 | 2 | 11 | 1 | 0 | |
| 4 | 5 | | | 3 | 5 | 5 | 1 | 0 | |
| 5 | 3 | | | 4 | 3 | 3 | 1 | 0 | |
| 6 | 0 | 7 | | 5 | 4 | 4 | 1 | 0 | |
| 7 | 0 | | | 6 | | | | | |
| 8 | 7 | | | 7 | 8 | 8 | 1 | 0 | |
| 9 | 9 | | | 8 | | | | | |
| 10 | 1 | 12 | | 9 | 9 | 9 | 1 | 0 | |
| 11 | 2 | | | | | | | | |
| 12 | 1 | | | 31 | | | | | |

M REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 3L | FLAG 3H |
| ADDRESS | DATA M | M POINTER | M DATA | ADDRESS | DATA | DATA | DATA | DATA | CNTX2 |
| 1 | 1 | | | 0 | | | | | |
| 2 | 2 | | | 1 | | | | | |
| 3 | 3 | | | 2 | | | | | |
| 4 | 4 | | | 3 | | | | | |
| 5 | 6 | | | 4 | | | | | |
| 6 | 7 | | | 5 | | | | | |
| 7 | 8 | | | 6 | | | | | |
| 8 | 2 | | | 7 | | | | | |
| 9 | 3 | | | 8 | | | | | |
| 10 | 1 | | | 9 | | | | | |
| 11 | 5 | | | | | | | | |
| 12 | 6 | | | 31 | | | | | |

L REGION

| (DATA MEMORY) | | | | (SORTING MEMORY) | | (DIST. COUNTING MEMORY) | | | |
|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATA L | L POINTER | L DATA | ADDRESS | DATA | DATA | DATA | DATA | CNTX3 |
| 1 | 5 | | | 0 | | | | | |
| 2 | 6 | | | 1 | | | | | |
| 3 | 3 | | | 2 | | | | | |
| 4 | 1 | | | 3 | | | | | |
| 5 | 5 | | | 4 | | | | | |
| 6 | 4 | | | 5 | | | | | |
| 7 | 5 | | | 6 | | | | | |
| 8 | 1 | | | 7 | | | | | |
| 9 | 1 | | | 8 | | | | | |
| 10 | 2 | | | 9 | | | | | |
| 11 | 7 | | | | | | | | |
| 12 | 5 | | | 63 | | | | | |

Fig. 65

H REGION

| | (DATA MEMORY) | | (SORTING MEMORY) | | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 1L | FLAG 1H | |
| ADDRESS | DATAH | HPOINTER | HDATA | ADDRESS | DATA | DATA | DATA | DATA | | CNTX 2 |
| 1 | 1 | 10 | 6 | 0 | 6 | 7 | 1 | 1 | | |
| 2 | 2 | 11 | 7 | 1 | 1 | 12 | 1 | 1 | | |
| 3 | 4 | | | 2 | 2 | 11 | 1 | 1 | | |
| 4 | 5 | | | 3 | 5 | 5 | 1 | 0 | | |
| 5 | 3 | | | 4 | 3 | 3 | 1 | 0 | | |
| 6 | 0 | 7 | | 5 | 4 | 4 | 1 | 0 | | |
| 7 | 0 | | | 6 | | | | | | |
| 8 | 7 | | | 7 | 8 | 8 | 1 | 0 | | |
| 9 | 9 | | | 8 | | | | | | |
| 10 | 1 | 12 | | 9 | 9 | 9 | 1 | 0 | | |
| 11 | 2 | | | | | | | | | |
| 12 | 1 | | | 31 | | | | | | |

M REGION

| | (DATA MEMORY) | | (SORTING MEMORY) | | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 3L | FLAG 3H | |
| ADDRESS | DATAM | MPOINTER | MDATA | ADDRESS | DATA | DATA | DATA | DATA | | CNTX2 1 |
| 1 | 1 | | 6 | 0 | | | | | | |
| 2 | 2 | | | 1 | | | | | | |
| 3 | 3 | | | 2 | | | | | | |
| 4 | 4 | | | 3 | | | | | | |
| 5 | 6 | | | 4 | | | | | | |
| 6 | 7 | | | 5 | | | | | | |
| 7 | 8 | | | 6 | | | | | | |
| 8 | 2 | | | 7 | 6 | 6 | 1 | 0 | | |
| 9 | 3 | | | 8 | 7 | 7 | 1 | 0 | | |
| 10 | 1 | | | 9 | | | | | | |
| 11 | 5 | | | | | | | | | |
| 12 | 6 | | | 31 | | | | | | |

L REGION

| | (DATA MEMORY) | | (SORTING MEMORY) | | | (DIST. COUNTING MEMORY) | | | | |
|---|---|---|---|---|---|---|---|---|---|---|
| | Z-VALUE | NEXT POINTER | SORTING ADDRESS | | | DIST. COUNTING START | DIST. COUNTING END | FLAG 2L | FLAG 2H | |
| ADDRESS | DATAL | LPOINTER | LDATA | ADDRESS | DATA | DATA | DATA | DATA | | CNTX3 1 |
| 1 | 5 | | 6 | 0 | | | | | | |
| 2 | 6 | | | 1 | | | | | | |
| 3 | 3 | | | 2 | | | | | | |
| 4 | 1 | | | 3 | | | | | | |
| 5 | 5 | | | 4 | 6 | 6 | 1 | 0 | | |
| 6 | 4 | | | 5 | | | | | | |
| 7 | 5 | | | 6 | | | | | | |
| 8 | 1 | | | 7 | | | | | | |
| 9 | 1 | | | 8 | | | | | | |
| 10 | 2 | | | 9 | | | | | | |
| 11 | 7 | | | | | | | | | |
| 12 | 5 | | | 63 | | | | | | |

Fig. 66

H REGION

| (DATA MEMORY) | | (SORTING MEMORY) | | (DIST. COUNTING MEMORY) | | | | |
|---|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATAH | HPOINTER | H DATA | ADDRESS | DATA | DATA | DATA | DATA |
| 1 | 1 | 10 | 6 | 0 | 6 | 7 | 1 | 1 |
| 2 | 2 | 11 | 7 | 1 | 1 | 12 | 1 | 1 |
| 3 | 4 | | | 2 | 2 | 11 | 1 | 1 |
| 4 | 5 | | | 3 | 5 | 5 | 1 | 0 |
| 5 | 3 | | | 4 | 3 | 3 | 1 | 0 |
| 6 | 0 | 7 | | 5 | 4 | 4 | 1 | 0 |
| 7 | 0 | | | 6 | | | | |
| 8 | 7 | | | 7 | 8 | 8 | 1 | 0 |
| 9 | 9 | | | 8 | | | | |
| 10 | 1 | 12 | | 9 | 9 | 9 | 1 | 0 |
| 11 | 2 | | | | | | | |
| 12 | 1 | | | 31 | | | | |

CNTX | 2

M REGION

| (DATA MEMORY) | | (SORTING MEMORY) | | (DIST. COUNTING MEMORY) | | | | |
|---|---|---|---|---|---|---|---|---|
| | Z-VALUE | NEXT POINTER | SORTING ADDRESS | | | DIST. COUNTING START | DIST. COUNTING END | FLAG 3L | FLAG 3H |
| ADDRESS | DATAM | MPOINTER | M DATA | ADDRESS | DATA | DATA | DATA | DATA |
| 1 | 1 | | 7 | 0 | | | | |
| 2 | 2 | | | 1 | | | | |
| 3 | 3 | | | 2 | | | | |
| 4 | 4 | | | 3 | | | | |
| 5 | 6 | | | 4 | | | | |
| 6 | 7 | | | 5 | | | | |
| 7 | 8 | | | 6 | | | | |
| 8 | 2 | | | 7 | 6 | 6 | 1 | 0 |
| 9 | 3 | | | 8 | 7 | 7 | 1 | 0 |
| 10 | 1 | | | 9 | | | | |
| 11 | 5 | | | | | | | |
| 12 | 6 | | | 31 | | | | |

CNTX2 | 1

L REGION

| (DATA MEMORY) | | (SORTING MEMORY) | | (DIST. COUNTING MEMORY) | | | | |
|---|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATAL | LPOINTER | L DATA | ADDRESS | DATA | DATA | DATA | DATA |
| 1 | 5 | | 6 | 0 | | | | |
| 2 | 6 | | 7 | 1 | | | | |
| 3 | 3 | | | 2 | | | | |
| 4 | 1 | | | 3 | | | | |
| 5 | 5 | | | 4 | | | | |
| 6 | 4 | | | 5 | 7 | 7 | 1 | 0 |
| 7 | 5 | | | 6 | | | | |
| 8 | 1 | | | 7 | | | | |
| 9 | 1 | | | 8 | | | | |
| 10 | 2 | | | 9 | | | | |
| 11 | 7 | | | | | | | |
| 12 | 5 | | | 63 | | | | |

CNTX3 | 2

Fig. 67

H REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 1L | FLAG 1H | | |
|---|---|---|---|---|---|---|---|---|---|---|---|
| ADDRESS | DATAH | HPOINTER | H DATA | ADDRESS | DATA | DATA | DATA | DATA | | CNTX | 3 |
| 1 | 1 | 10 | 1 | 0 | 6 | 7 | 1 | 1 | | | |
| 2 | 2 | 11 | 10 | 1 | 1 | 12 | 1 | 1 | | | |
| 3 | 4 | | 12 | 2 | 2 | 11 | 1 | 1 | | | |
| 4 | 5 | | | 3 | 5 | 5 | 1 | 0 | | | |
| 5 | 3 | | | 4 | 3 | 3 | 1 | 0 | | | |
| 6 | 0 | | | 5 | 4 | 4 | 1 | 0 | | | |
| 7 | 0 | 7 | | 6 | | | | | | | |
| 8 | 7 | | | 7 | 8 | 8 | 1 | 0 | | | |
| 9 | 9 | | | 8 | | | | | | | |
| 10 | 1 | 12 | | 9 | 9 | 9 | 1 | 0 | | | |
| 11 | 2 | | | | | | | | | | |
| 12 | 1 | | | 31 | | | | | | | |

M REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 3L | FLAG 3H | | |
|---|---|---|---|---|---|---|---|---|---|---|---|
| ADDRESS | DATAM | MPOINTER | MDATA | ADDRESS | DATA | DATA | DATA | DATA | | CNTX2 | 2 |
| 1 | 1 | 10 | 1 | 0 | | | | | | | |
| 2 | 2 | | 10 | 1 | 1 | 10 | 1 | 1 | | | |
| 3 | 3 | | | 2 | | | | | | | |
| 4 | 4 | | | 3 | | | | | | | |
| 5 | 6 | | | 4 | | | | | | | |
| 6 | 7 | | | 5 | | | | | | | |
| 7 | 8 | | | 6 | 12 | 12 | 1 | 0 | | | |
| 8 | 2 | | | 7 | | | | | | | |
| 9 | 3 | | | 8 | | | | | | | |
| 10 | 1 | | | 9 | | | | | | | |
| 11 | 5 | | | | | | | | | | |
| 12 | 6 | | | 31 | | | | | | | |

L REGION (DATA MEMORY) (SORTING MEMORY) (DIST. COUNTING MEMORY)

| | Z-VALUE | NEXT POINTER | SORTING ADDRESS | | | DIST. COUNTING START | DIST. COUNTING END | FLAG 2L | FLAG 2H | | |
|---|---|---|---|---|---|---|---|---|---|---|---|
| ADDRESS | DATAL | LPOINTER | LDATA | ADDRESS | DATA | DATA | DATA | DATA | | CNTX3 | 4 |
| 1 | 5 | | 6 | 0 | | | | | | | |
| 2 | 6 | | 7 | 1 | | | | | | | |
| 3 | 3 | | 10 | 2 | 10 | 10 | 1 | 0 | | | |
| 4 | 1 | | 1 | 3 | | | | | | | |
| 5 | 5 | | | 4 | | | | | | | |
| 6 | 4 | | | 5 | 1 | 1 | 1 | 0 | | | |
| 7 | 5 | | | 6 | | | | | | | |
| 8 | 1 | | | 7 | | | | | | | |
| 9 | 1 | | | 8 | | | | | | | |
| 10 | 2 | | | 9 | | | | | | | |
| 11 | 7 | | | | | | | | | | |
| 12 | 5 | | | 63 | | | | | | | |

Fig. 68

H REGION

| | (DATA MEMORY) | (SORTING MEMORY) | | (DIST. COUNTING MEMORY) | | | |
|---|---|---|---|---|---|---|---|
| | Z-VALUE | NEXT POINTER | SORTING ADDRESS | | | DIST. COUNTING START | DIST. COUNTING END | FLAG 1L | FLAG 1H |
| ADDRESS | DATA H | H POINTER | H DATA | ADDRESS | DATA | DATA | DATA | DATA |
| 1 | 1 | 10 | 1 | 0 | 6 | 7 | 1 | 1 |
| 2 | 2 | 11 | 10 | 1 | 1 | 12 | 1 | 1 |
| 3 | 4 | | 12 | 2 | 2 | 11 | 1 | 1 |
| 4 | 5 | | | 3 | 5 | 5 | 1 | 0 |
| 5 | 3 | | | 4 | 3 | 3 | 1 | 0 |
| 6 | 0 | 7 | | 5 | 4 | 4 | 1 | 0 |
| 7 | 0 | | | 6 | | | | |
| 8 | 7 | | | 7 | 8 | 8 | 1 | 0 |
| 9 | 9 | | | 8 | | | | |
| 10 | 1 | 12 | | 9 | 9 | 9 | 1 | 0 |
| 11 | 2 | | | | | | | |
| 12 | 1 | | | 31 | | | | |

CNTX1 3

M REGION

| | (DATA MEMORY) | (SORTING MEMORY) | | (DIST. COUNTING MEMORY) | | | |
|---|---|---|---|---|---|---|---|
| | Z-VALUE | NEXT POINTER | SORTING ADDRESS | | | DIST. COUNTING START | DIST. COUNTING END | FLAG 3L | FLAG 3H |
| ADDRESS | DATA M | M POINTER | M DATA | ADDRESS | DATA | DATA | DATA | DATA |
| 1 | 1 | 10 | 12 | 0 | | | | |
| 2 | 2 | | | 1 | 1 | 10 | 1 | 1 |
| 3 | 3 | | | 2 | | | | |
| 4 | 4 | | | 3 | | | | |
| 5 | 6 | | | 4 | | | | |
| 6 | 7 | | | 5 | | | | |
| 7 | 8 | | | 6 | 12 | 12 | 1 | 0 |
| 8 | 2 | | | 7 | | | | |
| 9 | 3 | | | 8 | | | | |
| 10 | 1 | | | 9 | | | | |
| 11 | 5 | | | | | | | |
| 12 | 6 | | | 31 | | | | |

CNTX2 1

L REGION

| | (DATA MEMORY) | (SORTING MEMORY) | | (DIST. COUNTING MEMORY) | | | |
|---|---|---|---|---|---|---|---|
| | Z-VALUE | NEXT POINTER | SORTING ADDRESS | | | DIST. COUNTING START | DIST. COUNTING END | FLAG 2L | FLAG 2H |
| ADDRESS | DATA L | L POINTER | L DATA | ADDRESS | DATA | DATA | DATA | DATA |
| 1 | 5 | | 6 | 0 | | | | |
| 2 | 6 | | 7 | 1 | | | | |
| 3 | 3 | | 10 | 2 | | | | |
| 4 | 1 | | 1 | 3 | | | | |
| 5 | 5 | | 12 | 4 | | | | |
| 6 | 4 | | | 5 | 12 | 12 | 1 | 0 |
| 7 | 5 | | | 6 | | | | |
| 8 | 1 | | | 7 | | | | |
| 9 | 1 | | | 8 | | | | |
| 10 | 2 | | | 9 | | | | |
| 11 | 7 | | | | | | | |
| 12 | 5 | | | 63 | | | | |

CNTX3 5

Fig. 69

H REGION

(DATA MEMORY) | (SORTING MEMORY) | (DIST. COUNTING MEMORY)

| ADDRESS | Z-VALUE DATA H | NEXT POINTER H POINTER | SORTING ADDRESS H DATA | ADDRESS | DATA | DIST. COUNTING START DATA | DIST. COUNTING END DATA | FLAG 1L DATA | FLAG 1H DATA |
|---|---|---|---|---|---|---|---|---|---|
| 1 | 1 | 10 |  | 0 | 6 | 7 | 1 | 1 |  |
| 2 | 2 | 11 |  | 1 | 1 | 12 | 1 | 1 |  |
| 3 | 4 |  |  | 2 | 2 | 11 | 1 | 1 |  |
| 4 | 5 |  |  | 3 | 5 | 5 | 1 | 0 |  |
| 5 | 3 |  |  | 4 | 3 | 3 | 1 | 0 |  |
| 6 | 0 | 7 |  | 5 | 4 | 4 | 1 | 0 |  |
| 7 | 0 |  |  | 6 |  |  |  |  |  |
| 8 | 7 |  |  | 7 | 8 | 8 | 1 | 0 |  |
| 9 | 9 |  |  | 8 |  |  |  |  |  |
| 10 | 1 | 12 |  | 9 | 9 | 9 | 1 | 0 |  |
| 11 | 2 |  |  |  |  |  |  |  |  |
| 12 | 1 |  |  | 31 |  |  |  |  |  |

CNTX

M REGION

(DATA MEMORY) | (SORTING MEMORY) | (DIST. COUNTING MEMORY)

| ADDRESS | Z-VALUE DATA M | NEXT POINTER M POINTER | SORTING ADDRESS M DATA | ADDRESS | DATA | DIST. COUNTING START DATA | DIST. COUNTING END DATA | FLAG 3L DATA | FLAG 3H DATA |
|---|---|---|---|---|---|---|---|---|---|
| 1 | 1 |  |  | 0 |  |  |  |  |  |
| 2 | 2 |  |  | 1 |  |  |  |  |  |
| 3 | 3 |  |  | 2 |  |  |  |  |  |
| 4 | 4 |  |  | 3 |  |  |  |  |  |
| 5 | 6 |  |  | 4 |  |  |  |  |  |
| 6 | 7 |  |  | 5 |  |  |  |  |  |
| 7 | 8 |  |  | 6 |  |  |  |  |  |
| 8 | 2 |  |  | 7 |  |  |  |  |  |
| 9 | 3 |  |  | 8 |  |  |  |  |  |
| 10 | 1 |  |  | 9 |  |  |  |  |  |
| 11 | 5 |  |  |  |  |  |  |  |  |
| 12 | 6 |  |  | 31 |  |  |  |  |  |

CNTX2

L REGION

(DATA MEMORY) | (SORTING MEMORY) | (DIST. COUNTING MEMORY)

| ADDRESS | Z-VALUE DATA L | NEXT POINTER L POINTER | SORTING ADDRESS L DATA | ADDRESS | DATA | DIST. COUNTING START DATA | DIST. COUNTING END DATA | FLAG 2L DATA | FLAG 2H DATA |
|---|---|---|---|---|---|---|---|---|---|
| 1 | 5 |  | 6 | 0 |  |  |  |  |  |
| 2 | 6 |  | 7 | 1 |  |  |  |  |  |
| 3 | 3 |  | 10 | 2 |  |  |  |  |  |
| 4 | 1 |  | 1 | 3 |  |  |  |  |  |
| 5 | 5 |  | 12 | 4 |  |  |  |  |  |
| 6 | 4 |  | 2 | 5 |  |  |  |  |  |
| 7 | 5 |  | 11 | 6 |  |  |  |  |  |
| 8 | 1 |  | 5 | 7 |  |  |  |  |  |
| 9 | 1 |  | 3 | 8 |  |  |  |  |  |
| 10 | 2 |  | 4 | 9 |  |  |  |  |  |
| 11 | 7 |  | 8 |  |  |  |  |  |  |
| 12 | 5 |  | 9 | 63 |  |  |  |  |  |

CNTX3 12

SORTER FOR SORTING DATA BASED ON A PLURALITY OF REFERENCE VALUE DATA

CROSS REFERENCE TO RELATED APPLICATIONS

This application is a continuation-in-part of application Set. No. 827,635 filed Jan. 29, 1992, now abandoned.

BACKGROUND OF THE INVENTION

1. Field of the Invention

The present invention relates to a sorter for sorting data based on a plurality of reference value data.

2. Description of the Related Art

An image processor synthesizes and outputs various kinds of image signals for a CRT display based on image information transmitted from the exterior of the image processor. The image processor can synthesize and output a three-dimensional image as well as a two-dimensional plane image. Accordingly, for example, the image processor is widely used for a video game for the three-dimensional image, computer graphics, a display arranged in a device for CAD, and other devices.

When a deep three-dimensional image is synthesized in real time by using the image processor, it is necessary to sort three-dimensional data of each of processed images with respect to a processed polygon for 1/60 second at a high speed on the basis of image data on a Z-axis constituting coordinate values in a deep direction of each of the images.

Therefore, it is desirable to provide a sorter for sorting a plurality of three-dimensional image data at a high speed on the basis of predetermined data on the Z-axis.

However, in a general sorter, adjacent data on the Z-axis included in each of the image data are sequentially compared with each other and are rearranged with respect to all the image data.

In such processing, all Z-axis data between memories must be repeatedly transferred many times. Accordingly, it is impossible to perform a sorting operation of the image data at a high speed.

In particular, in such a general sorter, much time and labor are required in the sorting operation when the number of Z-axis data to be compared is increased. Accordingly, when the sorting operation is performed at a high speed, it is necessary to use a relatively large-sized computer so that the entire sorter is complicated in structure and is increased in cost.

Japanese Patent Application Laying Open (KOKAI) No. 2-224018 (international patent class G06F 7/24) shows a sorter for sorting a plurality of image data at a high speed by a simplified structure. In this sorter, the sorting operation can be performed at a high speed even when the number of image data on a reference axis as sorted data is large.

This sorter inputs the reference axis data as sorted data to a first buffer memory and a last buffer memory in a data number order.

The first buffer memory stores a data number to a memory area for a first data number when corresponding reference axis data are first inputted to the first buffer memory.

Similarly, the last buffer memory sequentially updates and stores this data number to a memory area for a last data number every time the corresponding reference axis data are read. Accordingly, the data number provided at a final reading time of the corresponding reference axis data is stored to the memory area for a last data number.

When the data number stored to the memory area for a last data number is updated and stored to the last buffer memory, the data number previously stored to this memory area and a newly stored data number are inputted to a chain buffer memory.

The chain buffer memory writes the new updated data number to a memory area for a chain data number designated by the data number before update every time data in the memory area for a last data number are updated. Accordingly, when the reference axis data having the same value and different from each other only in data number are repeatedly inputted to the chain buffer memory, historical contents of these reference axis data are written to the memory area for a chain data number. These historical contents show a data number order of the inputted reference axis data.

After sequential data writing operations are completely performed with respect to the first buffer memory, the last buffer memory and the chain buffer memory, the data number stored to the memory area for a first data number having a predetermined relation corresponding to the last data number is sequentially written to the memory area for a chain data number designated by the data number stored to the memory area for the last data number. Thus, the data number is written to each of memory areas for chain data numbers such that the reference axis data are chained together in an ascending or descending order.

A sorting circuit reads the data number written to each of the memory regions for chain data numbers in accordance with a predetermined reading rule. Thus, the inputted reference axis data are outputted in a data number order.

Thus, the inputted reference axis data are sorted and outputted in the ascending or descending order.

The image processor performs a three-dimensional clipping operation for removing a polygon having small Z-axis data with respect to the screen and a polygon having large Z-axis data with respect to a boundary limit. The image processor also performs a three-dimensional clipping operation for removing a polygon located in an arbitrary Z-axis data region. The image processor further performs a three-dimensional picking operation for leaving only the polygon located in the arbitrary Z-axis data region.

However, in the above sorting system, after the entire sorting operation is performed, a certain limited Z-value is required to perform the three-dimensional clipping operation for removing a polygon having a small Z-value with respect to a screen face and a polygon having a large Z-value with respect to the limit of a visual field. This limited Z-value is also required to perform the three-dimensional picking operation for leaving only a polygon located in an arbitrary Z-axis region. Accordingly, plural image data are excessively transferred since these data are sorted on the basis of a predetermined reference axis.

SUMMARY OF THE INVENTION

It is therefore an object of the present invention to provide a sorter for performing the three-dimensional clipping and picking operations, etc. at high speeds by a simplified structure.

The above object of the present invention can be achieved by a sorter for sorting a plurality of inputted reference value data constructed by plural digits, the sorter comprising data number generating means for generating a data number corresponding to each of the inputted reference value data; reference value data memory regions of plural digits for dividing the inputted reference value data into two or more data groups, and storing the divided data to addresses corresponding to respective data numbers; a counting start region having a first memory region corresponding to a designated data group addressed on the basis of the reference value data of each of the divided data groups; the counting start region storing the data number generated from the data number generating means to the first memory region when each of the reference value data corresponding to the first memory region is first inputted; a counting end region having a second memory region addressed on the basis of the reference value data; the counting end region updating and storing the data number generated from the data number generating means to the second memory region every time the reference value data corresponding to the second memory region are inputted; a pointer region for designating an address next to an address designated on the basis of the data number; first control means for writing a new updated data number to the pointer region designated by the data number before update every time the data number of the counting end region is updated; a sorting memory having sorting address regions corresponding to the divided data groups and storing sorted results; second control means for chaining and writing data numbers written to the counting start region, the pointer region and the counting end region on an upper position side to the sorting memory after the data numbers are completely written to the counting start and end regions on the upper position side in accordance with the reference value data on the upper position side of the divided data groups; and third control means for chaining and writing data numbers written to the counting start region, the pointer region and the counting end region on a lower position side to the sorting memory after the reference value data on the upper position side are completely sorted and reference value data from a memory region for reference value data on the lower position side corresponding to the reference value data on the upper position side having the same reference value on the upper position side are completely written to the counting start and end regions on the lower position side.

The above sorter preferably further comprises a first flag region corresponding to the counting start region, and a second flag region corresponding to the counting end region. The first flag region is set when data are stored to the counting start region. The second flag region is set when data are updated in the counting end region.

The above sorter preferably further comprises flag setting means having a flag group corresponding to an address based on the reference value data on the upper position side. The flag setting means sets a flag of the flag group at an address corresponding to a memory region for performing clipping or picking processing. The third control means omits a sorting operation of the reference value data on the lower position side with respect to the reference value data on the upper position side at the address corresponding to the clipping processing after the reference value data on the upper position side are completely sorted.

The above object of the present invention can be also achieved by a sorter for sorting a plurality of inputted reference value data constructed by plural digits, the sorter comprising data number generating means for generating a data number corresponding to each of the inputted reference value data; reference value data memory regions of upper and lower digits for dividing the inputted reference value data into data of upper and lower digits, and storing the divided data to addresses corresponding to respective data numbers; an upper digit counting start region having a first memory region addressed on the basis of the reference value data of the upper digit; the upper digit counting start region storing the data number generated from the data number generating means to the first memory region when the reference value data of the upper digit corresponding to the first memory region are first inputted; an upper digit counting end region having a second memory region addressed on the basis of the reference value data; the upper digit counting end region updating and storing the data number generated from the data number generating means to the second memory region every time the reference value data of the upper digit corresponding to the second memory region are inputted; an upper digit pointer region for designating an address next to an address designated on the basis of the data number; a lower digit counting start region having a third memory region addressed on the basis of the reference value data of the lower digit; the lower digit counting start region storing the data number generated from the data number generating means to the third memory region when the reference value data of the lower digit corresponding to the third memory region are first inputted; a lower digit counting end region having a fourth memory region addressed on the basis of the reference value data; the lower digit counting end region updating and storing the data number generated from the data number generating means to the fourth memory region every time the reference value data of the lower digit corresponding to the fourth memory region are inputted; a lower digit pointer region for designating an address next to an address designated on the basis of the data number; first control means for writing a new updated data number to the upper or lower digit pointer region designated by the data number before update every time the data number in the upper or lower digit counting end region is updated; a sorting memory having sorting address regions corresponding to the upper and lower digits and storing sorted results; second control means for chaining and writing data numbers written to the upper digit counting start region, the upper digit pointer region and the upper digit counting end region to the sorting memory after the data numbers are completely written to the upper digit counting start and end regions in accordance with the reference value data of the upper digit; and third control means for chaining and writing data numbers written to the lower digit counting start region, the lower digit pointer region and the lower digit counting end region to the sorting memory after the reference value data of the upper digit are completely sorted and reference value data from a memory region for reference value data of the lower digit corresponding to the reference value data of the upper digit having the same reference value of the upper digit are completely written to the lower digit counting start and end regions.

As mentioned above, in accordance with the present invention, reference value data are divided into two or more data to perform sorting processing. Namely, a distribution counting sorting operation is performed with respect to the reference value data on an upper position side. The distribution sorting operation is performed from a smaller address of the reference value data with respect to only the reference value data on a lower position side in a data group having the same reference value. Sorted data are sequentially written to addresses of a sorting memory. Thus, the sorting operation can be performed at a high speed with respect to data having a long bit length.

Further, in the present invention, the sorter can be constructed such that the sorting operation about the reference value data of lower digits is omitted with respect to the reference value data of upper digits at addresses corresponding to a clipping operation after the reference value data on the upper position side are completely sorted. Accordingly, three-dimensional clipping and picking operations for removing polygons having arbitrary reference value data can be performed without excessively transferring the reference value data. Accordingly, the three-dimensional clipping and picking operations can be performed at high speeds. In this case, the reference value data are sorted by dividing them into upper and lower digits.

Further objects and advantages of the present invention will be apparent from the following description of the preferred embodiments of the present invention as illustrated in the accompanying drawings.

BRIEF DESCRIPTION OF THE DRAWINGS

FIGS. 11(i) and 11(ii) are a flow chart for explaining an operation of the sorter in the first embodiment of the present invention shown in FIG. 10;

FIGS. 14(i) and 14(ii) are a flow chart for explaining the operation of the sorter in the first embodiment of the present invention shown in FIG. 10;

FIG. 22 is a table showing storing states of the data memory, the distribution counting memory and the sorting memory when the number of data is set to 16 and these data are constructed by 8 bits in sorted data length on a high memory region side and 8 bits in sorted data length on a low memory region side;

FIG. 23 is a table showing storing states of the data memory, the distribution counting memory and the sorting memory when data stored to address 1 of the data memory in a high memory region are processed, and the number of data is set to 16 and these data are constructed by 8 bits in sorted data length on the high memory region side and 8 bits in sorted data length on the low memory region side;

FIG. 24 is a table showing storing states of the data memory, the distribution counting memory and the sorting memory when data stored to address 2 of the data memory in the high memory region are processed, and the number of data is set to 16 and these data are constructed by 8 bits in sorted data length on the high memory region side and 8 bits in sorted data length on the low memory region side;

FIG. 25 is a table showing storing states of the data memory, the distribution counting memory and the sorting memory when data stored to address 3 of the data memory in the high memory region are processed, and the number of data is set to 16 and these data are constructed by 8 bits in sorted data length on the high memory region side and 8 bits in sorted data length on the low memory region side;

FIG. 26 is a table showing storing states of the data memory, the distribution counting memory and the sorting memory when data stored to address 4 of the data memory in the high memory region are processed, and the number of data is set to 16 and these data are constructed by 8 bits in sorted data length on the high memory region side and 8 bits in sorted data length on the low memory region side;

FIG. 27 is a table showing storing states of the data memory, the distribution counting memory and the sorting memory when data stored to address 5 of the data memory in the high memory region are processed, and the number of data is set to 16 and these data are constructed by 8 bits in sorted data length on the high memory region side and 8 bits in sorted data length on the low memory region side;

FIG. 28 is a table showing storing states of the data memory, the distribution counting memory and the sorting memory when data stored to address 6 of the data memory in the high memory region are processed, and the number of data is set to 16 and these data are constructed by 8 bits in sorted data length on the high memory region side and 8 bits in sorted data length on the low memory region side;

FIG. 29 is a table showing storing states of the data memory, the distribution counting memory and the sorting memory when data stored to address 7 of the data memory in the high memory region are processed, and the number of data is set to 16 and these data are constructed by 8 bits in sorted data length on the high memory region side and 8 bits in sorted data length on the low memory region side;

FIG. 30 is a table showing storing states of the data memory, the distribution counting memory and the sorting memory when data stored to address 8 of the data memory in the high memory region are processed, and the number of data is set to 16 and these data are constructed by 8 bits in sorted data length on the high memory region side and 8 bits in sorted data length on the low memory region side;

FIG. 31 is a table showing storing states of the data memory, the distribution counting memory and the sorting memory when data stored to address 9 of the data memory in the high memory region are processed, and the number of data is set to 16 and these data are constructed by 8 bits in sorted data length on the high memory region side and 8 bits in sorted data length on the low memory region side;

FIG. 32 is a table showing storing states of the data memory, the distribution counting memory and the sorting memory when data stored to address 10 of the data memory in the high memory region are processed, and the number of data is set to 16 and these data are constructed by 8 bits in sorted data length on the high memory region side and 8 bits in sorted data length on the low memory region side;

FIG. 33 is a table showing storing states of the data memory, the distribution counting memory and the sorting memory when data stored to address 11 of the data memory in the high memory region are processed, and the number of data is set to 16 and these data are constructed by 8 bits in sorted data length on the high memory region side and 8 bits in sorted data length on the low memory region side;

FIG. 34 is a table showing storing states of the data memory, the distribution counting memory and the sorting memory when data stored to address 12 of the data memory in the high memory region are processed, and the number of data is set to 16 and these data are constructed by 8 bits in sorted data length on the high memory region side and 8 bits in sorted data length on the low memory region side;

FIG. 35 is a table showing storing states of the data memory, the distribution counting memory and the sorting memory when data stored to address 13 of the data memory in the high memory region are processed, and the number of data is set to 16 and these data are constructed by 8 bits in sorted data length on the high memory region side and 8 bits in sorted data length on the low memory region side;

FIG. 36 is a table showing storing states of the data memory, the distribution counting memory and the sorting memory when data stored to address 14 of the data memory in the high memory region are processed, and the number of data is set to 16 and these data are constructed by 8 bits in sorted data length on the high memory region side and 8 bits in sorted data length on the low memory region side;

FIG. 37 is a table showing storing states of the data memory, the distribution counting memory and the sorting memory when data stored to address 15 of the data memory in the high memory region are processed, and the number of data is set to 16 and these data are constructed by 8 bits in sorted data length on the high memory region side and 8 bits in sorted data length on the low memory region side;

FIG. 38 is a table showing storing states of the data memory, the distribution counting memory and the sorting memory when data stored to address 16 of the data memory in the high memory region are processed, and the number of data is set to 16 and these data are constructed by 8 bits in sorted data length on the high memory region side and 8 bits in sorted data length on the low memory region side;

FIG. 39 is a table showing storing states of the data memory, the distribution counting memory and the sorting memory when only data having Z-value "0" in the high memory region are sorted in a low memory region, and the number of data is set to 16 and these data are constructed by 8 bits in sorted data length on the high memory region side and 8 bits in sorted data length on the low memory region side;

FIG. 40 is a table showing storing states of the data memory, the distribution counting memory and the sorting memory when only data having Z-value "1" in the high memory region are sorted in the low memory region, and the number of data is set to 16 and these data are constructed by 8 bits in sorted data length on the high memory region side and 8 bits in sorted data length on the low memory region side;

FIG. 41 is a table showing storing states of the data memory, the distribution counting memory and the sorting memory when only data having Z-value "2" in the high memory region are sorted in the low memory region, and the number of data is set to 16 and these data are constructed by 8 bits in sorted data length on the high memory region side and 8 bits in sorted data length on the low memory region side;

FIG. 42 is a table showing storing states of the data memory, the distribution counting memory and the sorting memory when only data having Z-value "3" in the high memory region are sorted in the low memory region, and the number of data is set to 16 and these data are constructed by 8 bits in sorted data length on the high memory region side and 8 bits in sorted data length on the low memory region side;

FIG. 43 is a table showing storing states of the data memory, the distribution counting memory and the sorting memory when only data having Z-value "4" in the high memory region are sorted in the low memory region, and the number of data is set to 16 and these data are constructed by 8 bits in sorted data length on the high memory region side and 8 bits in sorted data length on the low memory region side;

FIG. 44 is a table showing storing states of the data memory, the distribution counting memory and the sorting memory when only data having Z-value "5" in the high memory region are sorted in the low memory region, and the number of data is set to 16 and these data are constructed by 8 bits in sorted data length on the high memory region side and 8 bits in sorted data length on the low memory region side;

FIG. 45 is a table showing storing states of the data memory, the distribution counting memory and the sorting memory when only data having Z-value "6" in the high memory region are sorted in the low memory region, and the number of data is set to 16 and these data are constructed by 8 bits in sorted data length on the high memory region side and 8 bits in sorted data length on the low memory region side;

FIG. 46 is a table showing storing states of the data memory, the distribution counting memory and the sorting memory when only data having Z-value "7" in the high memory region are sorted in the low memory region, and the number of data is set to 16 and these data are constructed by 8 bits in sorted data length on the high memory region side and 8 bits in sorted data length on the low memory region side;

FIG. 47 is a table showing storing states of the data memory, the distribution counting memory and the sorting memory when only data having Z-value "9" in the high memory region are sorted in the low memory region, and the number of data is set to 16 and these data are constructed by 8 bits in sorted data length on the high memory region side and 8 bits in sorted data length on the low memory region side;

FIG. 48 is a table showing storing states of the data memory, the distribution counting memory and the sorting memory when only data having Z-value "10" in the high memory region are sorted in the low memory region, and the number of data is set to 16 and these data are constructed by 8 bits in sorted data length on the high memory region side and 8 bits in sorted data length on the low memory region side;

FIG. 49 is a table showing storing states of the data memory, the distribution counting memory and the sorting memory when data having Z-values "0", "1" and "2" in the high memory region are clipped and sorted;

FIG. 58 is a typical view showing address regions of a distribution counting memory used in the second embodiment of the present invention;

FIG. 61 is a table showing storing states of the data memory, the distribution counting memory and the sorting memory when only data stored to address 1 of the data memory in a high memory region are processed and sorted, and the number of data is set to 16 and these data are constructed by 5 bits in sorted data length on a high memory region side, 5 bits in sorted data length on a middle memory region side, and 6 bits in sorted data length on a low memory region side;

FIG. 62 is a table showing storing states of the data memory, the distribution counting memory and the sorting memory when only data stored to address 6 of the data memory in the high memory region are processed and sorted, and the number of data is set to 16 and these data are constructed by 5 bits in sorted data length on the high memory region side, 5 bits in sorted data length on the middle memory region side, and 6 bits in sorted data length on the low memory region side;

FIG. 63 is a table showing storing states of the data memory, the distribution counting memory and the sorting memory when only data stored to address 8 of the data memory in the high memory region are processed and sorted, and the number of data is set to 16 and these data are constructed by 5 bits in sorted data length on the high memory region side, 5 bits in sorted data length on the middle memory region side, and 6 bits in sorted data length on the low memory region side;

FIG. 64 is a table showing storing states of the data memory, the distribution counting memory and the sorting memory when data are sorted only in the high memory region, and the number of data is set to 16 and these data are constructed by 5 bits in sorted data length on the high memory region side, 5 bits in sorted data length on the middle memory region side, and 6 bits in sorted data length on the low memory region side;

FIG. 65 is a table showing storing states of the data memory, the distribution counting memory and the sorting memory when only data having Z-value "0" in the high memory region are sorted in the middle and low memory regions, and the number of data is set to 16 and these data are constructed by 5 bits in sorted data length on the high memory region side, 5 bits in sorted data length on the middle memory region side, and 6 bits in sorted data length on the low memory region side;

FIG. 66 is a table showing storing states of the data memory, the distribution counting memory and the sorting memory when only data having Z-value "0" in the high memory region are sorted in the middle and low memory regions, and the number of data is set to 16 and these data are constructed by 5 bits in sorted data length on the high memory region side, 5 bits in sorted data length on the middle memory region side, and 6 bits in sorted data length on the low memory region side;

FIG. 67 is a table showing storing states of the data memory, the distribution counting memory and the sorting memory when only data having Z-value "1" in the high memory region are sorted in the middle and low memory regions, and the number of data is set to 16 and these data are constructed by 5 bits in sorted data length on the high memory region side, 5 bits in sorted data length on the middle memory region side, and 6 bits in sorted data length on the low memory region side;

FIG. 68 is a table showing storing states of the data memory, the distribution counting memory and the sorting memory when only data having Z-value "1" in the high memory region are sorted in the middle and low memory regions, and the number of data is set to 16 and these data are constructed by 5 bits in sorted data length on the high memory region side, 5 bits in sorted data length on the middle memory region side, and 6 bits in sorted data length on the low memory region side; and FIG. 69 is a table showing storing states of the data memory, the distribution counting memory and the sorting memory when only data having Z-value "12" in the high memory region are sorted in the middle and low memory regions, and the number of data is set to 16 and these data are constructed by 5 bits in sorted data length on the high memory region side, 5 bits in sorted data length on the middle memory region side, and 6 bits in sorted data length on the low memory region side.

DESCRIPTION OF THE PREFERRED EMBODIMENTS

The preferred embodiments of a sorter in the present invention will next be described in detail with reference to the accompanying drawings.

Figure 1:
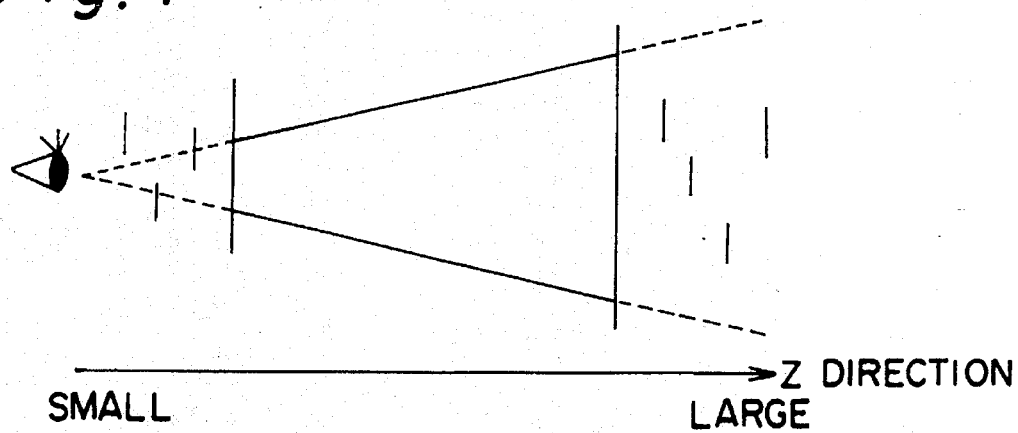
FIG. 1 is a typical view showing a clipping state in a Z-direction.
Figure 2:
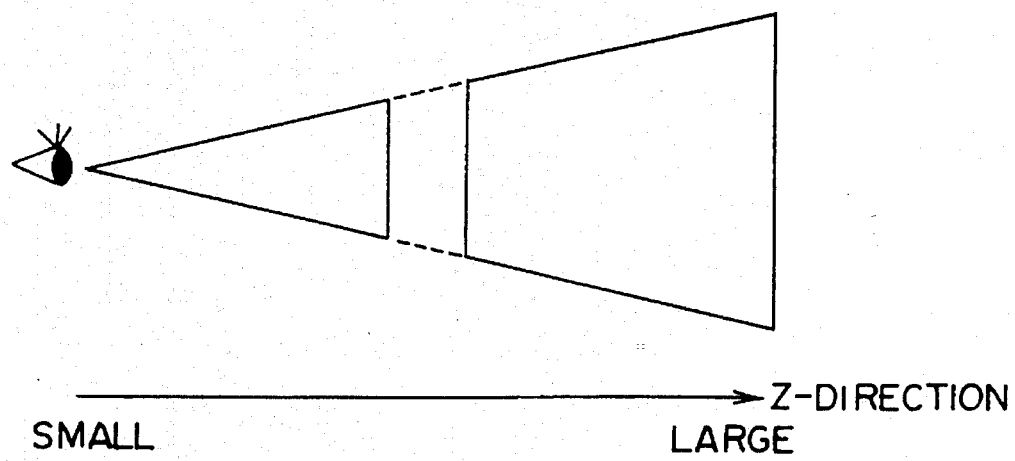
FIG. 2 is a typical view showing a picking state in the Z-direction.
Figure 3:
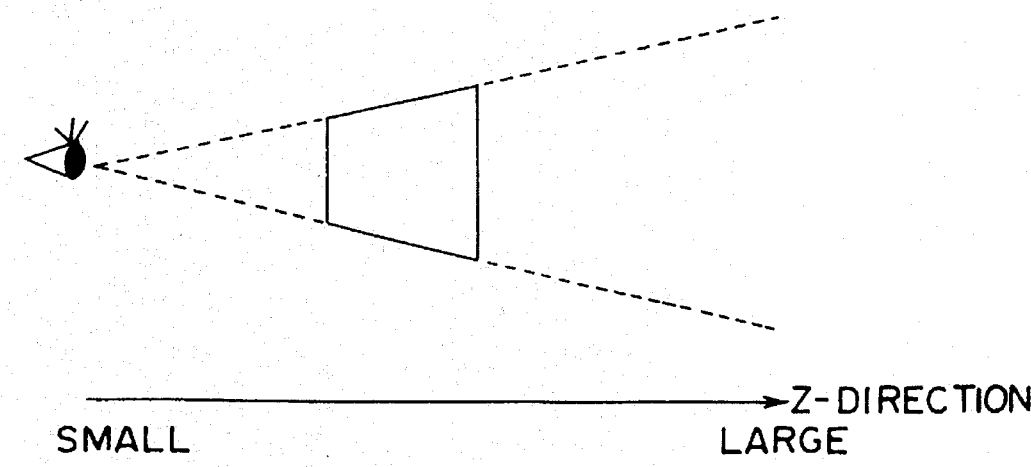
FIG. 3 is a typical view showing a clipping state in the Z-direction.

As shown in FIG. 1, an image processor performs a three-dimensional clipping operation for removing a polygon having small Z-axis data with respect to the screen and a polygon having large Z-axis data with respect to a boundary limit. As shown in FIG. 2, the image processor also performs a three-dimensional clipping operation for removing a polygon located in an arbitrary Z-axis data region. As shown in FIG. 3, the image processor further performs a three-dimensional picking operation for leaving only the polygon located in the arbitrary Z-axis data region.

Figure 4:
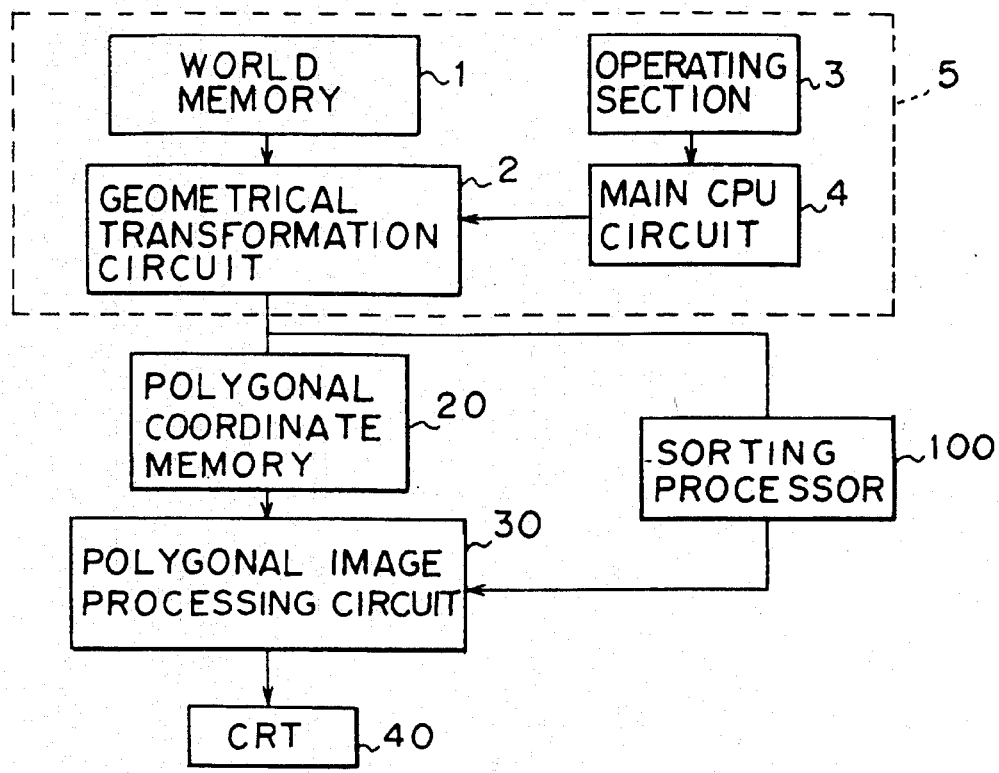
FIG. 4 is a block diagram showing the entire construction of a three-dimensional image processor to which the present invention is applied.

FIG. 4 is a block diagram showing the entire construction of a pseudo three-dimensional image processor using the present invention. For example, this image processor is suitably used for game machines for a racing game, a control simulation of an airplane, etc.

The entire construction of the image processor will next be described with reference to FIG. 4.

In this embodiment, an image information feeder 5 calculates a simulation image in each of various kinds of operating conditions during an operation of the image processor and outputs this simulation image to a polygonal coordinate memory 20 as information of plural polygons. The image information feeder 5 determines a typical distance value from a visual point to each of the polygons. The image information feeder 5 also determines a Z-value as a polygon having a small typical distance value, i.e., as a polygon having a high priority. The image information feeder 5 transfers this Z-value to a sorting processor 100.

The image information feeder 5 has a world memory 1, a geometrical transformation circuit 2 an operating section 3 and a main CPU circuit 4.

In the world memory 1, all objects are represented as an aggregate of the plural polygons. End point information indicative of respective end points of a polygon are stored to this world memory 1.

The operating section 3 is constructed by a handle, an accelerator, a brake, etc. An operation of this operating section 3 is converted to an electric signal and this electric signal is outputted to the main CPU circuit 4.

The main CPU circuit 4 receives operating signals indicative of various kinds of operating states outputted from the operating section 3. For example, the main CPU circuit 4 receives information such as "an automobile is accelerated", "the automobile hit against a guard rail", and "the automobile is turned along a road". The main CPU circuit 4 calculates situation data in accordance with these information and outputs the situation data to the geometrical transformation circuit 2.

The geometrical transformation circuit 2 calculates a scene visible to a driver in accordance with the present position of the automobile calculated by the main CPU circuit 4 with reference to various kinds of polygonal data stored to the world memory 1. The geometrical transformation circuit 2 outputs end point information of a polygon geometrically deformed in accordance with this scene to the polygonal coordinate memory 20. Namely, the geometrical transformation circuit 2 geometrically transforms vertex coordinates of each of polygons by a transparent projecting transformation and outputs transformed two-dimensional coordinates (X, Y) to the polygonal coordinate memory 20.

In such a transparent projecting transformation, a distance between a visual point and each of the polygons is calculated in advance. Then, it is judged whether or not each of the polygons calculated by the transparent projecting transformation is located within a visual field of the driver, i.e., a visual field on the screen. With respect to a polygon located within the visual field, a typical value of the distance from the visual point to this polygon is determined. A small Z-value is determined as a polygon having a small typical value of this distance, i.e., as a polygon having a high priority. The Z-value is outputted to the polygonal coordinate memory 20 and the sorting processor 100 as a polygon having a higher priority in the order of a polygon having a smaller Z-value.

Figure 5:
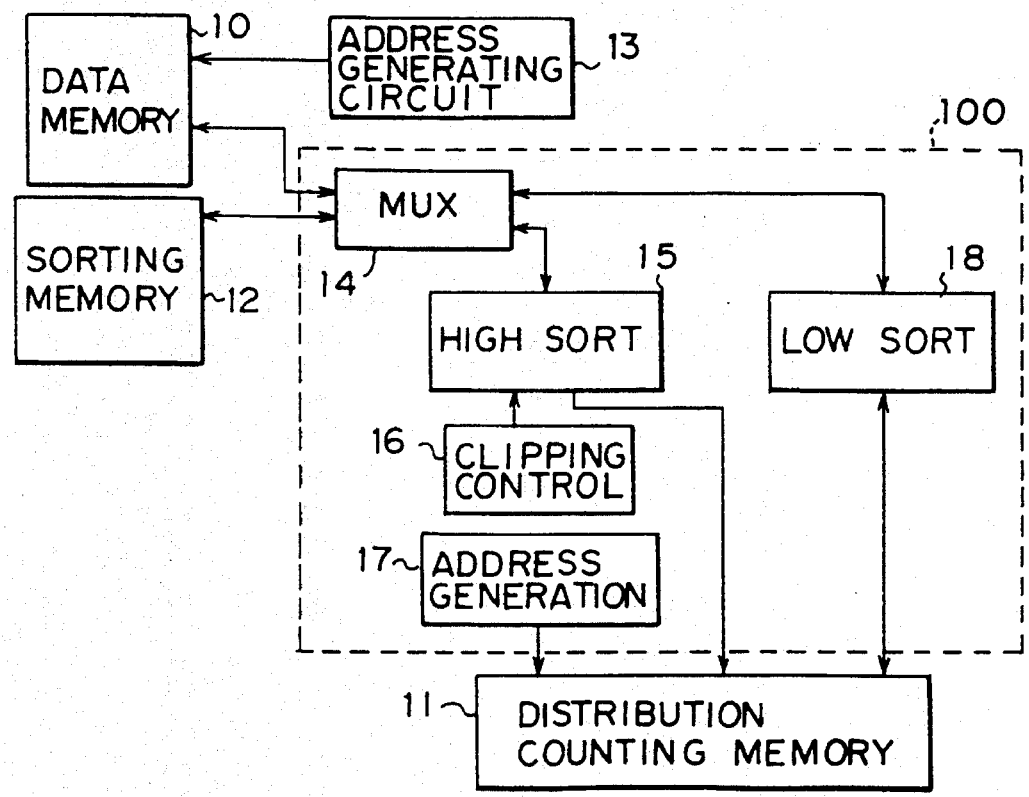
FIG. 5 is a block diagram showing the construction of a sorter in accordance with a first embodiment of the present invention.
Figure 6:
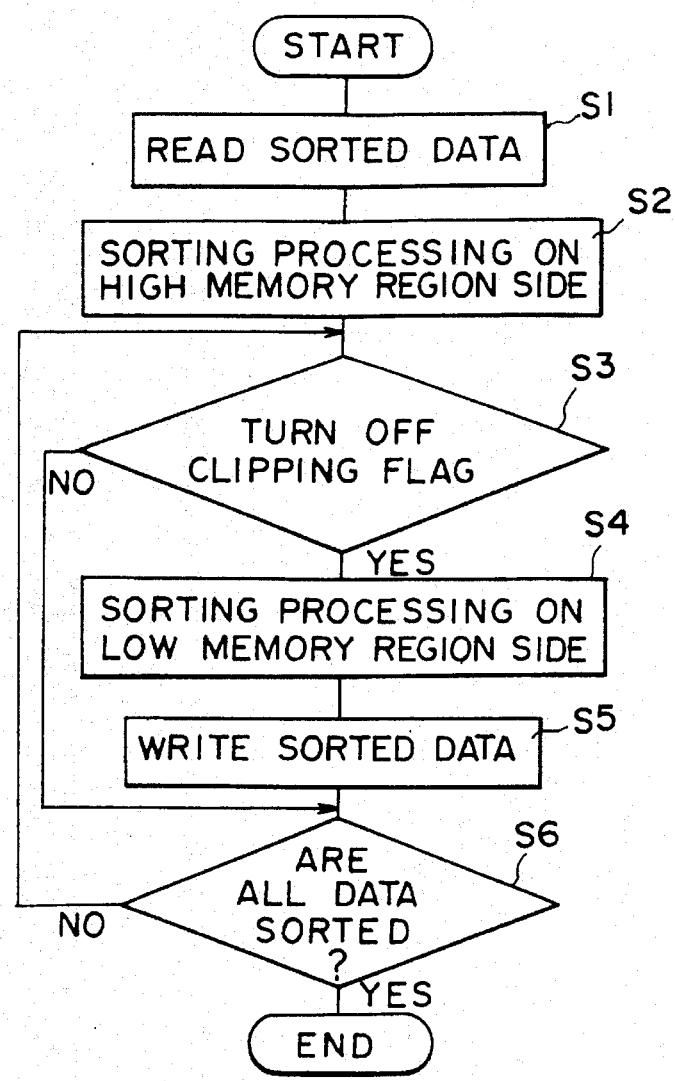
FIG. 6 is a flow chart showing a sorting operation of the sorter in the first embodiment of the present invention.
Figure 7:
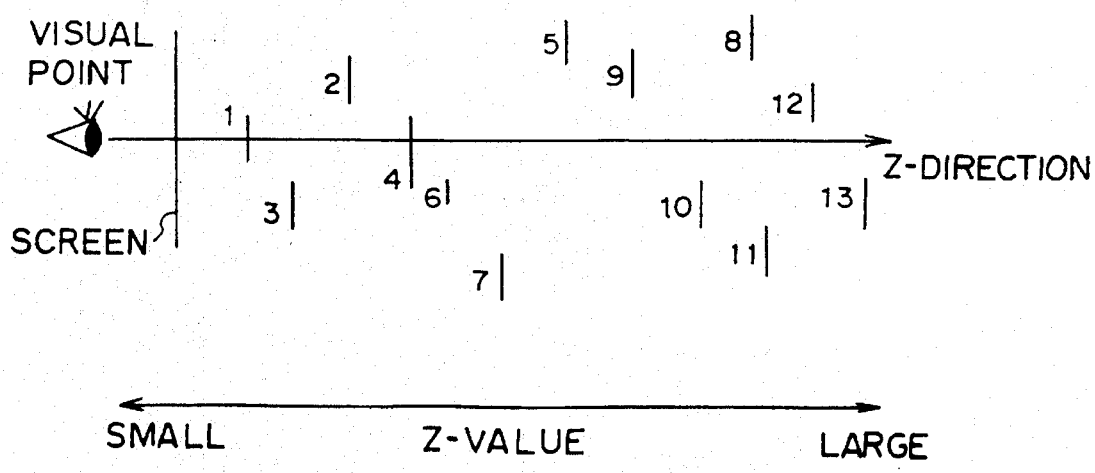
FIG. 7 is a typical view showing the concept of sorting processing.

The Z-value every polygon calculated by the image information feeder 5 is transferred to the sorting processor 100 used in the present invention. As shown in FIGS. 5 and 6, after the sorting processor 100 receives Z-values of all the polygons, the sorting processor 100 performs a sorting operation in the order of a small Z-value showing that a polygon having this Z-value is nearer the screen. Polygonal addresses are arranged in the order of a small Z-value and are written to a sorting address region.

In a polygonal coordinate calculation of the sorting processor 100, information of each of the polygons is written to an internal memory and sorted data of this information are transmitted to a polygonal image processing circuit 30.

The polygonal image processing circuit 30 receives a polygonal address in the order of a small Z-value from the sorting address region of the sorting processor 100. The polygonal image processing circuit 30 performs image processing using information of X and Y addresses of the polygonal coordinate memory 20 indicated by this polygonal address. Then, the polygon is displayed by a CRT 40.

The sorter in accordance with a first embodiment of the present invention will next be described in detail. FIG. 5 is a block diagram showing an entire construction of the sorter.

This sorter has a data memory 10, a sorting circuit 100, a distribution counting memory 11 and a sorting memory 12.

Figure 8:
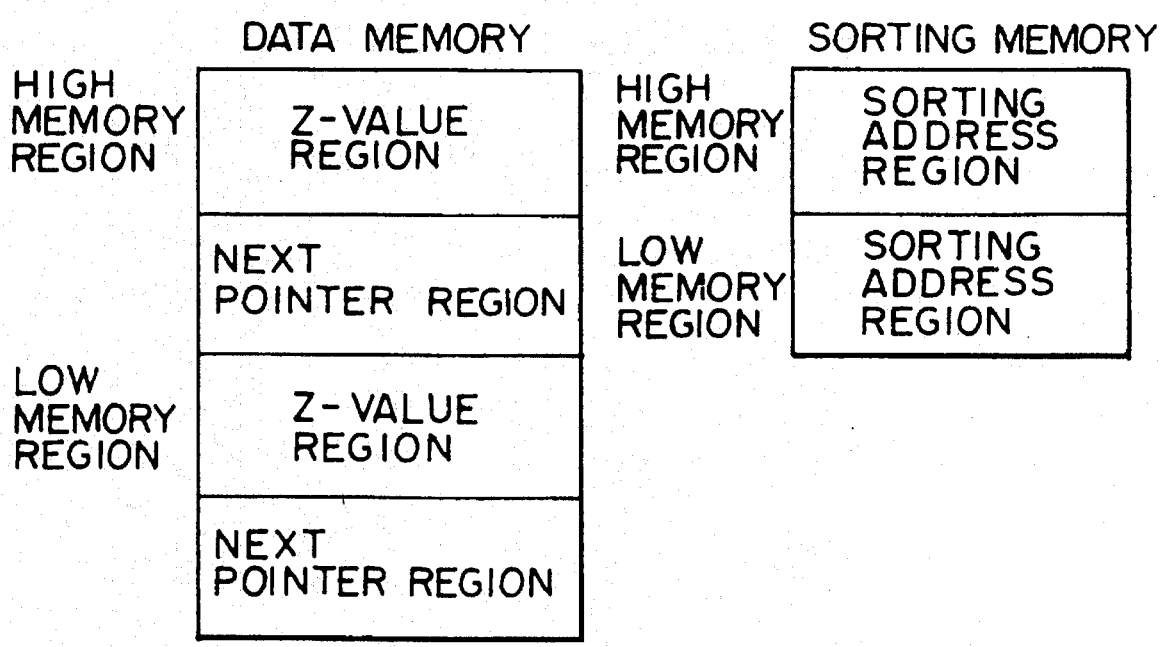
FIG. 8 is a typical view showing address regions of a data memory and a sorting memory used in the first embodiment of the present invention.
Figure 21:
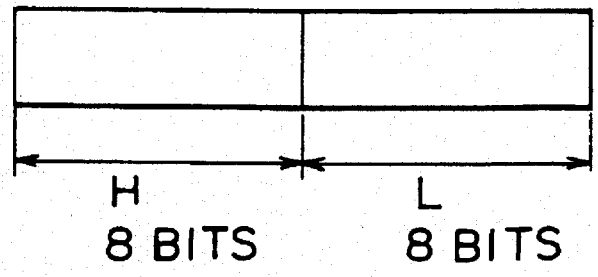
FIG. 21 is a typical view showing an example of sorted data.

The data memory 10 has a memory region for storing Z-value data from 1 to N designated by an address generating circuit 13. As shown in FIG. 8, this memory region is generally divided into high (H) and low (L) memory regions. Each of the high and low memory regions is divided into a Z-value region for storing the Z-value data and a next pointer region for storing a next address and accompanied with the Z-value region. Upper and lower position data of reference value data are respectively stored to the high and low memory regions. When the Z-value data are constructed by 16 bits as shown in FIG. 21, upper and lower 8 bit data of the reference value data are respectively stored to the high and low memory regions. A data number generated by a data number generating means and corresponding to the inputted Z-value data is stored to the data memory 10.

As shown in FIG. 8, a sorting memory 12 has a sorting address region for storing sorted results. This sorting memory 12 also has high and low divided memory regions similar to those in the data memory 10. A sorted data number is stored to this sorting memory 12 in a sorting order.

A pointer value showing the same address data is stored to the next pointer region of the data memory 10. An address value showing a small Z-value is stored to the sorting address region of the sorting memory 12 in the order of a small address.

The sorting circuit 100 uses the distribution counting memory 11 as a working memory with respect to a Z-value inputted from the data memory 10 through a multiplexer 14. The sorting circuit 100 writes addresses respectively sorted into the high and low memory regions for Z-values through the multiplexer 14 to sorting address regions of the sorting memory 12 in the high and low memory regions.

Figure 9:
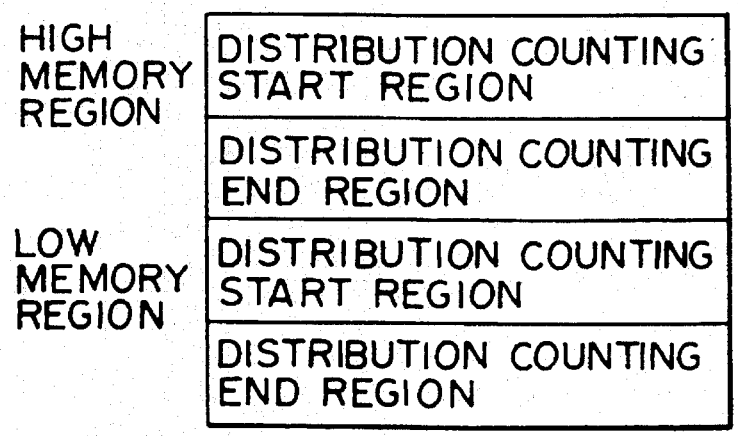
FIG. 9 is a typical view showing address regions of a distribution counting memory used in the first embodiment of the present invention.

As shown in FIG. 9, similar to the data memory 10, the distribution counting memory 11 is divided into high and low memory regions. Each of the high and low memory regions is divided into a distribution counting start region and a distribution counting end region. In this embodiment, the distribution counting memory 11 has addresses 0 to 255 corresponding to 8 bit data stored to each of the Z-value regions of the data memory 10. The distribution counting memory 11 has a top address of these addresses in the distribution counting start region and has an ending address of these addresses in the distribution counting end region.

In a clipping control circuit 16, a deleted Z-value region is designated in advance to perform the three-dimensional clipping or picking operation mentioned above. The clipping control circuit 16 transmits this designated region to a high sorting processing circuit 15.

The high sorting processing circuit 15 writes data to the high memory region of the distribution counting memory 11 and the next pointer region in the high memory region of the data memory 10 in sorting processing of data stored to the data memory 10 in its high memory region. The high sorting processing circuit 15 judges whether a sorted region is a region to be clipped or not. An operation of the high sorting processing circuit 15 is controlled such that no sorting processing is performed in a low sorting processing circuit 18 with respect to the region to be clipped.

The low sorting processing circuit 18 writes data to the high memory region of the distribution counting memory 11 and the next pointer region in the low memory region of the data memory 10 in sorting processing of data stored to the data memory 10 in its low memory region.

A sorting operation of the sorter in the first embodiment of the present invention will next be described. FIG. 6 is a flow chart showing this sorting operation.

When a plurality of reference axis data (or Z-value data) to be sorted are inputted from the image information feeder 5 to the sorter, data numbers 1 to N corresponding to these reference value data are allocated in an input order from 1 to N. In a step S1, upper 8 bit data of the reference axis data as reference value data are sequentially stored to high memory regions 1 to N addressed by a data number pointer in the address generating circuit. Further, lower 8 bit data of the reference value data are sequentially stored to low memory regions 1 to N addressed by the data number pointer.

When the plural Z-value data to be sorted are completely stored into the data memory 10, sorting processing is performed by the high sorting processing circuit 15 in the high memory region in a step S2. In this sorting processing in the high memory region, the Z-value data stored to a high memory region are sequentially read out of the data memory 10 in the data number order from 1 to N, and are outputted to the distribution counting start and end regions of the distribution counting memory 11.

In this embodiment, the Z-value data are sequentially read by sequentially outputting data numbers as read addresses of the data number pointer in the order from 1 to N.

When an address is designated by a data number, the Z-value data are read from a high memory region for designated Z-value data to the distribution counting start and end regions of the distribution counting memory 11.

The distribution counting start and end regions of the distribution counting memory 11 have regions one-to-one corresponding to all allowable values of the Z-value data.

When upper bits of the Z-value data are constructed by 8 bits as in this embodiment, a total of 256 values from 0 to 255 can be allowed.

Accordingly, 256 memory areas respectively designated by addresses from 0 to 255 are disposed in the distribution counting start and end regions of the distribution counting memory 11.

The data number of the Z-value data outputted from the data memory 10 is written to the distribution counting start and end regions of the distribution counting memory 11. In this embodiment, the data number is represented by one of numbers 1 to N and the maximum data number is represented by number N.

When a Z-value is inputted from the data memory 10 to the distribution counting start and end regions of the distribution counting memory 11, the distribution counting memory 11 writes a data number indicative of this Z-value to a memory region designated by a corresponding address pointer of an address generating circuit 17 in each of the distribution counting start and end regions.

In this embodiment, the data number is written as follows. Namely, the Z-value data are set to an address pointer of the address generating circuit 17 when the Z-value data having the data number designated by the data number pointer of the address generating circuit 13 are outputted from the data memory 10. This address pointer outputs these set Z-value data as a write address. The data number designated by the data number pointer and corresponding to the Z-value is written to the distribution counting start and end regions of the distribution counting memory 11 designated by this write address.

When the data number is once stored to the distribution counting start region of the distribution counting memory 11, no new data number is updated even when new Z-value data having the same Z-value are sequentially outputted from the data memory 10. In contrast to this, when the data number is once stored to the distribution counting end region, the new data number indicative of the Z-value is updated and stored to this end region when the same Z-value is next outputted from the data memory 10.

A data number provided at the time of a first occurrence of the Z-value is stored to the distribution counting start region. In contrast to this, a data number provided at the time of a final occurrence of the Z-value is stored to the distribution counting end region.

When contents of the distribution counting end memory are updated and recorded, a data number before updating and recording of these contents is set to an address pointer and an address is designated in a next pointer region of the data memory 10. A new data number after updating is written to the designated next pointer region.

Therefore, a next pointer region is disposed as a memory region for holding the next accessed address within the data memory 10.

The Z-value is read out of the data memory 10 and the data number is set in the distribution counting start or end region of the distribution counting memory, or the next pointer region of the data memory 10. Namely, the data number in the next pointer region is set to an address value shown in the distribution counting end region when the Z-value data are read and the data number thereof is written, and when a distributing counting start value of the distribution counting memory 11 is already set. This next pointer region is set when the distribution counting start and end regions are set.

In sorting processing of data, a data value in the distribution counting start region is read from a minimum address of the distribution counting memory 11. If a next pointer is set, next pointer values are chained and read.

Further, the relation between the high and low memory regions of the data memory 10 and the distribution counting memory 11 is provided as follows in this embodiment. First, data are stored to the distribution counting start and end regions and the next pointer region in the high memory regions. Thereafter, the above sorting processing is performed with respect to these data in the high memory regions. The sorted data are set as mentioned above in the distribution counting start and end regions and the next pointer region in the low memory regions.

Therefore, the same data number is written to the same address in each of the distribution counting start and end regions when the same Z-value is outputted from the data memory 10 only at one time. In contrast to this, when the same Z-value is outputted from the data memory 10 plural times, a different data number is finally stored to the same address in each of the distribution counting start and end regions.

Accordingly, when the data number is updated and recorded plural times to the distribution counting end region of the distribution counting memory 11, an arrangement of data numbers with respect to the respective reference value data is known when the reference value data are sorted in an ascending or descending order if how to update the data number is known.

When the data number is thus updated and recorded to the distribution counting end region, historical contents of the updating operation are sequentially written to the next pointer regions within the data memory 10.

As mentioned above, in the present invention, when Z-value data are outputted from the data memory 10 in a data number order, the data number is written to the distribution counting start and end regions with the outputted Z-value data as a write address. Further, the Z-value data are transferred and written to the next pointer region of the data memory 10 from the distribution counting end region.

When such a data transferring operation is started, the high sorting processing circuit 15 controls the transferring operation as follows.

First, the data number stored to the distribution counting end region is set to the address generating circuit 13. Next, a data number in a distribution counting start region having a predetermined relation corresponding to a designated address is written to a next pointer region addressed by the address generating circuit 13.

Such a writing operation with respect to the data number in sorting the reference value data in the ascending order is slightly different from that in the descending order. In the following description, the reference value data are sorted in the ascending order as one example.

For example, when a data number is stored to a distribution counting end region designated by address 0, the data number stored at address 0 is first set to an address pointer.

Then, a data number is read out of a distribution counting start region designated by address 1 and is then written to a next pointer region of the data memory 10 designated by the address pointer.

At this time, when no data number is stored to the distribution counting start region designated by address 1, a data number is read out of a memory area designated by address 2 and is then written to the next pointer region of the data memory 10. When no data number is stored to the distribution counting start region designated by address 2, the number of addresses is sequentially incremented such as address 3, address 4, - - - until the data number is found.

When the data number is read out of a memory area designated by address K, this data number is written to the next pointer region of the data memory 10 designated by the address pointer.

When such reading and writing operations are completed, the data number is next read out of a distribution counting end region designated by address K. Similar to the above-mentioned case, data are written to the next pointer region of the data memory 10 with this data number as a write address.

In this embodiment, the sorter repeatedly writes the data number to the next pointer region for recording such a chain data number. When the sorting operation in the high memory region is completely performed with respect to the upper 8 bit data in the data memory 10, the sorted results are stored to the high memory region of the sorting memory 12 as a sorting address.

In this embodiment, it is judged in a step S3 whether there is a memory region designated by the clipping control circuit 16 or not. For example, sorting processing is performed in the ascending order in the range of values from 0 to N on a high memory region side. Then, data at address 0 on the high memory region side are read and it is judged whether these data are clipped or not. When these data are clipped, no sorting operation in the low memory region is performed with respect to lower 8 bit data, and the next processing corresponding to a Z-value in the high memory region is performed.

An address read out of a sorting address region in the high memory region of the sorting memory 12 corresponds to a data number of the data memory 10. When data at address 0 are read out of this high memory region and no clipping operation is performed in this high memory region, the sorting operation is performed in the low memory region of the sorting memory 12 in a step S4.

In the low sorting processing circuit 18, Z-value data stored into the low memory region of the above data memory 10 are read therefrom. The read Z-value data are stored to the distribution counting start and end regions of the distribution counting memory 11. Similarly, the read Z-value data are similarly stored to the next pointer region in the low memory region of the data memory 10. This operation is similar to the above data writing operation in the high memory regions. Namely, in data writing processing in the high memory regions, the high memory region of the data memory 10 and the high memory region about the distribution counting start and end regions of the distribution counting memory 11 are used to write chained data to the next pointer region of the data memory 10. In contrast to this, in data writing processing in the low memory regions, Z-value data are read out of the low memory region of the data memory 10 by using data sorted by the sorting processing on the high memory region side. A data number is stored to each of the distribution counting start and end regions in the low memory region of the distribution counting memory 11 in accordance with these read Z-value data. Then, the chained data are written to the next pointer region in the low memory region of the data memory 10. Then, a distribution counting start value is read from a minimum address of the distribution counting memory 11. If data are set in the next pointer region, a next pointer value is chained and sorting processing is performed.

Namely, in the present invention, the sorting processing is first performed with respect to upper 8 bit data in the high memory region. When this sorting processing is performed, it is judged whether the upper 8 bit data must be clipped or not. The next sorting processing on the low memory region side is performed with respect to the upper 8 bit data not required to be clipped. The sorting processing in the low memory region is similar to that in the high memory region so that the sorting operation is completed. In a step S5, the sorted results are written to a sorting address region in the low memory region of the sorting memory 12. Then, it is judged whether all the data are sorted or not. It is judged whether the clipping operation is required or not and the sorting operation on the low memory region side is repeatedly performed until all the data are sorted.

When all the data are completely sorted, the operation of the sorter is completed.

The next description relates to a case in which 16 Z-value data outputted from the image information feeder 5 are sorted as one example in the ascending order by using such a sorting circuit.

In this embodiment, to sort 16 Z-value data, it is sufficient to construct the data memory 10 such that this data memory 10 has Z-value regions in high and low memory regions designated by data numbers 1 to 16. As mentioned above, the Z-value data are constructed by 8 bits×2 composed of 8 bits in the high memory region and 8 bits in the low memory region.

For example, the upper 8 bit data in the high memory region are sequentially inputted to the data memory 10 from the image information feeder 5 in the order of 1, 2, 4, 5, 3, 0, 0, 1, 5, 6, 7, 9, 10, 1, 2 and 1. The inputted Z-value data are written to a memory area in the high memory region for sequentially addressing data numbers 1, 2, 3, - - -.

For example, the lower 8 bit data in the low memory region are sequentially inputted to the data memory 10 from the image information feeder 5 in the order of 5, 6, 3, 1, 5, 4, 10, 2, 8, 5, 7, 1, 1, 2, 7 and 5. The inputted Z-value data are written to a memory area in the low memory region for sequentially addressing data numbers 1, 2, 3, 4, 5, - - -.

When the Z-value data are thus written to the low and high memory regions within the data memory 10, the Z-value data are sorted by using the data numbers instead of the Z-value data.

Thus, it is possible to sort the Z-value data at a high speed by a simplified circuit even when the number of digits about the sorted Z-value data is large.

In this embodiment, when a Z-value is written to the data memory 10, the Z-value is sequentially read out of the data memory 10 in a data number order.

FIG. 22 is a table showing a state in which the Z-value data transferred from the image information feeder 5 are written to the data memory 10.

In this embodiment, when the Z-value data are written into the data memory 10, the Z-value data are sequentially read out of this data memory 10 in the data number order. First, only Z-value data in the high memory region are read out of the data memory 10 and sorting processing is performed in the high memory region as shown in FIGS. 23 to 38.

As shown in FIG. 23, when Z-value data 1 specified by address 1 as data number 1 is first outputted from the data memory 10, data number 1 is written to the distribution counting start and end regions with the Z-value data 1 as an address.

The sorting processing is continuously performed with respect to the high memory region of the data memory 10. As shown in FIG. 24, data number 2 is inputted to the distribution counting start and end regions by setting Z-value data 2 specified by the data number (i.e., data memory address) 2 to an address. Subsequently, as shown in FIG. 25, when Z-value data 4 specified by data number 3 (i.e., data memory address 3) is outputted from the data memory 10, data number 3 is inputted to the distribution counting start and end regions with the Z-value data 4 as an address.

Similarly, as shown in FIGS. 26 to 28, each of data numbers 4 to 6 is sequentially stored to the distribution counting start and end regions.

As shown in FIG. 29, data number 6 is inputted to the distribution counting start and end regions by setting Z-value data 0 specified by data number (i.e., data memory address) 7 to an address. At this time, no new data number is written to the distribution counting start region since the data number is already written to this distribution counting start region. In contrast to this, the previous data number 6 is updated to a new data number 7 in the distribution counting end region, and this updated data number 7 is recorded to the distribution counting end region. Therefore, the updated data number 7 is written to a next pointer region of the data memory 10 with the data number 6 before update as an address.

Next, as shown in FIG. 30, data number 1 is inputted to the distribution counting start and end regions by setting Z-value data 1 specified by data number (i.e., data memory address) 8 to an address. At this time, no new data number is written to the distribution counting start region since the data number is already written to this distribution counting start region. In contrast to this, the previous data number 1 is updated to a new data number 8 in the distribution counting end region, and this updated data number 8 is recorded to the distribution counting end region. Therefore, the updated data number 8 is written to the next pointer region of the data memory 10 with the data number 1 before update as an address.

As shown in FIG. 31, Z-value data 5 specified by data number (i.e., data memory address) 9 is read out of the data memory 10. Data number 4 is inputted to the distribution counting start and end regions with the Z-value data 5 as an address. At this time, no new data number is written to the distribution counting start region since the data number is already written to this distribution counting start region. In contrast to this, the previous data number 4 is rewritten to a new data number 9 in the distribution counting end region, and this rewritten or updated data number 9 is recorded to the distribution counting end region. Therefore, the updated data number 9 is written to the next pointer region of the data memory 10 with the data number 4 before update as an address.

Similarly, as shown in FIGS. 32 to 38, Z-value data specified by each of data numbers (i.e., data memory addresses) 9 to 16 are read out of the data memory 10. A data number is written to the distribution counting start and end regions by setting the read Z-value data to an address. When the data number is already written to the distribution counting start region, the data number before update is set at the above address in the distribution counting start region without rewriting the data number. An updated data number is written to the next pointer region. FIG. 38 shows sorted results with respect to only the high memory region.

In such a sequential writing operation, a data number provided at the time of a first occurrence of each of Z-values is written to the distribution counting start region with Z-value data as an address.

A data number provided at the time of a final occurrence of each of the Z-values is stored to the distribution counting end region with Z-value data as an address.

Further, an updated data number is sequentially written to the next pointer region with the data number before update as an address every time the data number is updated and stored to the distribution counting end region. Accordingly, when the same Z-value data are outputted from the data memory 10 plural times, the historical contents of output of the Z-value data in a data number order are recorded into this next pointer region.

When the Z-value data are thus read out of the data memory 10, a corresponding data number is written to the distribution counting start and end regions of the distribution counting memory 11 with a read Z-value as an address. Accordingly, when Z-value data 1 specified by data number 1, i.e., by data memory address 1 is first outputted from the data memory 10, data number 1 is written to the distribution counting start and end regions with the Z-value data 1 as an address.

When a Z-value in the high memory region is set to 0, Z-value data are sorted as follows with reference to FIG. 39. First, a data number at address 0 in the distribution counting start region in the high memory region is read out of the distribution counting memory 11. In this case, the data number at this address 0 is set to 6 so that number 6 is written to a sorting address.

Then, a next pointer designated by data number (data memory address) 6 in the high memory region is read and a region for this next pointer shows value 7. Accordingly, a next pointer designated by data number (i.e., data memory address) 7 is read. In this case, no data are written to this next pointer designated by data number (data memory address) 7 so that this data number 7 is written to a sorting address. As a result, all data corresponding to Z-value 0 in the high memory region have been written to the sorting addresses. After the counting value of a counter CNTX is set to 2 as the number of data (composed of 6 and 7) at the sorting addresses, data processing with respect to the low memory region is next performed.

When data number (Z-value) 4 as data L specified by data number (i.e., data memory address) 6 in the low memory region is read out of the data memory 10, number 6 is written to the distribution counting start region and the distribution counting end region with this data number 4 as an address.

When data number 10 specified by data number (i.e., data memory address) 7 is outputted from the low memory region of the data memory 10, number 7 is written to the distribution counting start and end regions with this data number 10 as an address. The sorting operation is completed in the low memory region with respect to the Z-value 0 in the high memory region, and the counting value of a counter CNTX2 is set to the number 2 of data (composed of 6 and 7) at the sorting addresses in the low memory region.

When the high memory region has Z-value 1, Z-value data are sorted as follows in the low memory region with reference to FIG. 40.

Data number 1 designated by address 1 in the distribution counting start region is written to sorting address 1. Then, a next pointer written to this address (i.e., data memory address) 1 is read out of the data memory 10. In this case, data number 8 is written to this next pointer so that data number 8 is written to a sorting address. Further, data number 14 written to sorting address (data memory address) 8 is read out of the next pointer region. This data number 14 is written to a sorting address. Data number 16 of a next pointer designated by the data number (i.e., data memory address) 14 is written to a sorting address. Since no data are written to the next pointer at sorting address (data memory address) 16, all data corresponding to Z-value 1 in the high memory region have been written to the sorting addresses.

Next, a reading operation in the low memory region with respect to data number 1 written to sorting address 1 in the high memory region is performed. Data number 1 is written to the distribution counting start region at address 5 thereof at which low (L) data (data L) 5 written to data number (data memory address) 1 in the low memory region is set to an address. Then, the reading operation in the low memory region with respect to data number 8 written to data memory address 2 in the high memory region is performed. Data number 8 is written to the distribution counting start and end regions in which Z-value 2 specified by data number (data memory address) 8 is set to an address. Then, Z-value 2 specified by data memory address 14 in the low memory region is called and data number 14 is inputted to the distribution counting start and end regions in which the Z-value 2 is set to an address. At this time, no data number is rewritten in the distribution counting start region since the data number is already written to this distribution counting start region. In contrast to this, the previous data number 8 is rewritten to a new data number 14 in the distribution counting end region. Therefore, the updated data number 14 is written to the next pointer region of the data memory 10 with the data number 8 before update as an address.

A data calling operation is then performed in the distribution counting start region with respect to sorting address 16 as a data memory address. A data number designated by the data memory address 16 is set to 5 in the low memory region and data number 1 is written to the distribution counting start and end regions with the data number 5 as an address. At this time, no data number is rewritten in the distribution counting start region since the data number is already written to this distribution counting start region. In contrast to this, the previous data number 1 is updated to a new data number 16 in the distribution counting end region and this updated data number 16 is written to the distribution counting end region. Accordingly, the updated data number 16 is written to the next pointer region of the data memory 10 with the data number 1 before update as an address.

L data at sorting address (i.e., data memory address) 3 in the low memory region show data number 8 written to the distribution counting start region at address 2 thereof. The distribution counting end region shows data number 14 at address 2 thereof. Accordingly, data number 14 written to the next pointer region with respect to data number (i.e., data memory address) 8 in the low memory region is read out of the data memory 10 and is written to a sorting address 4 in the low memory region. Then, data number 1 written to address 5 in the next distribution counting start region is written to a sorting address 5. Since the distribution counting end region shows data number 16, data number 16 written to the next pointer region at address 1 of the data memory 10 is written to a sorting address 6 and the counting value of a counter CNTX2 is set to the number 6 of data (composed of 6, 7, 8, 14, 1, 16) at the sorting addresses in the low memory region. Thus, the sorting operation in the low memory region is completed with respect to the high memory region having Z-value 1.

FIG. 41 shows the case of sorting processing in the low memory region when the high memory region shows Z-value 2. Data numbers 2 and 15 are written to sorting addresses in the high memory region. Data are read out of the low memory region of the data memory 10 at data memory addresses 2 and 15 thereof with respect to these data numbers, Sorting processing with respect to these data is similar to the above-mentioned sorting processing. Sorted data are written as shown in FIG. 41.

FIG. 42 shows sorting processing in the low memory region when the high memory region shows Z-value 3. FIG. 43 shows sorting processing in the low memory region when the high memory region shows Z-value 4. FIG. 45 shows sorting processing in the low memory region when the high memory region shows Z-value 6. FIG. 46 shows sorting processing in the low memory region when the high memory region shows Z-value 7. FIG. 47 shows sorting processing in the low memory region when the high memory region shows Z-value 9.

FIG. 48 shows sorting processing in the low memory region when the high memory region shows Z-value 10. FIG. 48 shows sorted results after all the sorting processings are completed.

The sorting processings are sequentially completed in the ascending order of Z-value data from sorting address 1 in the low memory region of the sorting memory 12, thereby performing a writing operation about sorted data. Namely, it is possible to sequentially read the sorted data in a smaller Z-value order from address 1 in the low memory region of the sorting memory 12.

Figure 10:
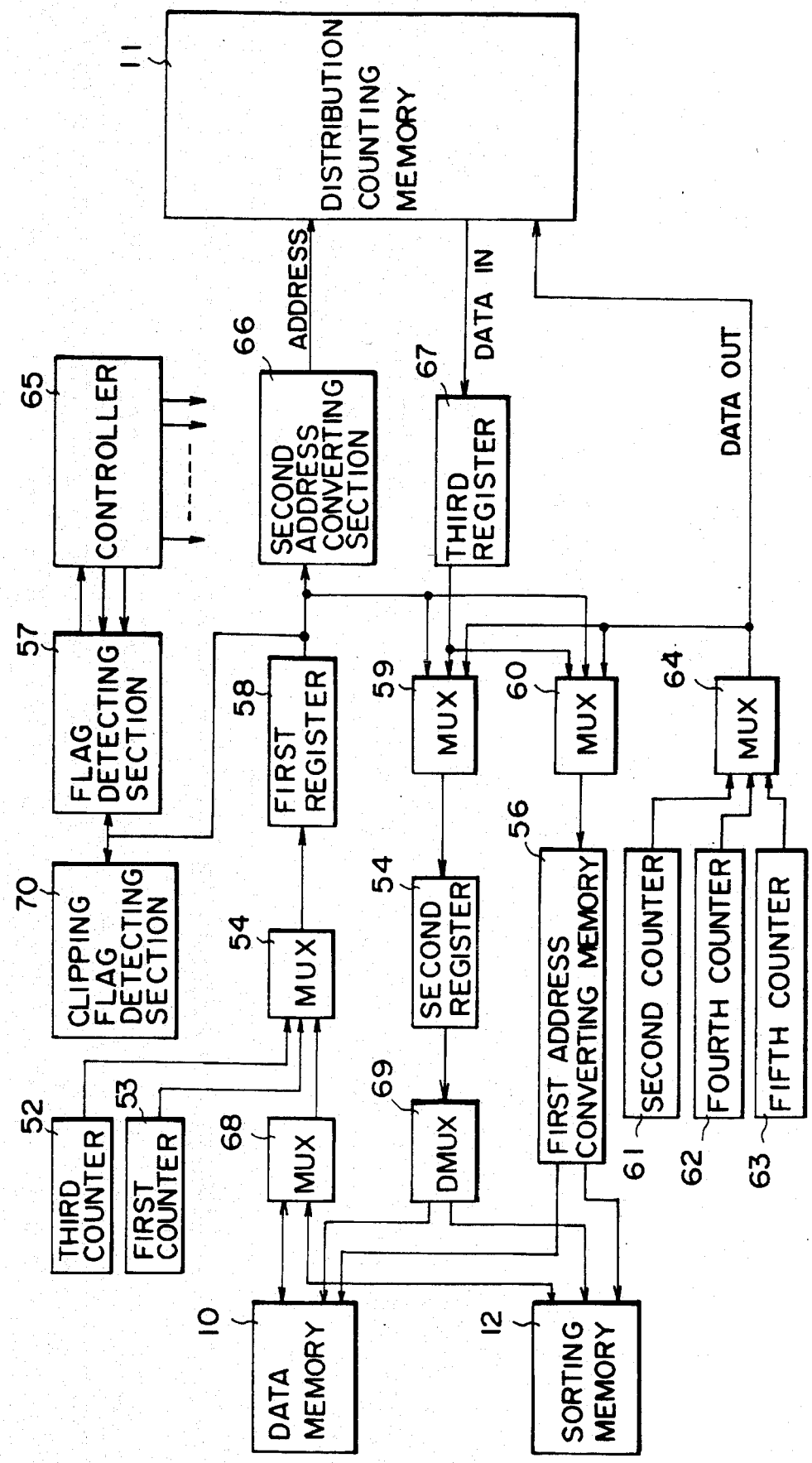
FIG. 10 is a block diagram showing a concrete constructional example of the sorter in the first embodiment of the present invention.

FIG. 10 is a block diagram showing a concrete example of the sorter or the sorting processor in the present invention.

In FIG. 10, a third counter 52 gets access to a flag 2 and a low memory region of a distribution counting memory 11. A first counter 53 gets access to a flag 1 and a high memory region of the distribution counting memory 11. A multiplexer 54 selects predetermined data from input data inputted from the first and third counters 53 and 52 and a data memory 10 through a multiplexer 68. The selected data are transmitted from the multiplexer 54 to a first register 58.

A third register 67 receives data read out of the high and low memory regions of the distribution counting memory 11. These data of the third register 67 are transferred to a multiplexer 59. This multiplexer 59 receives an output of a second address converting section 66. Outputs of second, fourth and fifth counters 61, 62 and 63 are selected by a multiplexer 64 and are transmitted to the multiplexer 59. The multiplexer 59 selects predetermined data from the inputted data and transmits the selected data to a second register 55.

The selected data transmitted to the second register 55 are transferred to predetermined regions of the data memory 10 and a sorting memory 12 through a demultiplexer 69.

A first address converting section 56 outputs an upper address in a high memory region and a lower address in a low memory region in each of the data memory 10 and the sorting memory 12 based on data transmitted from a multiplexer 60.

Figure 18:
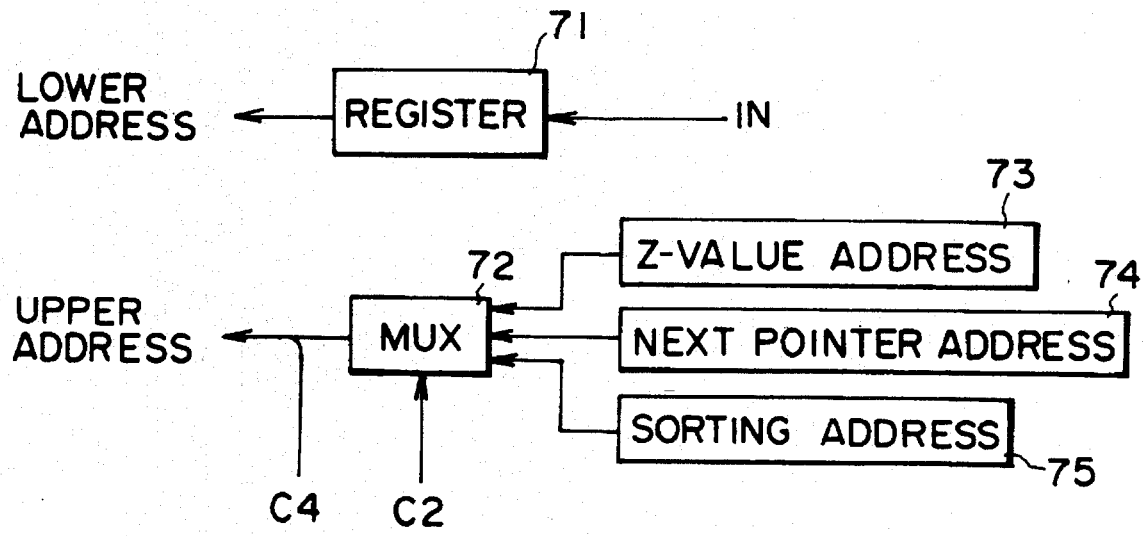
FIG. 18 is a circuit diagram showing the concrete construction of a first address converting section shown in FIG. 10.

As shown in FIG. 18, this first address converting section 56 has registers 71, 73, 74, 75 and a multiplexer 72. The first address converting section 56 outputs the data transmitted from the multiplexer 60 as a lower address. An address value about a Z-value is transmitted to the register 73 by the control operation of a controller 65. An address value of a next pointer is transmitted to the register 74 by the control operation of the controller 65. A sorting address value is transmitted to the register 75 by the control operation of the controller 65. The address value about a Z-value, the address value of a next pointer and the sorting address value are selected and outputted by the multiplexer 72 as an upper address.

The second address converting section 66 outputs an upper address in the high memory region and a lower address in the low memory region in the distribution counting memory 11 based on data transmitted from the first register 58.

Figure 19:
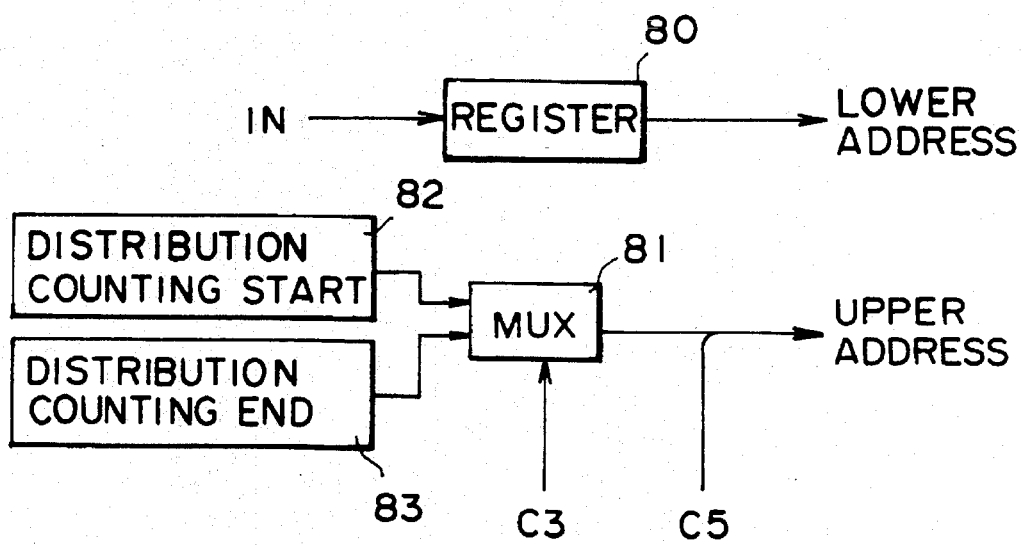
FIG. 19 is a circuit diagram showing the concrete construction of a second address converting section shown in FIG. 10.

As shown in FIG. 19, the second address converting section 66 has registers 80, 82, 83 and a multiplexer 81. The second address converting section 66 outputs the data transmitted from the first register 58 as a lower address. Data values about the distribution counting start and end regions are respectively transmitted to the registers 82 and 83 by the control operation of the controller 65. These data values are selected and outputted by the multiplexer 81 as an upper address. The second address converting section 66 designates the high and low memory regions and switches addresses in the distribution counting start and end regions in a state in which the data transferred from the first register 58 are set as a lower address of the distribution counting memory 11.

A flag detecting section 57 detects whether or not the distribution counting memory 11 has a flag based on an output of the first register 58.

Figure 17:
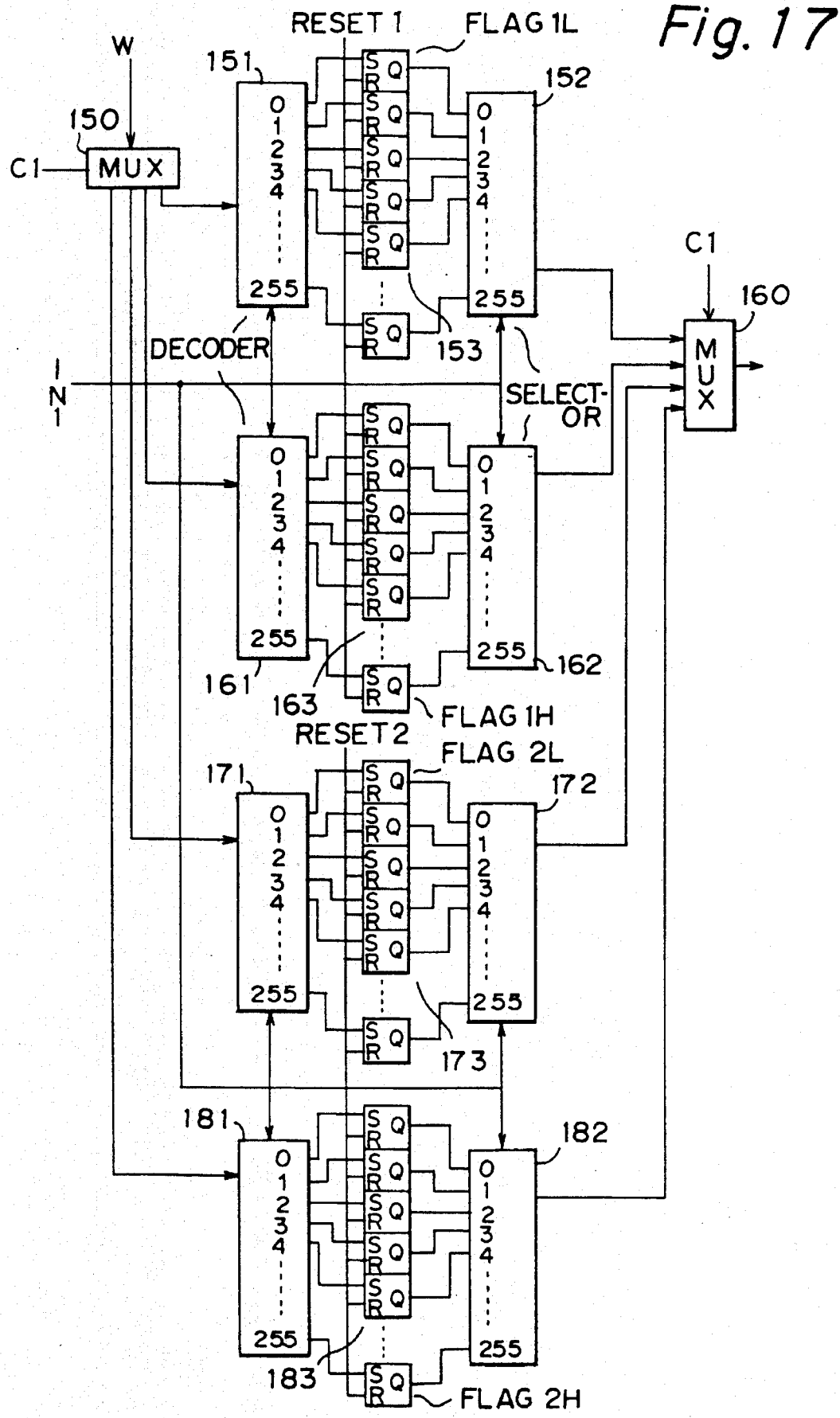
FIG. 17 is a circuit diagram showing the concrete construction of a flag detecting section shown in FIG. 10.

As shown in FIG. 17, the flag detecting section 57 has four groups of flip-flop circuits 153, 163, 173 and 183 having values 0 to 255. In the flip-flop circuit group 153, a flag 1L corresponds to the distribution counting memory 11 with respect to the high memory region. In the flip-flop circuit group 173, a flag 2L corresponds to the distribution counting memory 11 with respect to the low memory region. These flags show whether the distribution counting memory 11 has each of values 0 to 255. Namely, an output C1 of the controller 65 is transmitted to a decoder 151 or 171 through a multiplexer 150 and is decoded by the decoder 151 or 171. The output of a flip-flop circuit is selected by a selector 152 or 172 in accordance with a setting state of the flip-flop circuit group 153 or 173 provided by the decoded output. The selected output is transmitted to a multiplexer 160.

The flip-flop circuit group 163 corresponds to a flag 1H of the distribution counting memory 11. The flip-flop circuit group 183 corresponds to a flag 2H of the distribution counting memory 11. The flip-flop circuit groups 163 and 183 show whether there is one or plural address values. Namely, the output C1 of the controller 65 is transmitted to a decoder 161 or 181 through the multiplexer 150 and is decoded by the decoder 161 or 181. The output of a flip-flop circuit is selected by a selector 162 or 182 in accordance with a setting state of the flip-flop circuit group 163 or 183 provided by the decoded output. The selected output is transmitted to the multiplexer 160.

The high memory region is selected by the output signal C1 of the controller 65. The above flip-flop circuit is selected by a stored value of the third register 67 and is set by a write signal of the controller 65.

The second counter 61 gets access to a Z-value region in the high memory region of the data memory 10 and sorting address regions of the sorting memory 12.

The fourth counter 62 gets access to a sorting address region in the high memory region of the sorting memory 12.

The fifth counter 63 gets access to a sorting address region in the low memory region of the sorting memory 12.

Figure 20:
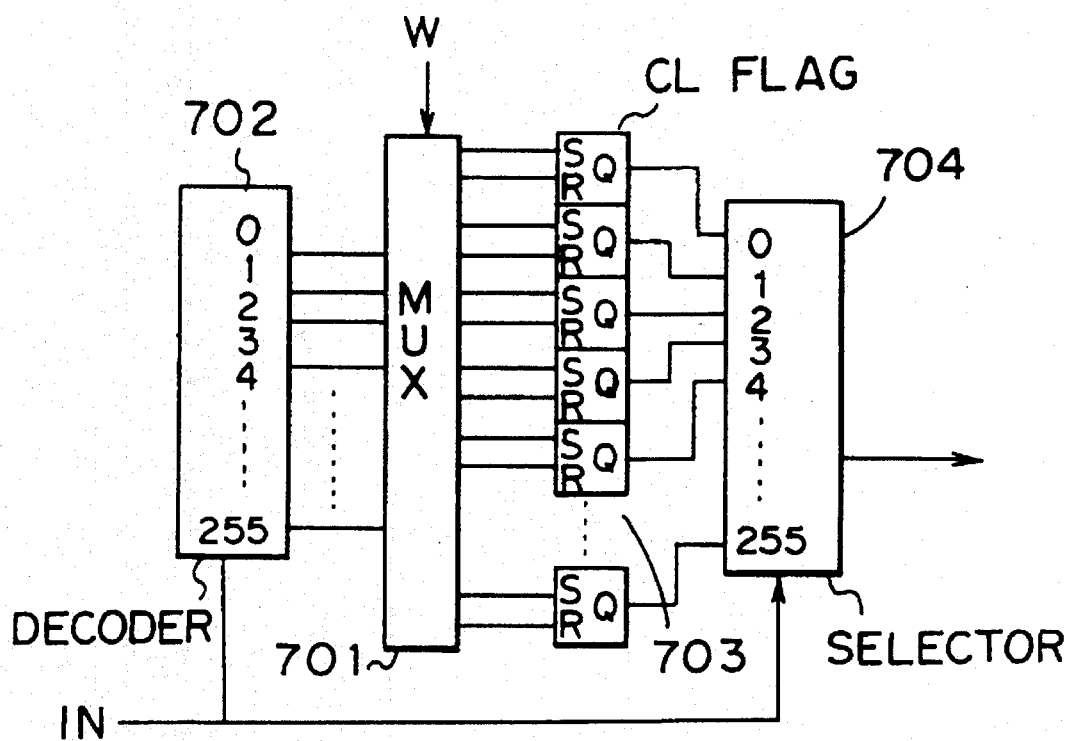
FIG. 20 is a circuit diagram showing the concrete construction of a clipping flag detecting section shown in FIG. 10.

As shown in FIGS. 10 and 20, a clipping flag detecting section 70 has a flip-flop circuit group 703 having values 0 to 255. A flag CL is set in a flip-flop circuit and corresponds to the distribution counting memory 11 with respect to the high memory region. When the flip-flop circuit shows value "1", no sorting processing is required in a memory region corresponding to this value "1". Accordingly, the operation of the sorter is controlled such that no sorting processing is performed at an address having this value "1" in the low memory region. Namely, inputted data are decoded by a decoder 702 and the output of a corresponding flip-flop circuit in the flip-flop circuit group 703 is outputted from a selector 704. If the output of the flip-flop circuit shows value "1", no sorting processing is required in a memory region corresponding to this value "1". Accordingly, the operation of the sorter is controlled such that no sorting processing is performed at an address having this value "1" in the low memory region.

The controller 65 controls the entire operation of the sorter in accordance with flow charts shown in FIGS. 11 to 16.

The operation of the sorter in this embodiment will next be further explained with reference to the flow charts shown in FIGS. 11 to 16.

When the sorter is started, a desirable CL flag in the clipping flag detecting section 57 is set to "1" in a step S10 to set a memory region for clipping.

In a step S11, counting values of the second and third counters 61 and 52 are reset and it proceeds to a step S12. In the step S12, the counting value of the second counter 61 is counted up and it proceeds to a step S13.

In the step S13, a Z-value is read out of the Z-value region in the high memory region of the data memory 10 indicated by the second counter 61. The read Z-value is then set to the first register 58 and it proceeds to a step S14.

In the step S14, it is judged whether the value of a flag 1 indicated by the first register 58 is equal to "0" or not. When the value of the flag 1 is equal to "0", it proceeds to a step S20. In contrast to this, when no value of the flag 1 is equal to "0", it proceeds to a step S15.

In the step S15, it is judged whether the value of the flag 1 indicated by the first register 58 is equal to "1" or not. When the value of the flag 1 is equal to "1", it proceeds to a step S16. In contrast to this, when no value of the flag 1 is equal to "1", it proceeds to a step S35 shown in FIG. 13.

When the value of the flag 1 is judged as "0" in the step S14, it proceeds to the step S20. In the step S20, the counting value of the second counter 61 is written to a distribution counting start region in a high memory region indicated by the first register 58. Then, the value of the flag 1 indicated by the first register 58 is set to "1" and it proceeds to a step S19.

In the step S16, a pointer value at a terminal point is read out of a distribution counting end region in the high memory region indicated by the first register 58. This pointer value is then set to the third register 67 and it proceeds to a step S17. In the step S17, the counting value of the second counter 61 is written to a pointer region in a high memory region indicated by the third register 67 and it proceeds to a step S18.

In the step S18, the counting value of the second counter 61 is written to the distribution counting end region in the high memory region indicated by the first register 58 and it proceeds to a step S19. In the step S19, the counting value of the second counter 61 is compared with a data number. When the counting value of the second counter 61 is smaller than the data number, no sorting processing is completed with respect to all high memory regions. Accordingly, it is returned to the step S12 and the above operation is repeatedly performed. In contrast to this, when the counting value of the second counter 61 is greater than the data number, it proceeds to a step S21.

In the step S21, a counting value of the first counter 53 is counted up and it proceeds to a step S22. In the step S22, the counting value of the first counter 53 is set to the first register 58 and it proceeds to a step S23.

In the step S23, it is judged whether the value of a CL flag indicated by the first register 58 is equal to "1" or not. Otherwise, it is judged whether the value of the flag 1 indicated by the first register 58 is equal to "0" or not. When the value of the CL flag indicated by the first register 58 is equal to "1", or the value of the flag 1 indicated by the first register 58 is equal to "0", it proceeds to a step S32 shown in FIG. 12. In contrast to this, when no value of the CL flag indicated by the first register 58 is equal to "1", or no value of the flag 1 indicated by the first register 58 is equal to "0", it proceeds to a step S24.

In the step S24, the pointer value at the terminal point is read out of the distribution counting start region in the high memory region indicated by the first register 58. This pointer value is then set to the third register 67 and it proceeds to a step S25 shown in FIG. 12. In the step S25, a counting value of the fourth counter 62 is counted up and it proceeds to a step S26. In the step S26, the stored value of the third register 67 is set to a high memory region of the sorting memory 12 indicated by the fourth counter 62.

Then, it proceeds to a step S27. In the step S27, the stored value in the pointer region in the high memory region of the data memory 10 indicated by the third register 67 is read therefrom. This read value is then set to the first register 58 and it proceeds to a step S28.

In the step S28, it is judged whether the stored value of the first register 58 is equal to "0" or not. When the stored value of the first register 58 is equal to "0", it proceeds to the step S32. In contrast to this, when no stored value of the first register 58 is equal to "0", it proceeds to a step S29. In the step S29, the counting value of the fourth counter 62 is counted up and it proceeds to a step S30.

In the step S30, the stored value of the first register 58 is set to a high memory region of the sorting memory 12 indicated by the fourth counter 62 and it proceeds to a step S31. In the step S31, the stored value in the pointer region in the high memory region of the data memory 10 indicated by the first register 58 is read therefrom. This read value is then set to the first register 58 and it is returned to the step S28. This operation is repeatedly performed until the stored value of the first register 58 is equal to "0". When the stored value of the first register 58 is equal to "0", it proceeds to the step S32.

In the step S32, it is judged whether the counting value of the fourth counter 62 is equal to "0" or not. When no counting value of the fourth counter 62 is equal to "0", it proceeds to a step S33. In the step S33, a subroutine for performing a sorting operation in a low memory region is called.

In contrast to this, when the counting value of the fourth counter 62 is equal to "0", it proceeds to a step S34. In the step S34, it is judged whether the counting value of the first counter 53 is greater than 255 or not. When the counting value of the first counter 53 is smaller than 255, it is returned to the step S21 shown in FIG. 11 and the above operation is repeatedly performed. In contrast to this, when the counting value of the first counter 53 is greater than 255, all the operations are completely performed so that the sorting operation of the sorter is completed.

The subroutine for performing a sorting operation in the low memory region will next be described with reference to FIG. 14. When this subroutine is started, the second and third counters 61 and 52 are reset in a step S50 and it proceeds to a step S51. In the step S51, a counting value of the second counter 61 is counted up and it proceeds to a step S52.

In the S52, a sorting address is read out of a sorting address region in a high memory region of the sorting memory 12 indicated by the second counter 61. This sorting address is set to the first register 58.

Then, it proceeds to a step S53. In the step S53, a Z-value is read out of a Z-value region in a low memory region of the data memory 10 indicated by the first register 58. This Z-value is set to the first register 58.

In a step S54, it is judged whether the value of a flag 2 indicated by the first register 58 is equal to "0" or not. When the value of the flag 2 indicated by the first register 58 is equal to "0", it proceeds to a step S60. In the step S60, a counting value of the second counter 61 is written to a distribution counting start region in the low memory region indicated by the first register 58. Then, the value of the flag 2 indicated by the first register 58 is set to "1" and it proceeds to a step S59.

In contrast to this, when no value of the flag 2 indicated by the first register 58 is equal to "0" in the step S54, it proceeds to a step S55. In the step S55, it is judged whether the value of the flag 2 indicated by the first register 58 is equal to "1" or not. When no value of the flag 2 indicated by the first register 58 is equal to "1", it proceeds to a step S39 shown in FIG. 16. In contrast to this, when the value of the flag 2 indicated by the first register 58 is equal to "1", it proceeds to a step S56. In the step S56, the pointer value at a terminal point is read out of a distribution counting end region in the low memory region of the data memory 10 indicated by the first register 58. This pointer value is then set to the third register 67 and it proceeds to a step S57.

In the step S57, the counting value of the second counter 61 is written to a pointer region in a low memory region of the data memory 10 indicated by the third register 67. Then, it proceeds to a step S58. In the step S58, the counting value of the second counter 61 is written to the distribution counting end region in the low memory region indicated by the first register 58. Then, it proceeds to the step S59.

In the step S59, the counting values of the second and fourth counters 61 and 62 are compared with each other. When the counting value of the fourth counter 62 is greater than that of the second counter 61, it is returned to the step S51 and the above operation is repeatedly performed. In contrast to this, when the counting value of the second counter 61 is greater than that of the fourth counter 62, it proceeds to a step S61.

In the step S61, a counting value of the third counter 52 is counted up and it proceeds to a step S62. In the step S62, the counting value of the third counter 52 is set to the first register 58 and it proceeds to a step S63.

In the step S63, it is judged whether the value of the flag 2 indicated by the first register 58 is equal to "1" or not. When the value of the flag 2 indicated by the first register 58 is equal to "1", it proceeds to a step S64 shown in FIG. 15. In contrast to this, when no value of the flag 2 indicated by the first register 58 is equal to "1", it proceeds to a step S72 shown in FIG. 15.

In the step S64, a pointer value at a starting point is read out of the distribution counting start region in the low memory region indicated by the first register 58. This pointer value is set to the third register 67 and it proceeds to a step S65. In the step S65, a counting value of the fifth counter 63 is counted up and it proceeds to a step S66.

In the step S66, the stored value of the third register 67 is set to a low memory region of the sorting memory 12 indicated by the fifth counter 63. Then, it proceeds to a step S67.

In the step S67, the stored value in the pointer region in the low memory region of the data memory 10 indicated by the third register 67 is read therefrom. This read value is then set to the first register 58 and it proceeds to a step S68.

In the step S68, it is judged whether the stored value of the first register 58 is equal to "0" or not. When the stored value of the first register 58 is equal to "0", it proceeds to the step S72. In contrast to this, when no stored value of the first register 58 is equal to "0", it proceeds to a step S69.

In the step S69, the counting value of the fifth counter 63 is counted up and it proceeds to a step S70. In the step S70, the stored value of the first register 58 is set to a sorting address in the low memory region of the sorting memory 12 indicated by the fifth counter 63.

In a step S71, the stored value in the pointer region in the low memory region of the data memory 10 indicated by the first register 58 is read therefrom. The read value is set to the first register 58 and the above operation is repeatedly performed in the step S68 until the stored value of the first register 58 is equal to "0". In contrast to this, when the stored value of the first register 58 is equal to "0" in the step S68, it proceeds to the step S72.

Figure 12:
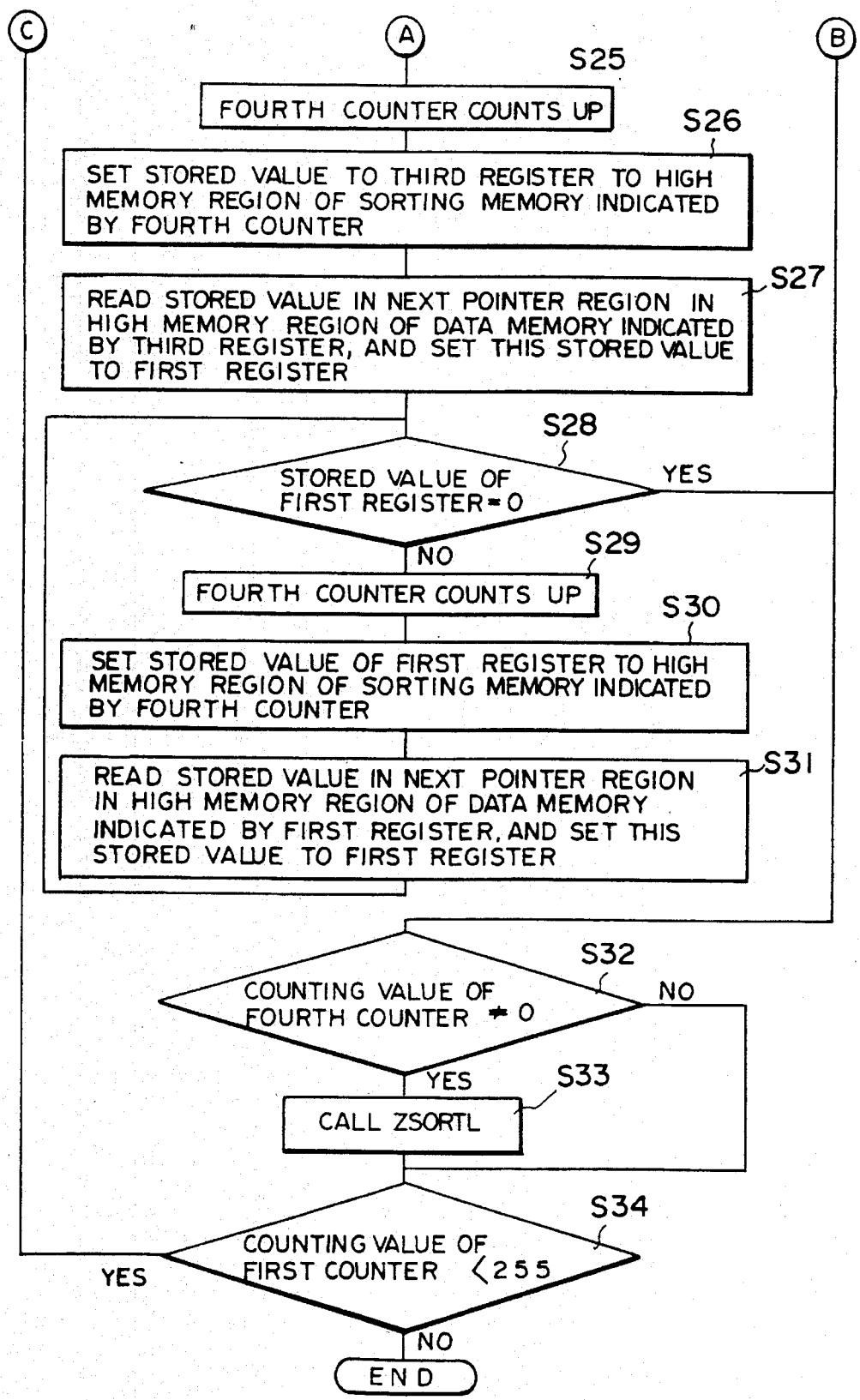
FIG. 12 is a flow chart for explaining the operation of the sorter in the first embodiment of the present invention shown in FIG. 10.

In the step S72, when the counting value of the third counter 52 is equal to 255, this subroutine is completely executed so that it is returned to the step S34 shown in FIG. 12.

Figure 16:
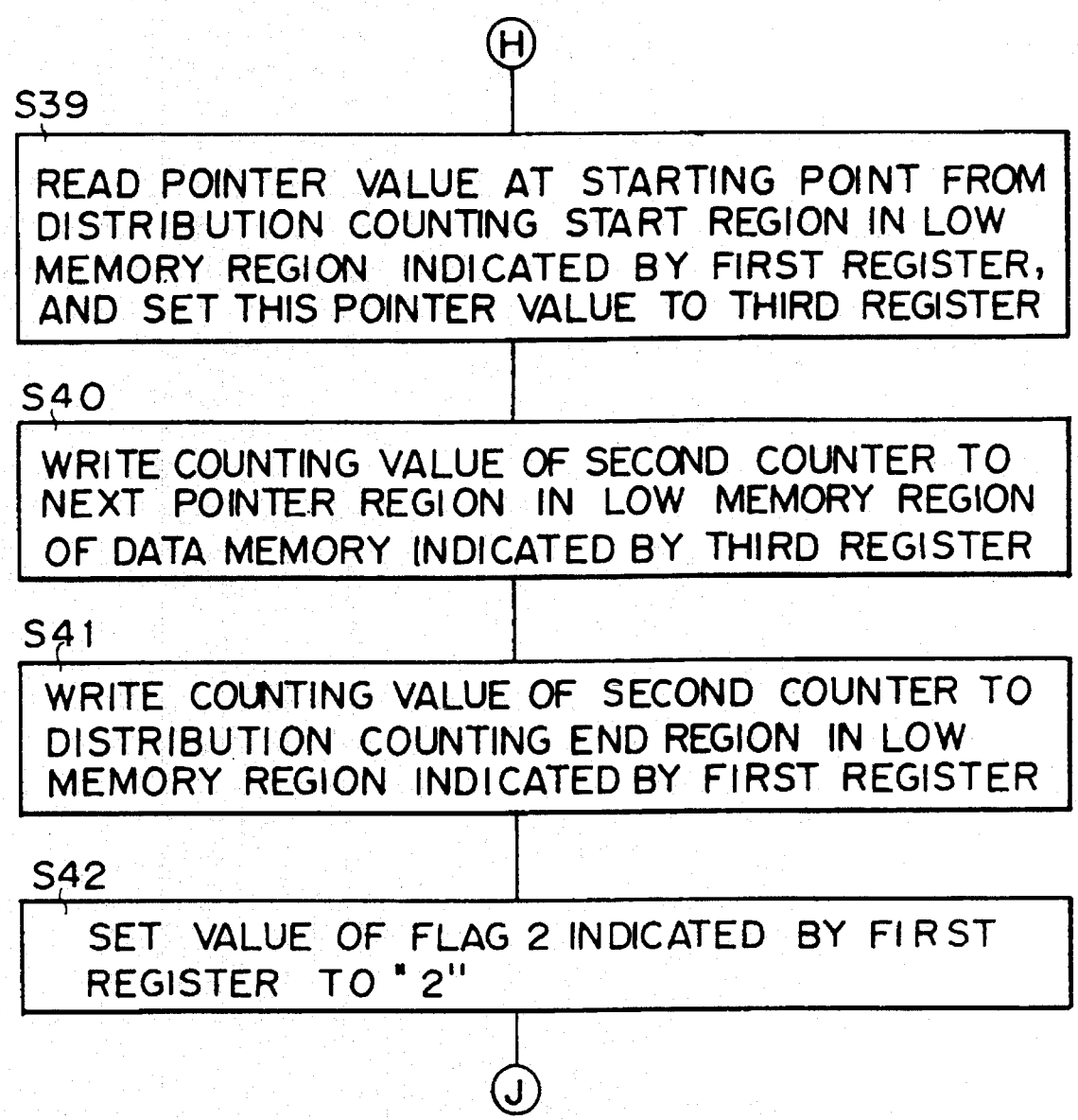
FIG. 16 is a flow chart for explaining the operation of the sorter in the first embodiment of the present invention shown in FIG. 10.

When no value of the flag 2 indicated by the first register 58 is equal to "1" in the step S55, it proceeds to the step S39 shown in FIG. 16.

In the step S39, the pointer value at a starting point is read out of the distribution counting start region in the low memory region indicated by the first register 58. This pointer value is set to the third register 67 and it proceeds to a step S40.

In the step S40, the counting value of the second counter 61 is written to the pointer region in the low memory region of the data memory 10 indicated by the third register 67. Then, it proceeds to a step S41. In the step S41, the counting value of the second counter 61 is written to the distribution counting end region in the low memory region indicated by the first register 58. Then, it proceeds to a step S42.

Figure 14:
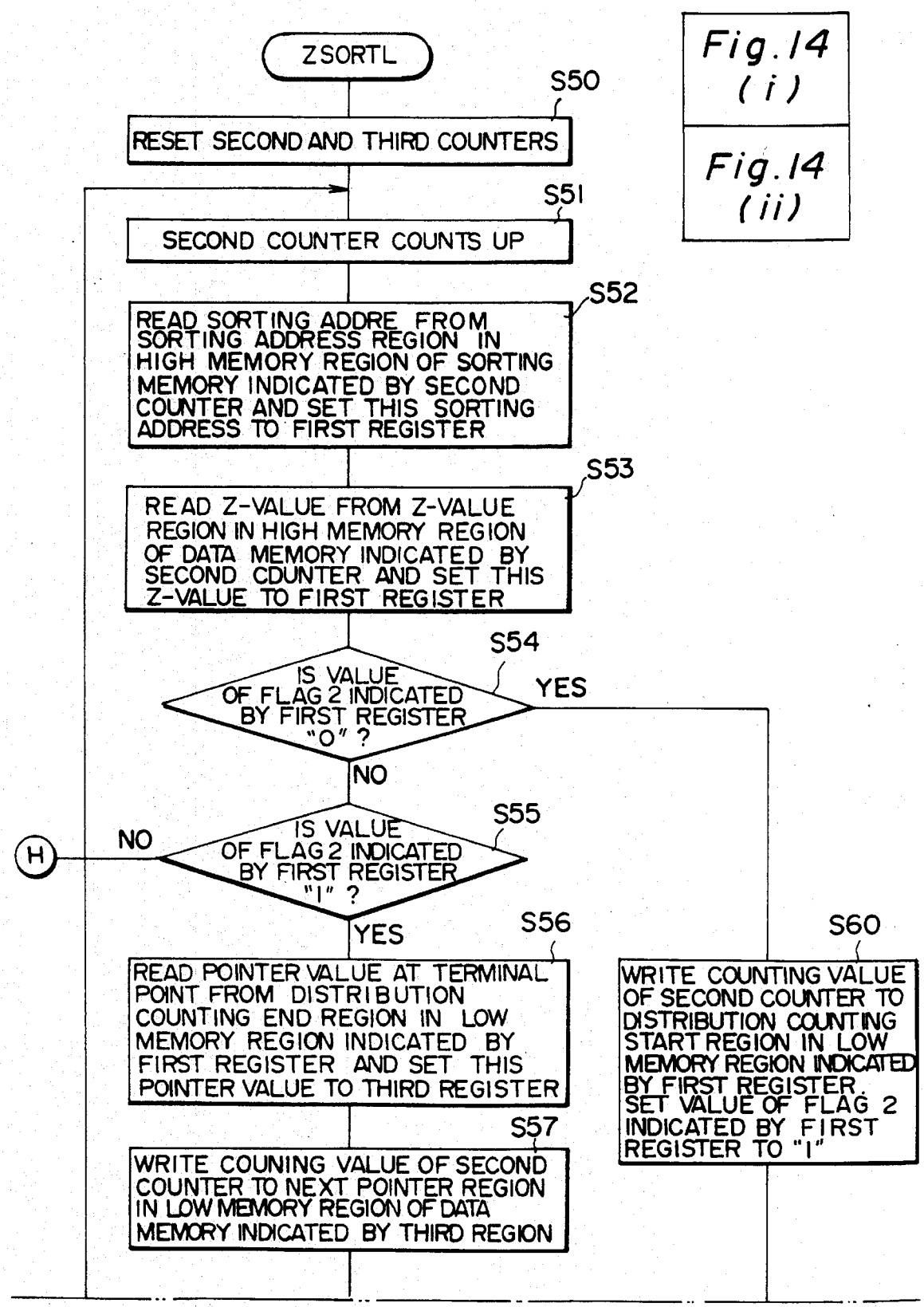
Figure 14:
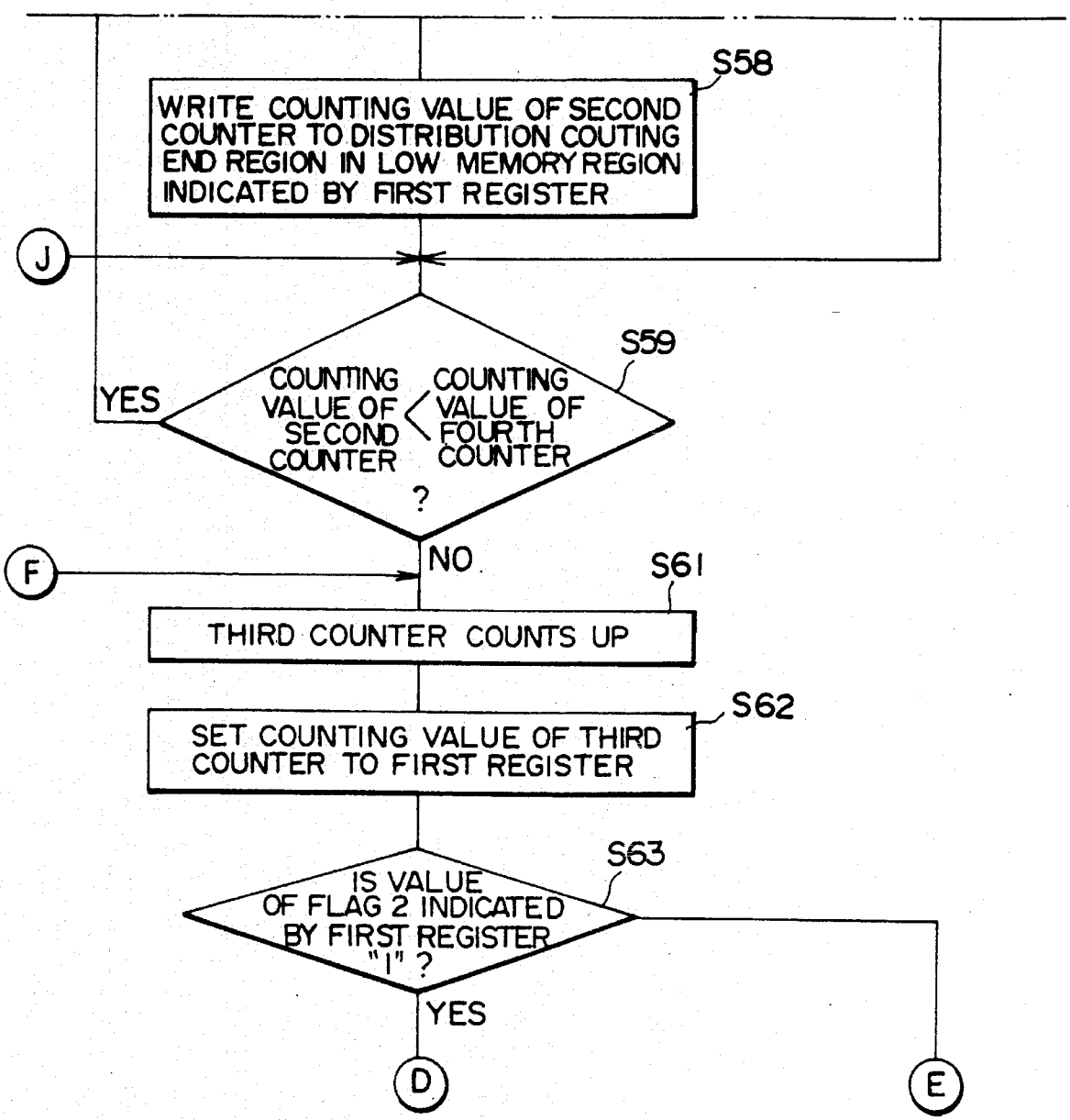
Figure 15:
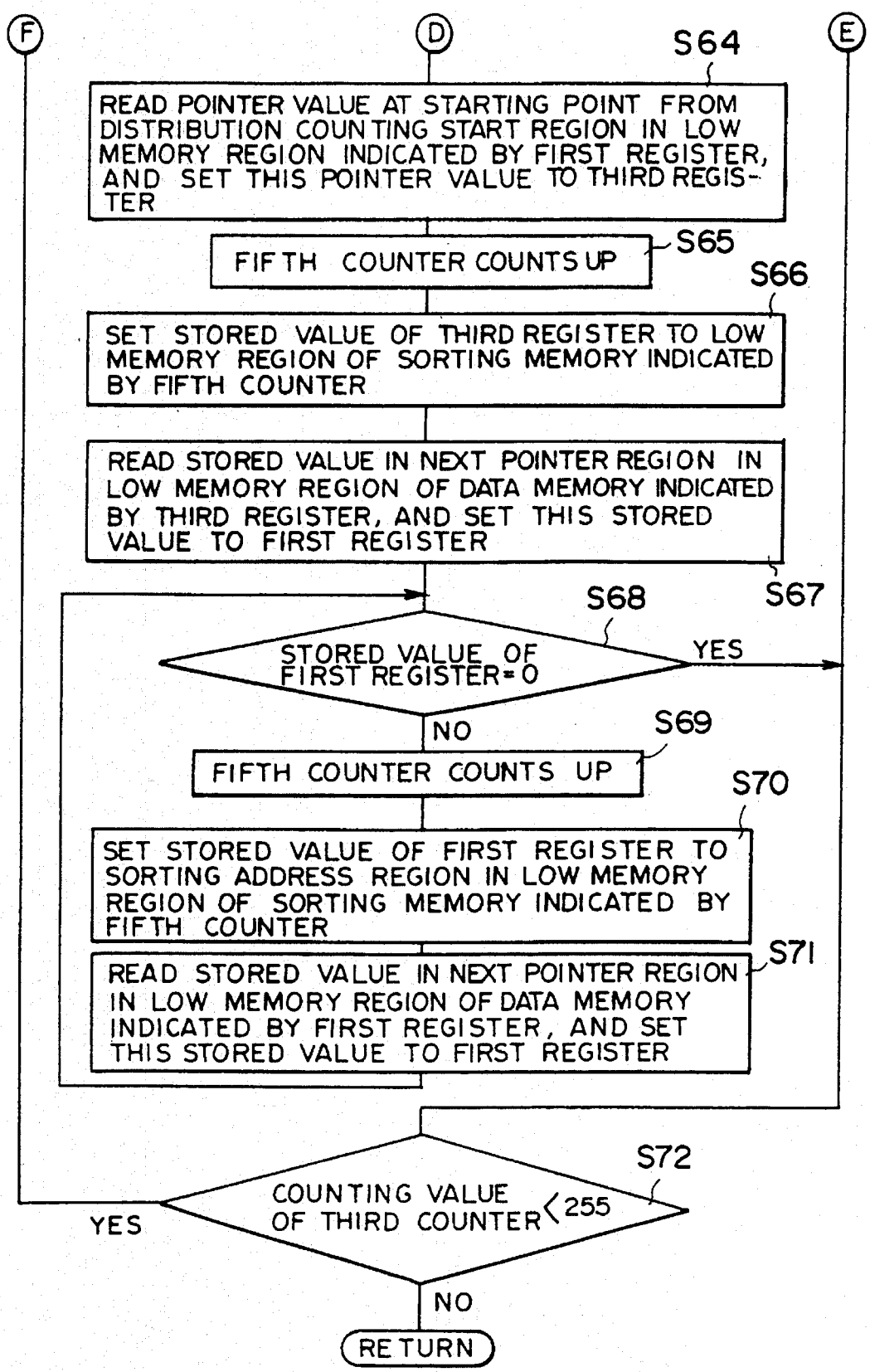
FIG. 15 is a flow chart for explaining the operation of the sorter in the first embodiment of the present invention shown in FIG. 10.

In the step S42, the value of the flag 2 indicated by the first register 58 is set to "2" and it is then returned to the step S59 shown in FIG. 14.

Figure 13:
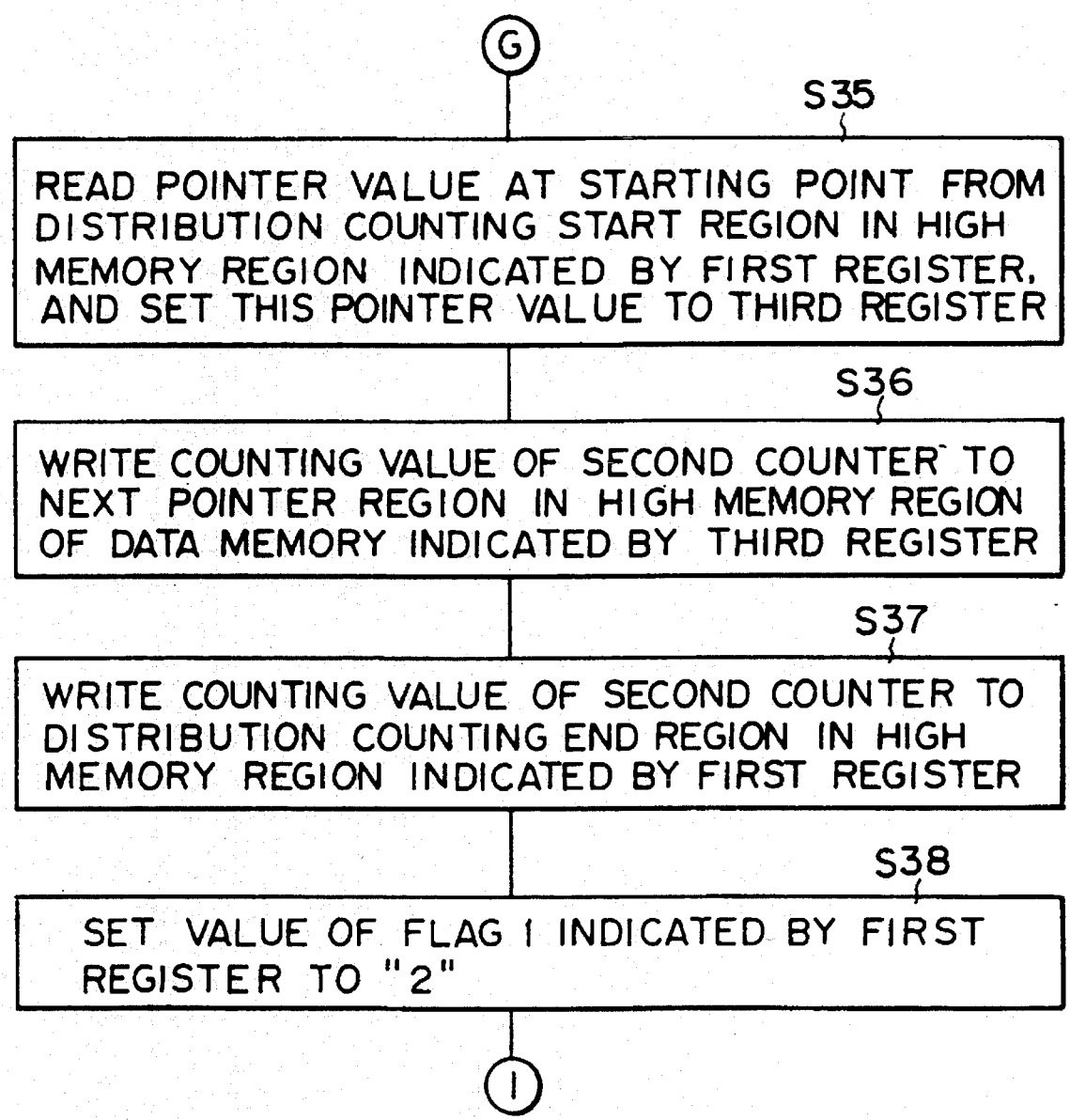
FIG. 13 is a flow chart for explaining the operation of the sorter in the first embodiment of the present invention shown in FIG. 10.

When no value of the flag 1 indicated by the first register 58 is equal to "1" in the step S15 shown in FIG. 11, it proceeds to the step S35 shown in FIG. 13.

In the step S35, the pointer value at the starting point is read out of the distribution counting start region in the high memory region indicated by the first register 58. This pointer value is set to the third register 67 and it proceeds to a step S36.

In the step S36, the counting value of the second counter 61 is written to the pointer region in the high memory region of the data memory 10 indicated by the third register 67. Then, it proceeds to a step S37. In the step S37, the counting value of the second counter 61 is written to the distribution counting end region in the high memory region indicated by the first register 58. Then, it proceeds to a step S38.

In the step S38, the value of the flag 2 indicated by the first register 58 is set to "2" and it is then returned to the step S19 shown in FIG. 11.

When such processings are performed, data as shown in FIGS. 23 to 48 are sequentially written to the data memory 10 and the sorting memory 12 so as to perform the sorting processing.

FIGS. 49 and 50 show a clipping example. In this example, a clipping operation is performed with respect to Z-values 0, 1 and 2 in the high memory region of the data memory 10. Therefore, zeroth, first and second bits are set to "1" as a value of the CL flag in the flip-flop circuit group 703 of the clipping flag detecting section 70.

Figure 50A:
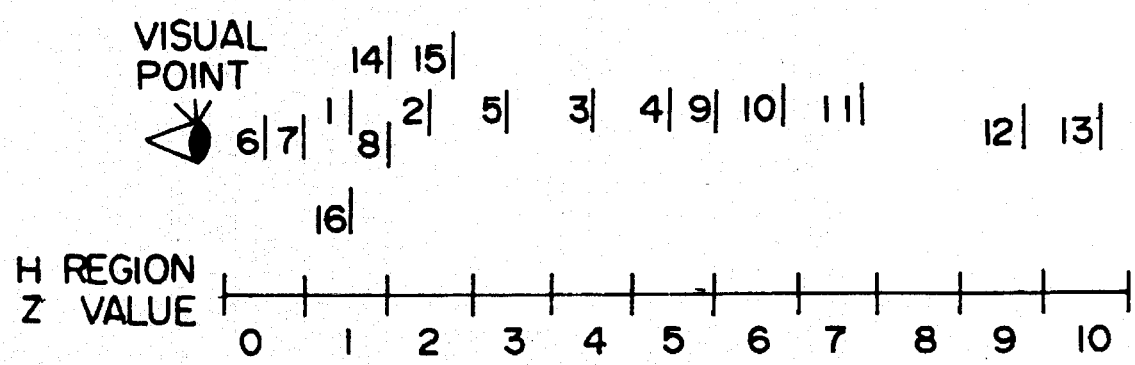
FIGS. 50a and 50b are typical views showing an example in which data having Z-values "0", "1" and "2" in the high memory region are clipped and sorted, and respectively show operating states of the sorter before and after clipping processing of the data.
Figure 50B:
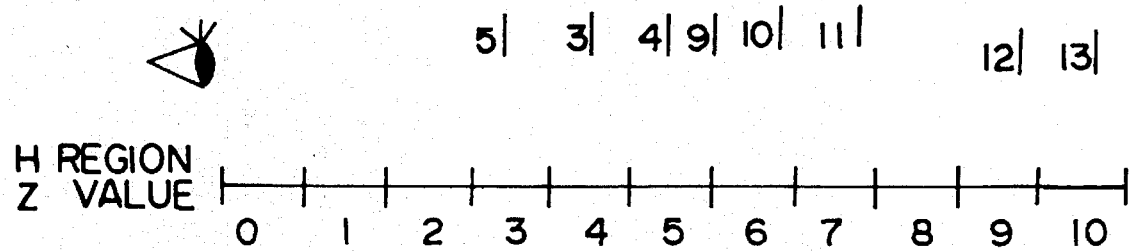

No sorting processing in the low memory region is performed with respect to Z-values 0, 1 and 2 in the high memory region. Therefore, as shown in FIG. 49, no addresses of polygons 6, 7, 16, 1, 8, 14, 2 and 15 are included in a sorting address region of the low memory region. Accordingly, as shown in FIGS. 50a and 50b, polygons having Z-values 0, 1 and 2 in the high memory region are clipped.

Figure 51A:
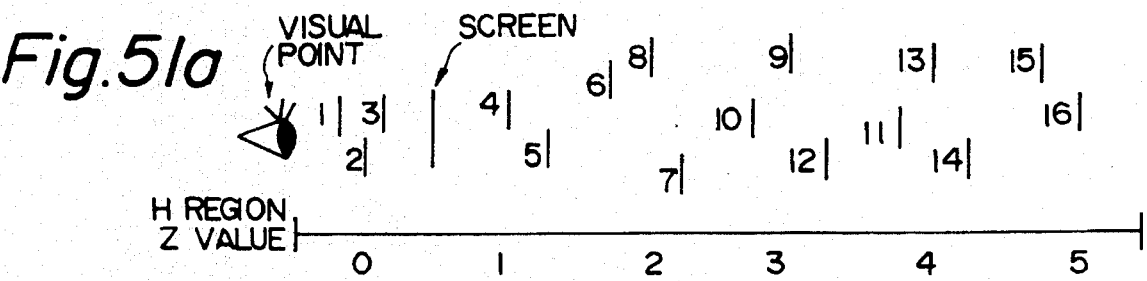
FIGS. 51a, 51b, 51c and 51d are typical views showing examples in which data are clipped or picked and are then sorted.
Figure 51B:
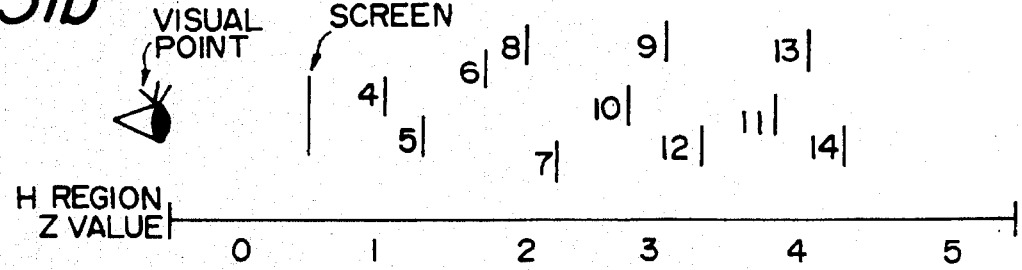
Figure 51C:
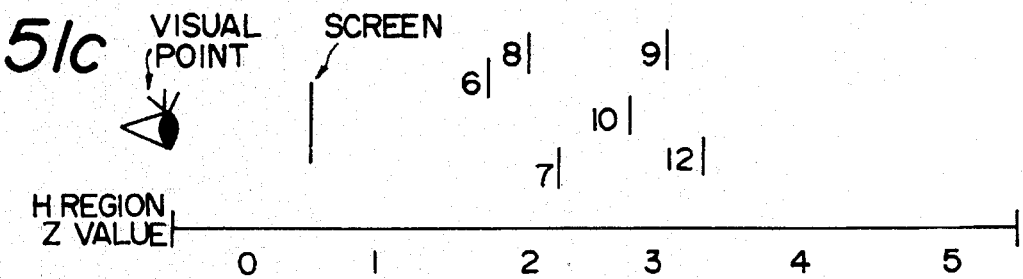
Figure 51D:
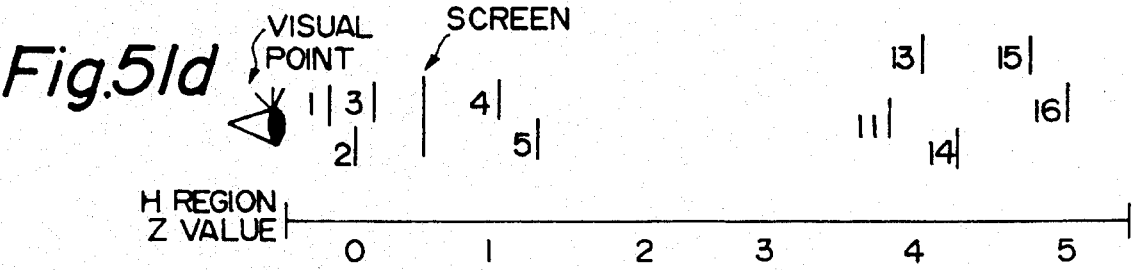

FIG. 51a is a typical view showing a state in which no picking or clipping operation is performed. FIGS. 51b to 51d are typical views showing picking and clipping states.

FIG. 51b shows an example in which polygons having Z-values "0" and "5" in the high memory region are clipped. The Z-value "0" is provided before the screen and the Z-value "5" is provided after the limit of a visual field. In this clipping example, zeroth and fifth bits are set to "1" as a value of the CL flag in the flip-flop circuit group 703 of the clipping flag detecting section 70.

FIG. 51c shows an example in which polygons having Z-values "2" and "3" in the high memory region are picked. In this picking example, zeroth, first, fourth and fifth bits are set to "1" as a value of the CL flag in the flip-flop circuit group 703 of the clipping flag detecting section 70.

FIG. 51d shows an example in which the polygons having Z-values "2" and "3" in the high memory region are clipped. In this clipping example, second and third bits are set to "1" as a value of the CL flag in the flip-flop circuit group 703 of the clipping flag detecting section 70.

In the above-mentioned embodiment, sorting processing is performed by dividing reference value data, i.e., Z-axis data into data in two regions composed of high and low memory regions. If the sorting processing is performed by dividing the Z-axis data into data in more than two memory regions, the number of parallel operations is increased so that the sorting processing is performed at a high speed. For example, the number of parallel operations and a sorting processing speed are increased in a three divisional system of high, middle and low (H, M, L) memory regions in comparison with the two divisional system of the high and low memory regions.

In the next second embodiment, Z-axis data are sorted by dividing the Z-axis data into data in three memory regions composed of high, middle and low memory regions.

As shown in FIG. 60, in clipping processing in this embodiment, a memory is divided into high, middle and low memory regions or sections. Fine clipping using the high and middle memory regions or sections can be performed by a small number of processings.

Figure 60A:
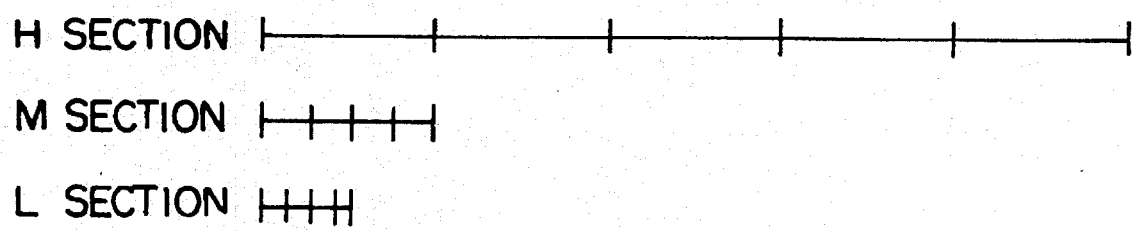
FIGS. 60a, 60b and 60c are typical views showing the concept of sorting processing.
Figure 60B:
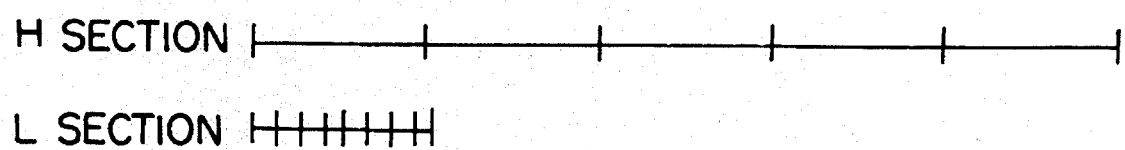
Figure 60C:
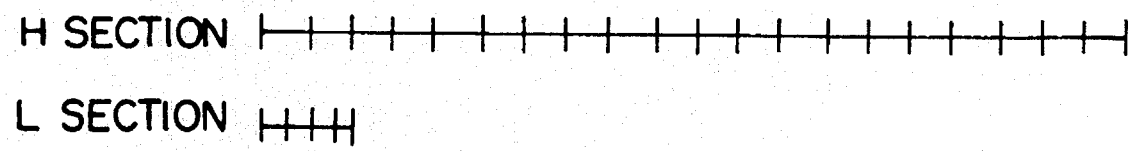

FIG. 60a shows a memory system in accordance with this embodiment. FIG. 60b shows a memory system in which the middle memory region is removed from the memory system shown in FIG. 60a. In the memory system shown in FIG. 60b, no fine clipping operation can be performed in comparison with the memory system shown in FIG. 60a. In the memory system shown in FIG. 60b, sorting processing is performed in a region requiring the clipping operation so that useless processing is performed and a processing speed is reduced. FIG. 60c shows a memory system in which the high memory region is removed from the memory system shown in FIG. 60a. In this memory system shown in FIG. 60c, a fine clipping operation can be performed, but it is necessary to dispose clipping flags for all the high memory region. For example, when the high memory region is constructed by 10 bits, 1024 clipping flags are required. In contrast to this, when each of the high and middle memory regions is constructed by 5 bits, it is sufficient to dispose 32+32×2 clipping flags at both ends of a clipping region.

Further, it is necessary to judge whether clipping processing is performed or not in all the high memory region, thereby reducing a sorting processing speed.

Figure 52:
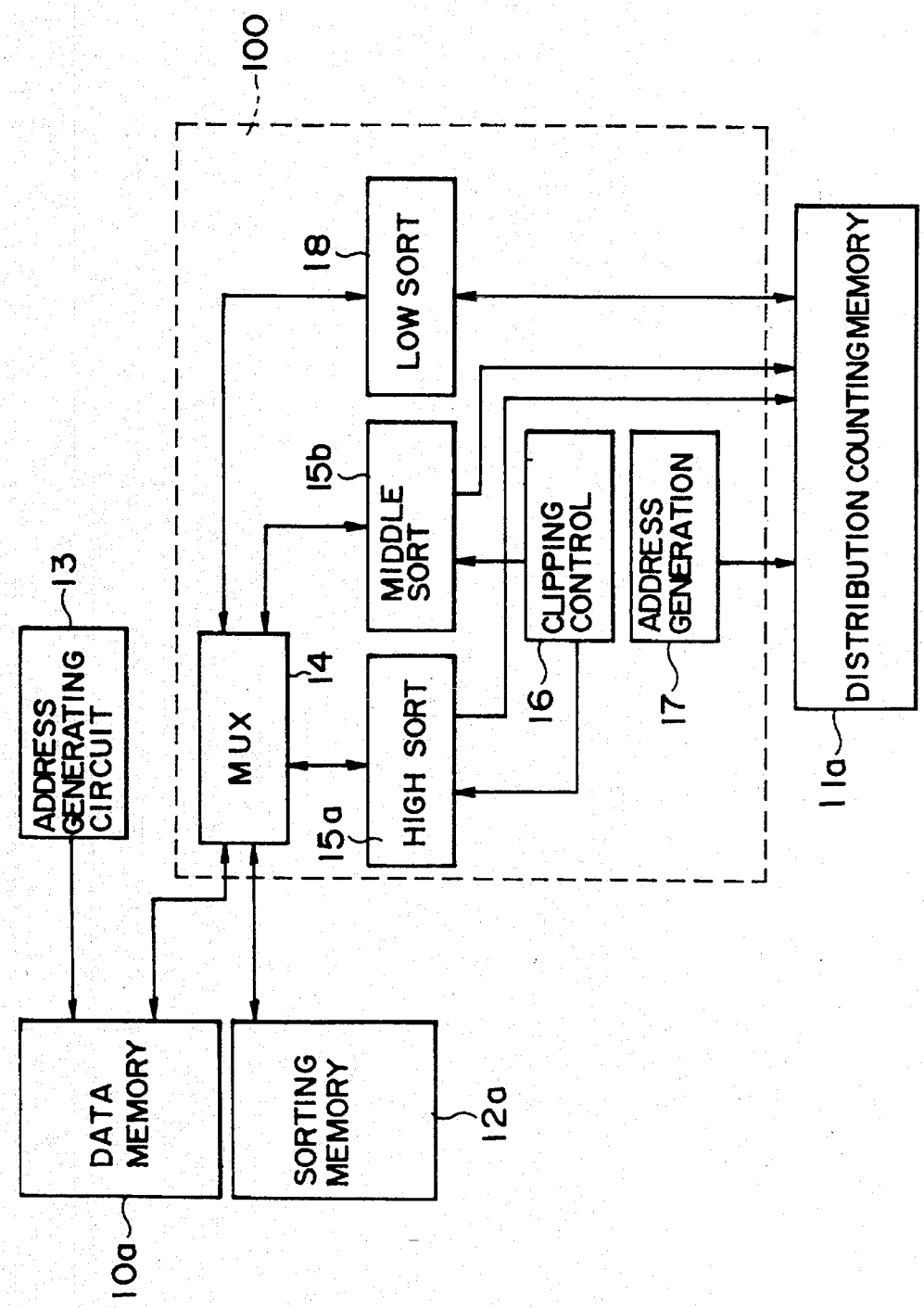
FIG. 52 is a block diagram showing the construction of a sorter in accordance with a second embodiment of the present invention.

A sorter in this second embodiment will next be described with reference to FIG. 52. FIG. 52 is a block diagram showing an entire construction of the sorter.

Similar to the above-mentioned first embodiment, this sorter has a data memory 10a, a sorting circuit 100 and a distribution counting memory 11a.

Figure 57:
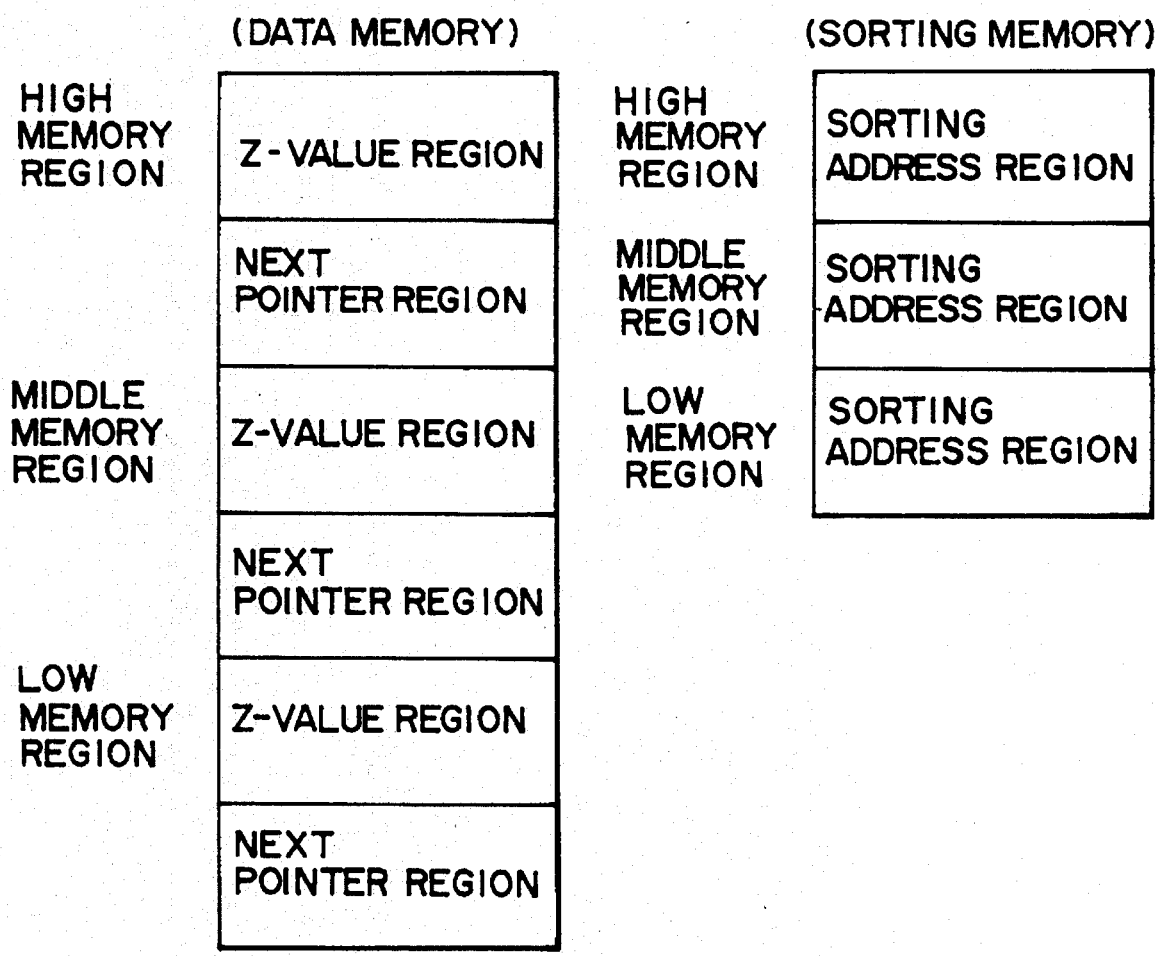
FIG. 57 is a typical view showing address regions of a data memory and a sorting memory used in the second embodiment of the present invention.
Figure 59:
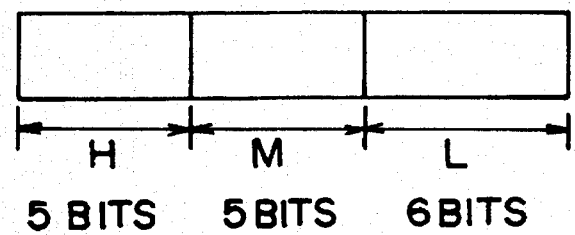
FIG. 59 is a typical view showing an example of sorted data.

The data memory 10a has a memory region for storing Z-value data from 1 to N designated by a data number pointer. As shown in FIG. 57, this memory region is generally divided into high (H), middle (M) and low (L) memory regions. Each of the high, middle and low memory regions is divided into a Z-value region for storing the Z-value data and a next pointer region for storing a next address and accompanied with the Z-value region. Upper, middle and lower position data of reference value data are respectively stored to the high, middle and low memory regions. When the Z-value data are constructed by 16 bits as shown in FIG. 59, upper 5 bit data, middle 5 bit data, and lower 6 bit data of the reference value data are respectively stored to the high, middle and low memory regions.

As shown in FIG. 57, a sorting memory 12a has a sorting address region for storing sorted results. This sorting memory 12a also has high, middle and low divided memory regions similar to those in the data memory 10a.

A pointer value showing the same address data is stored to the next pointer region of the data memory 10a. An address value showing a small Z-value is stored to the sorting address region of the sorting memory 12a in the order of a small address.

The sorting circuit 100 uses the distribution counting memory 11a as a working memory with respect to a Z-value inputted from the data memory 10a. The sorting circuit 100 writes addresses respectively sorted into the high, middle and low memory regions for Z-values to sorting address regions of the sorting memory 12a in the high, middle and low memory regions.

As shown in FIG. 58, similar to the data memory 10a, the distribution counting memory 11a is divided into high, middle and low memory regions. Each of the high, middle and low memory regions is divided into a distribution counting start region and a distribution counting end region. In this second embodiment, the distribution counting memory 11a has addresses 0 to 31 and addresses 0 to 63 corresponding to 5, 5 and 6 bit data stored to each of the Z-value regions of the data memory 10a. The distribution counting memory 11a has a top address of these addresses in the distribution counting start region and has an ending address of these addresses in the distribution counting end region.

In a clipping control circuit 16, a deleted Z-value region is designated in advance to perform the three-dimensional clipping or picking operation mentioned above. The clipping control circuit 16 transmits this designated region to high and middle sorting processing circuits 15a and 15b.

Each of the high and middle sorting processing circuits 15a and 15b judges whether a sorted region is a region to be clipped or not. An operation of each of the high and middle sorting processing circuits 15a and 15b is controlled such that no sorting processing is performed in a low sorting processing circuit 18 with respect to the region to be clipped.

In this second embodiment, each of the high sorting processing circuit 15a, the middle sorting processing circuit 15b and the low sorting processing circuit 18 performs sorting processing similar to that in the above first embodiment.

Figure 53:
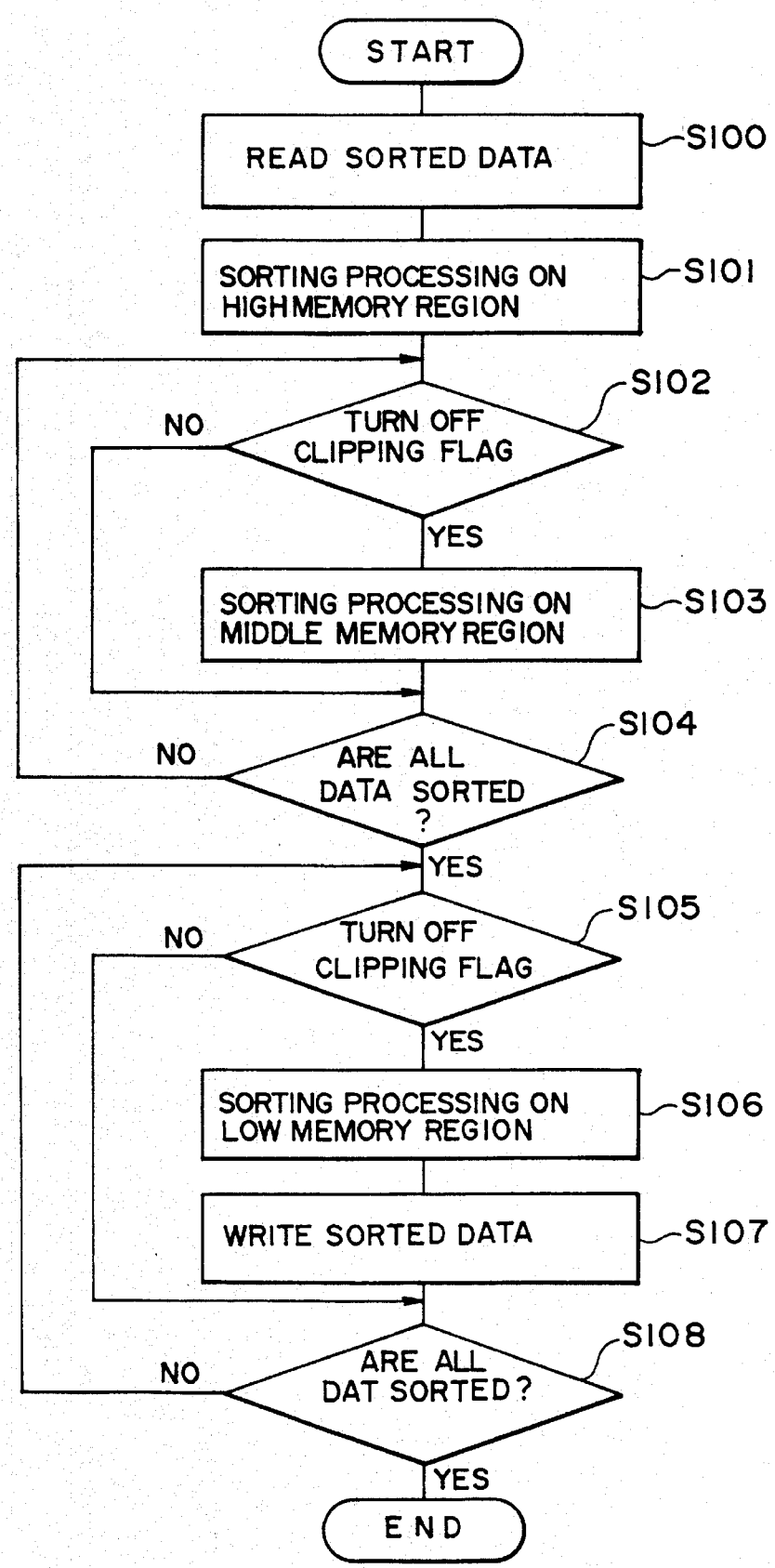
FIG. 53 is a flow chart showing a sorting operation of the sorter in the second embodiment of the present invention.

A sorting operation of the sorter in the second embodiment of the present invention will next be described. FIG. 53 is a flow chart showing this sorting operation.

When a plurality of reference axis data (or Z-value data) to be sorted are inputted from an image information feeder 5 to the sorter, data numbers 1 to N are allocated in an input order from 1 to N. In a step S100, upper 5 bit data of the reference axis data as reference value data are sequentially stored to high memory regions 1 to N addressed by a data number pointer. Middle 5 bit data of the reference value data are sequentially stored to middle memory regions 1 to N addressed by the data number pointer. Further, lower 6 bit data of the reference value data are sequentially stored to low memory regions 1 to N addressed by the data number pointer.

When the plural Z-value data to be sorted are completely stored into the data memory 10a, sorting processing is performed in the high memory region in a step S101. In this sorting processing in the high memory region, the Z-value data stored to a high memory region are sequentially read out of the data memory 10a in a data number order from 1 to N, and are outputted to the distribution counting start and end regions of the distribution counting memory 11a.

In this second embodiment, the Z-value data are sequentially read by outputting data numbers as read addresses of the data number pointer in the order from 1 to N.

When an address is designated by a data number, the Z-value data are read from a high memory region for designated Z-value data to the distribution counting start and end regions of the distribution counting memory 11a.

The distribution counting start and end regions of the distribution counting memory 11a have regions one-to-one corresponding to all allowable values of the Z-value data.

When upper and middle bits of the Z-value data are respectively constructed by 5 bits as in this embodiment, a total of 32 values from 0 to 31 can be allowed. When lower bits of the Z-value data are constructed by 6 bits as in this embodiment, a total of 64 values from 0 to 63 can be allowed.

Accordingly, 32 memory areas respectively designated by addresses from 0 to 31 are disposed in each of the distribution counting start and end regions in each of the high and middle memory regions of the distribution counting memory 11a. 64 memory areas respectively designated by addresses from 0 to 63 are disposed in each of the distribution counting start and end regions in the low memory region of the distribution counting memory 11a.

A data number of the Z-value data outputted from the data memory 10a is written to the distribution counting start and end regions of the distribution counting memory 11a. In this second embodiment, the data number is represented by one of numbers 1 to N and the maximum data number is represented by number N.

When a Z-value is inputted from the data memory 10a to the distribution counting start and end regions of the distribution counting memory 11a, the distribution counting memory 11a writes a data number indicative of this Z-value to a memory region designated by a corresponding address pointer in each of the distribution counting start and end regions.

Similar to the first embodiment, the data number is written as follows in this second embodiment. Namely, the Z-value data are set to an address pointer when the Z-value data having the data number designated by the data number pointer are outputted from the data memory 10a. This address pointer outputs these set Z-value data as a write address. The data number designated by the data number pointer and corresponding to the Z-value is written to the distribution counting start and end regions designated by this write address.

When the data number is once stored to the distribution counting start region, no new data number is updated even when new Z-value data having the same Z-value are sequentially output ted from the data memory 10a. In contrast to this, when the data number is once stored to the distribution counting end region, the new data number indicative of the Z-value is updated and stored to this distribution counting end region when the same Z-value is next outputted from the data memory 10a.

A data number provided at the time of a first occurrence of the Z-value is stored to the distribution counting start region. In contrast to this, a data number provided at the time of a final occurrence of the Z-value is stored to the distribution counting end region.

Therefore, the same data number is written to the same address in each of the distribution counting start and end regions when the same Z-value is outputted from the data memory 10a only at one time. In contrast to this, when the same Z-value is outputted from the data memory 10a plural times, a different data number is finally stored to the same address in each of the distribution counting start and end regions.

Accordingly, when the data number is updated and recorded plural times to the distribution counting end region of the distribution counting memory 11a, an arrangement of data numbers with respect to the respective reference value data is known when the reference value data are sorted in an ascending or descending order if how to update the data number is known.

Therefore, the data memory 10a has a next pointer region in which an address is designated in the order from 0 to N on the basis of a data number outputted to a new pointer.

When the data number is updated and recorded to the distribution counting end region, the data number before the updating and recording operations is set to the address pointer and the next pointer region is addressed. A new data number after the updating operation is written to the designated next pointer region.

When the data number is thus updated and recorded to the distribution counting end region, historical contents of the updating operation are sequentially written to the pointer region within the data memory 10a.

As mentioned above, in the second embodiment of the present invention, when Z-value data are outputted from the data memory 10a in a data number order, the data number is written to the distribution counting start and end regions with the outputted Z-value data as a write address. Further, the Z-value data are transferred and written to the next pointer region of the data memory 10a from the distribution counting end region.

When such a data transferring operation is started, the high sorting processing circuit 15a controls the transferring operation as follows.

First, the data number stored to the distribution counting end region is set to an address generating circuit 13. Next, a data number in a distribution counting start region having a predetermined relation corresponding to a designated address is written to a next pointer region addressed by the address generating circuit 13.

Such a writing operation with respect to the data number in sorting the reference value data in the ascending order is slightly different from that in the descending order. In the following description, the reference value data are sorted in the ascending order as one example.

For example, when a data number is stored to a distribution counting end region designated by address 0, the data number stored at address 0 is first set to an address pointer.

Next, a data number is read out of a distribution counting start region designated by address 1 and is then written to a next pointer region of the data memory 10a designated by the address pointer.

At this time, when no data number is stored to the distribution counting start region designated by address 1, a data number is read out of a memory area designated by address 2 and is then written to the next pointer region of the data memory 10a. When no data number is stored to the distribution counting start region designated by address 2, the number of addresses is sequentially incremented such as address 3, address 4, - - - until the data number is found.

When the data number is read out of a memory area designated by address K, this data number is written to the next pointer region of the data memory 10a designated by the address pointer.

When such reading and writing operations are completed, the data number is next read out of a distribution counting end region designated by address K. Similar to the above-mentioned case, data are written to the next pointer region of the data memory 10a with this data number as a write address.

In this second embodiment, the sorter repeatedly writes the data number to the next pointer region for recording such a chain data number. When such a sequential writing operation is completed, the data number is chained and stored to a memory area of the next pointer region in the data memory 10a in the ascending order of upper 5 bit data in the high memory region of the reference value data.

When the sorting operation in the high memory region is completely performed with respect to the upper 5 bit data in the data memory 10a, the sorted results are stored to the high memory region of the sorting memory 12a as a sorting address.

In this second embodiment, it is judged in a processing step S102 whether there is a memory region designated by the clipping control circuit 16 or not. For example, sorting processing is performed in the ascending order in the range of values from 0 to N on a high memory region side. Then, data at address 0 on the high memory region side are read and it is judged whether these data are clipped or not. When these data are clipped, no sorting operation in the middle memory region is performed with respect to middle 5 bit data, and data processing corresponding to the next Z-value in the high memory region is performed.

An address read out of a sorting address region in the high memory region of the sorting memory 12a corresponds to a data number of the data memory 10a. When data at address 0 are read out of this high memory region and no clipping operation is performed in this high memory region, the sorting operation is performed in the middle memory region of the sorting memory 12a in a step S103. Thus, sorting processing similar to that in the high memory region is performed with respect to the middle memory region. It is then judged in a step S104 whether all data are sorted or not. The sorting operation is repeatedly performed with respect to the middle memory region from a processing judgment as to whether clipping is required or not until all the data are sorted.

Subsequently, in this embodiment, it is judged in a processing step S105 whether there is a memory region designated by the clipping control circuit 16 or not. For example, sorting processing is performed in the ascending order in the range of values from 0 to N on a middle memory region side. Then, data at address 0 on the middle memory region side are read and it is judged whether these data are clipped or not. When these data are clipped, no sorting operation in the low memory region is performed with respect to lower 6 bit data, and data processing corresponding to the next Z-value in the middle memory region is performed.

Thereafter, Z-value data stored into the low memory region of the above data memory 10a are read therefrom in the low sorting processing circuit 18. The read Z-value data are stored to the distribution counting start and end regions of the distribution counting memory 11a. Similarly, the read Z-value data are similarly stored to the next pointer region in the low memory region of the data memory 10a. This operation is similar to the above sorting operation in each of the high and middle memory regions. Namely, in the sorting processing of data in each of the high and middle memory regions, the high and middle memory regions of the data memory 10a and the high and middle memory regions about the distribution counting start and end regions of the distribution counting memory 11a are used to write chained data to the next pointer regions of the data memory 10a. In contrast to this, in the sorting processing of data in the low memory region, Z-value data are read out of the low memory region of the data memory 10a. A data number is stored to each of the distribution counting start and end regions in the low memory region of the distribution counting memory 11a in accordance with these read Z-value data. Then, chained data are written to the next pointer region in the low memory region of the data memory 10a, thereby performing the sorting processing in the low memory region.

Namely, in the second embodiment of the present invention, the sorting processing is first performed with respect to the upper 5 bit data in the high memory region. When this sorting processing is performed, it is judged whether sorted data must be clipped or not. The next sorting processing on the middle memory region side is performed with respect to the sorted data not required to be clipped. Further, when this sorting processing is performed, it is judged whether sorted data must be clipped or not. The next sorting processing on the low memory region side is performed with respect to the sorted data not required to be clipped. The sorting processing in the low memory region is similar to that in each of the high and middle memory regions so that the sorting operation is completed. In a step S107, the sorted results are written to a sorting address region in the low memory region of the sorting memory 12a. Then, it is judged in a step S108 whether all the data have been sorted or not. The sorting operation on the low memory region side is repeatedly performed from a processing judgment as to whether the clipping operation is required or not until all the data have been sorted.

When all the data have been completely sorted, the operation of the sorter is completed.

The next description relates to a case in which 12 Z-value data outputted from the image information feeder 5 are sorted as one example in the ascending order by using such a sorting circuit.

In this embodiment, to sort 12 Z-value data, it is sufficient to construct the data memory 10a such that this data memory 10a has Z-value regions in high and low memory regions designated by data numbers 1 to 12. As mentioned above, the Z-value data are constructed by 16 bits composed of 5 bits in the high memory region, 5 bits in the middle memory region and 6 bits in the low memory region.

For example, the upper 5 bit data in the high memory region are sequentially inputted to the data memory 10a from the image information feeder 5 in the order of 1, 2, 4, 5, 3, 0, 0, 7, 9, 1, 2, and 1. The inputted Z-value data are written to a memory area in the high memory region of the data memory 10a for sequentially addressing data numbers 1, 2, 3, - - - .

For example, the middle 5 bit data in the middle memory region are sequentially inputted to the data memory 10a from the image information feeder 5 in the order of 1, 2, 3, 4, 5, 7, 8, 2, 3, 1, 5, and 6. The inputted Z-value data are written to a memory area in the middle memory region of the data memory 10a for sequentially addressing data numbers 1, 2, 3, 4, 5, - - - .

Further, for example, the lower 6 bit data in the low memory region are sequentially inputted to the data memory 10a from the image information feeder 5 in the order of 5, 6, 3, 1, 5, 4, 5, 1, 1, 2, 7, and 5. The inputted Z-value data are written to a memory area in the low memory region of the data memory 10a for sequentially addressing data numbers 1, 2, 3, 4, 5, - - - .

When the Z-value data are thus written to the high, middle and low memory regions within the data memory 10a, the Z-value data are sorted by using the data numbers instead of the Z-value data.

Thus, it is possible to sort the Z-value data at a high speed by a simplified circuit even when the number of digits about the sorted Z-value data is large.

In this embodiment, when a Z-value is written to the data memory 10a, the Z-value is sequentially read out of the data memory 10a in a data number order.

As mentioned above, when the Z-value data are written into the data memory 10a, the Z-value data are sequentially read out of this data memory 10a in the data number order. First, only Z-value data in the high memory region are read out of the data memory 10a and sorting processing is performed in the high memory region as shown in FIGS. 61 to 64.

When the Z-value data are thus read out of the data memory 10a, a corresponding data number is written to the distribution counting start and end regions of the distribution counting memory 11a with the read Z-value as an address. Accordingly, as shown in FIG. 61, when Z-value data 1 specified by data number 1, i.e., by address 1 is first outputted from the data memory 10a, data number 1 is written to the distribution counting start and end regions with the Z-value data 1 as an address.

The sorting processing is continuously performed in the high memory region. In FIG. 62, data number 6 is inputted to the distribution counting start and end regions by setting Z-value data 0 specified by this data number (data memory address) 6 to an address. Subsequently, when Z-value data 0 specified by data number (data memory address) 7 is outputted from the data memory 10a, data number 7 is inputted to the distribution counting start and end regions with this Z-value data 0 as an address. At this time, no new data number is written to the distribution counting start region since the data number is already written to this distribution counting start region. In contrast to this, the previous data number 6 is updated to a new data number 7 in the distribution counting end region and this updated data number 7 is recorded to the distribution counting end region. Therefore, the updated data number 7 is written to a next pointer region of the data memory 10a with the data number 6 before update as an address.

Next, as shown in FIG. 63, Z-value data 7 specified by data number (data memory address) 8 is read out of the data memory 10a. A data number 8 is written to the distribution counting start and end regions with the Z-value data 7 as an address. At this time, no new data number is written to the distribution counting start region since the data number is already written to this distribution counting start region. In contrast to this, the previous data number 8 is rewritten to a new data number 8 in the distribution counting end region and this rewritten or updated data number 8 is recorded to the distribution counting end region. Therefore, the updated data number 8 is written to the next pointer region of the data memory 10a with the data number 8 before update as an address.

Similarly, Z-value data specified by each of data numbers (data memory addresses) 9 to 12 are read out of the data memory 10a. A data number is written to each of the distribution counting start and end regions. When the data number is already written to the distribution counting start region, the data number before update is set as an address without rewriting this data number and an updated data number is written to the next pointer region. FIG. 64 shows sorted results with respect to only the high memory region.

In such a sequential writing operation, a data number provided at the time of a first occurrence of each of Z-values is written to the distribution counting start region with the Z-value data as an address.

A data number provided at the time of a final occurrence of each of the Z-values is stored to the distribution counting end region with the Z-value data as an address.

Further, an updated data number is sequentially written to the next pointer region with the data number before update as an address every time the data number in the distribution counting end region is updated and stored. Accordingly, when the same Z-value data are outputted from the data memory 10a plural times, the historical contents of output of the Z-value data in a data number order are recorded into this next pointer region.

When a Z-value in the high memory region is set to 0, a sorting operation is performed as follows in the middle memory region with reference to FIG. 66. First, a data number at address 0 in the distribution counting start region of the high memory region is read out of the distribution counting memory 11a. In this case, the data number at this address 0 is set to 6 so that number 6 is written to a sorting address.

Then, a next pointer about data number (data memory address) 6 is read and a region for this next pointer shows value 7. Accordingly, a next pointer about data number (data memory address) 7 is read. In this case, no data are written to this next pointer about data number 7 so that this data number 7 is written to a sorting address. Thus, all data corresponding to Z-value 0 in the high memory region are written to the sorting addresses. Thus, the counting value of a counter CNTX is set to the number 2 of data (composed of 6 and 7) at the sorting addresses in the high memory region and data processing with respect to the middle memory region is next performed.

When Z-value data 7 in the middle memory region specified by data number (data memory address) 6 is read out of the data memory 10a, value 6 is written to each of the distribution counting start and end regions in a state in which this Z-value data 7 is set to an address in the middle memory region of the distribution counting memory 11a. When Z-value data 8 in the middle memory region specified by data number (data memory address) 7 is read out of the data memory 10a, value 7 is written to each of the distribution counting start and end regions in a state in which this Z-value data 8 is set to an address in the middle memory region of the distribution counting memory 11a.

Next, a designated data number 7 is outputted from a sorting address in the middle memory region. Thus, the sorting operation is completely performed with respect to Z-value 0 in the high memory region and Z-value 7 in the middle memory region. Further, the counting value of a counter CNTX2 is set to the number 1 of data (composed of 7) in a sorting address region of the middle memory region, and data processing with respect to the low memory region is next performed.

When Z-value data 4 designated by data number (data memory address) 6 is read out of the data memory 10a in the sorting processing with respect to the low memory region, value 6 (see FIG. 65) is written to each of the distribution counting start and end regions in a state in which this Z-value data 4 is set to an address in the low memory region of the distribution counting memory 11a. Further, data number 6 is written to a sorting address of the low memory region. Thus, all data in the high memory region having Z-value 0 and the middle memory region having Z-value 7 are written to the sorting addresses. Then, the counting value of a counter CNTX3 is set to the number 1 of data (composed of 6) in a sorting address region of the low memory region. Next, when data number 7 designated by data number (data memory address) 6 at a sorting address is outputted from the middle memory region, no data are written to a next pointer. Accordingly, the sorting operation in the middle memory region is completely performed with respect to the high memory region having Z-value 0 and the middle memory region having Z-value 8. Then, the counting value of the counter CNTX2 is set to the number 1 of data (composed of 6) in the sorting address region of the middle memory region and data processing with respect to the low memory region is next performed.

As shown in FIG. 66, when Z-value data 5 designated by data number (data memory address) 7 is read out of the data memory 10a in the sorting processing with respect to the low memory region in the case of the high memory region having Z-value 0 and the middle memory region having Z-value 8, value 7 is written to each of the distribution counting start and end regions in a state in which this Z-value data 5 is set to an address in the low memory region of the distribution counting memory 11a. Further, data number 7 is written to a sorting address of the low memory region. Thus, all data in the high memory region having Z-value 0 and the middle memory region having Z-value 8 are written to the sorting addresses. Then, the counting value of the counter CNTX3 is set to the number 2 of data (composed of 6 and 7) in the sorting address region of the low memory region.

When the high memory region has Z-value 1, the sorting operation is performed as follows in the middle memory region with reference to FIG. 68.

Data number 1 designated by address 1 in the distribution counting start region in the high memory region is written to sorting address 1. Then, a next pointer written to this sorting address 1 is read. In this case, value 10 is written to this next pointer so that value 10 is written to a sorting address. Further, data number 12 in a next pointer region written to sorting address (data memory address) 10 is read out of this next pointer region. This data number 12 is written to a sorting address. Since no data are written to a next pointer at sorting address (data memory address) 12, all data corresponding to Z-value 1 in the high memory region are written to the sorting addresses. Then, the counting value of the counter CNTX is set to the number 3 of data (composed of 1, 10 and 12) in the sorting address region of the high memory region and data processing with respect to the middle memory region is next performed.

Next, a reading operation in the middle memory region with respect to data number 1 written to sorting address 1 in the high memory region is performed. Data number 1 is written to the distribution counting start region at address 1 thereof at which middle (M) data (Z-value in FIG. 68) 1 written at data number (data memory address) 1 is set to an address. Then, the reading operation in the middle memory region is performed with respect to data number 10 written to sorting address 2 in the high memory region. A data number 1 is written to the distribution counting start and end regions in which Z-value 1 designated by sorting address (data memory address) 10 is set to an address. At this time, the data number is already written to the distribution counting start region so that no data number is rewritten to this distribution counting start region. In contrast to this, the previous data number 1 is rewritten to a new data number 10 in the distribution counting end region. Therefore, the updated data number 10 is written to a next pointer region of the data memory 10a with the data number 1 before update as an address.

Sorting processing is similarly performed with respect to the low memory region.

Subsequently, as shown in FIG. 68, a data calling operation is performed with respect to sorting address 12 in the middle memory region. In this case, a data number (a Z-value) about sorting address (data memory address) 12 in the middle memory region is equal to 6. A data number 12 is written to the distribution counting start and end regions with this data number 6 as an address.

The data number 12 at the sorting address 1 of the middle memory region is written to address 6 in the distribution counting start region and the distribution counting end region. The counting value of the counter CNTX2 is set to one and the sorting operation in the middle memory region is completed with respect to Z-value 1 in the high memory region.

Sorting processing is similarly performed with respect to the low memory region.

FIG. 69 shows all sorted results in the case of Z-value 10 in the high memory region.

The sorting processing is sequentially completed in the ascending order of Z-value data from sorting address 1 in the low memory region of the sorting memory 12a, thereby performing a writing operation about sorted data. Namely, it is possible to sequentially read the sorted data in a smaller Z-value order from address 1 in the low memory region of the sorting memory 12a.

Figure 54:
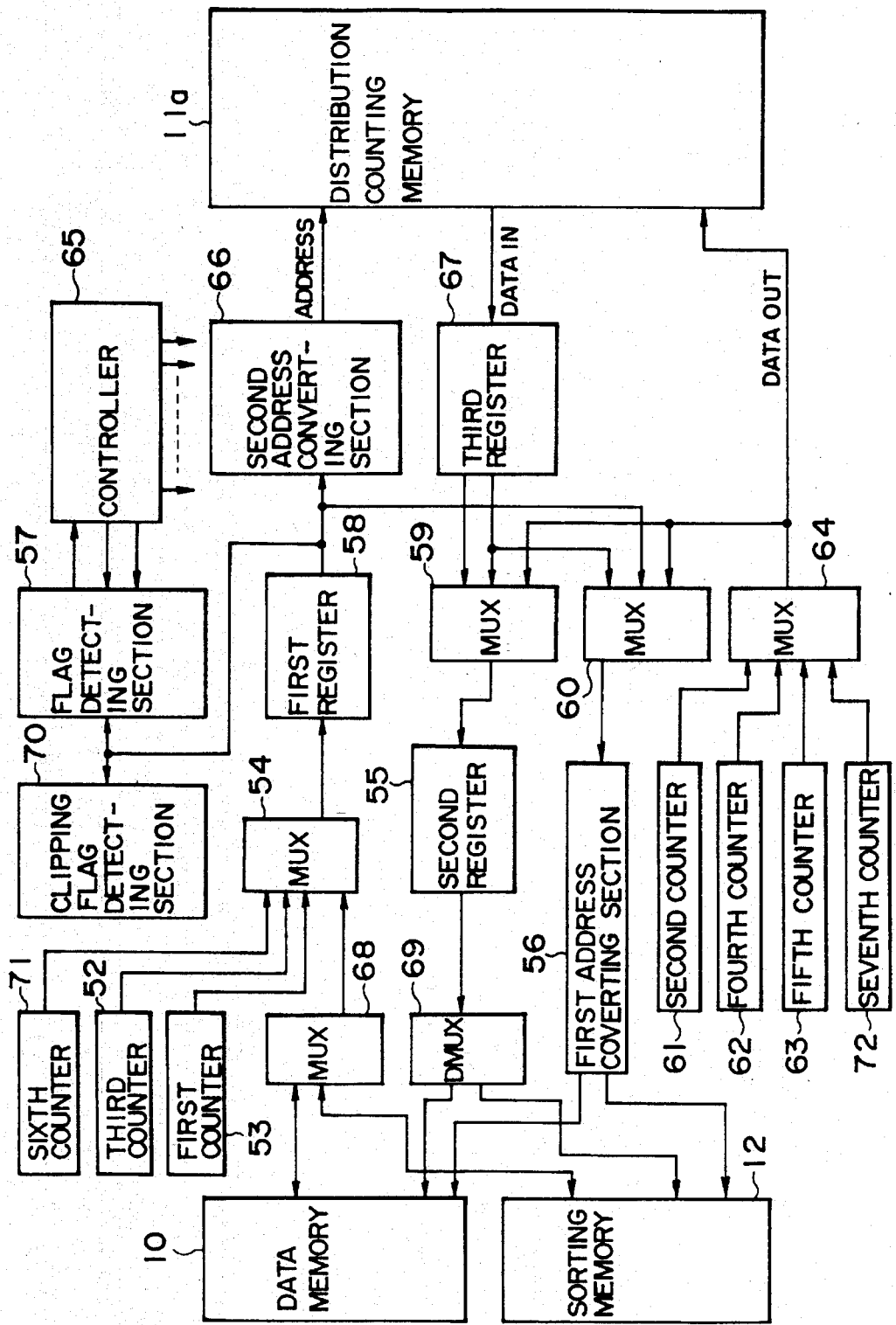
FIG. 54 is a block diagram showing an example of a concrete construction of the sorter in the second embodiment of the present invention.

FIG. 54 is a block diagram showing a concrete example of the sorter or the sorting processor in accordance with this second embodiment of the present invention.

In FIG. 54, a third counter 52 gets access to a flag 2 and a low memory region of a distribution counting memory 11a. A first counter 53 gets access to a flag 1 and a high memory region of the distribution counting memory 11a. A sixth counter 71 gets access to a flag 3 and a middle memory region of the distribution counting memory 11a. A multiplexer 54 selects predetermined data from input data inputted from the first and third counters 53 and 52 and a data memory 10a through a multiplexer 68. The selected data are transmitted from the multiplexer 54 to a first register 58.

A third register 67 receives data read out of the high, middle and low memory regions of the distribution counting memory 11a. These data of the third register 67 are transferred to a multiplexer 59. This multiplexer 59 receives an output of a second address converting section 66. Outputs of second, fourth and fifth counters 61, 62 and 63 are selected by a multiplexer 64 and are transmitted to the multiplexer 59. The multiplexer 59 selects predetermined data from the inputted data and transmits the selected data to a second register 55.

The selected data transmitted to the second register 55 are transferred to predetermined regions of the data memory 10a and a sorting memory 12a through a demultiplexer 69.

A first address converting section 56 outputs upper, middle and lower addresses in the high, middle and low memory regions of the data memory 10a and the sorting memory 12a based on data transmitted from a multiplexer 60.

A structure of the first address converting section 56 is similar to that in the above first embodiment. Namely, as shown in FIG. 18, this first address converting section 56 has registers 71, 73, 74, 75 and a multiplexer 72. The first address converting section 56 outputs the data transmitted from the multiplexer 60 as a lower address. An address value about a Z-value is transmitted to the register 73 by the control operation of a controller 65. An address value of a next pointer is transmitted to the register 74 by the control operation of the controller 65. A sorting address value is transmitted to the register 75 by the control operation of the controller 65. The address value about a Z-value, the address value of a next pointer and the sorting address value are selected and outputted by the multiplexer 72 as an upper address.

The second address converting section 66 outputs upper, middle and lower addresses in the high, middle and low memory regions of the distribution counting memory 11a based on data transmitted from the first register 58.

Similar to the above first embodiment, as shown in FIG. 19, the second address converting section 66 has registers 80, 82, 83 and a multiplexer 81. The second address converting section 66 outputs the data transmitted from the first register 58 as a lower address. Data values about the distribution counting start and end regions are respectively transmitted to the registers 82 and 83 by the control operation of the controller 65. These data values are selected and outputted by the multiplexer 81 as an upper address. The second address converting section 66 designates the high, middle and low memory regions and switches addresses in the distribution counting start and end regions in a state in which the data transferred from the first register 58 are set as a lower address of the distribution counting memory 11a.

A flag detecting section 57 detects whether or not the distribution counting memory 11a has a flag based on an output of the first register 58.

Figure 55:
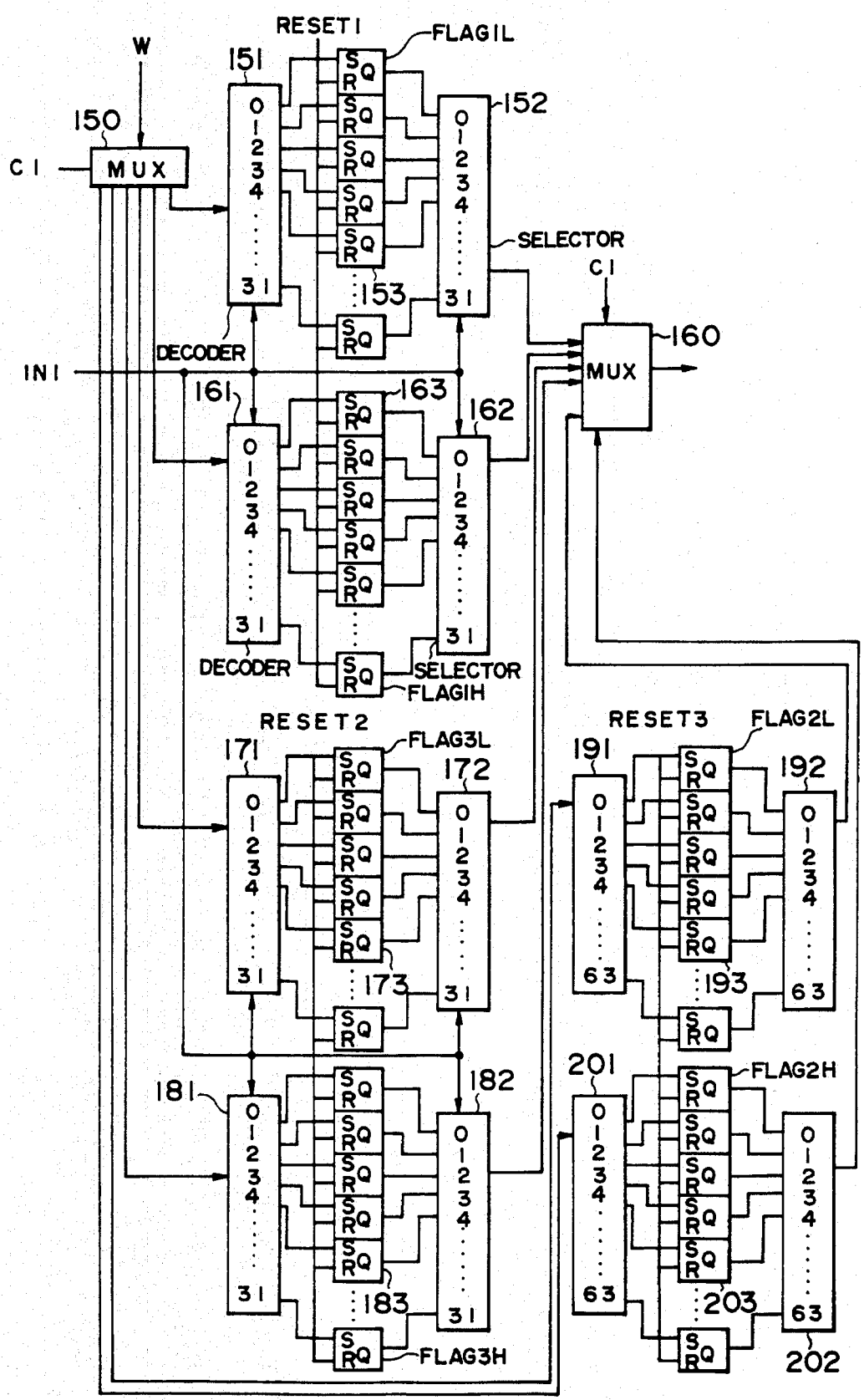
FIG. 55 is a circuit diagram showing the concrete construction of a flag detecting section shown in FIG. 54.

As shown in FIG. 55, the flag detecting section 57 has four groups of flip-flop circuits 153, 163, 173 and 183 having values 0 to 31 and two groups of flip-flop circuits 193 and 203 having values 0 to 63. The flip-flop circuit group 153 corresponds to a flag 1L of the distribution counting memory 11a with respect to the high memory region. The flip-flop circuit group 173 corresponds to a flag 3L of the distribution counting memory 11a with respect to the middle memory region. The flip-flop circuit group 193 corresponds to a flag 2L of the distribution counting memory 11a with respect to the low memory region. These flip-flop circuit groups 153, 173 and 193 show whether the distribution counting memory 11a has values 0 to 31 or values 0 to 63. Namely, an output C1 of the controller 65 is transmitted to a decoder 151, 171 or 191 through a multiplexer 150 and is decoded by the decoder 151, 171 or 191. The output of a flip-flop circuit is selected by a selector 152, 172 or 192 in accordance with a setting state of the flip-flop circuit group 153, 173 or 193 respectively provided by an output of the decoder 151, 171 or 191. The selected output is transmitted to a multiplexer 160.

The flip-flop circuit group 163 corresponds to a flag 1H of the distribution counting memory 11a. The flip-flop circuit group 183 corresponds to a flag 2H of the distribution counting memory 11a. The flip-flop circuit group 203 corresponds to a flag 3H of the distribution counting memory 11a. The flip-flop circuit groups 163, 183 and 203 show whether there is one or plural address values. Namely, the output C1 of the controller 65 is transmitted to a decoder 161, 181 or 201 through the multiplexer 150 and is decoded by the decoder 161, 181 or 201. The output of a flip-flop circuit is selected by a selector 162, 182 or 202 in accordance with a setting state of the flip-flop circuit group 163, 183 or 203 provided by the decoded output. The selected output is transmitted to the multiplexer 160.

The high memory region is selected by the output signal C1 of the controller 65. The above flip-flop circuit is selected by a stored value of the third register 67 and is set by a write signal of the controller 65.

The second counter 61 gets access to a Z-value region in the high memory region of the data memory 10a and sorting address regions of the sorting memory 12a.

The fourth counter 62 gets access to a sorting address region in the high memory region of the sorting memory 12a.

The fifth counter 63 gets access to a sorting address region in the low memory region of the sorting memory 12a.

The fifth counter 72 gets access to a sorting address region in the middle memory region of the sorting memory 12a.

Figure 56:
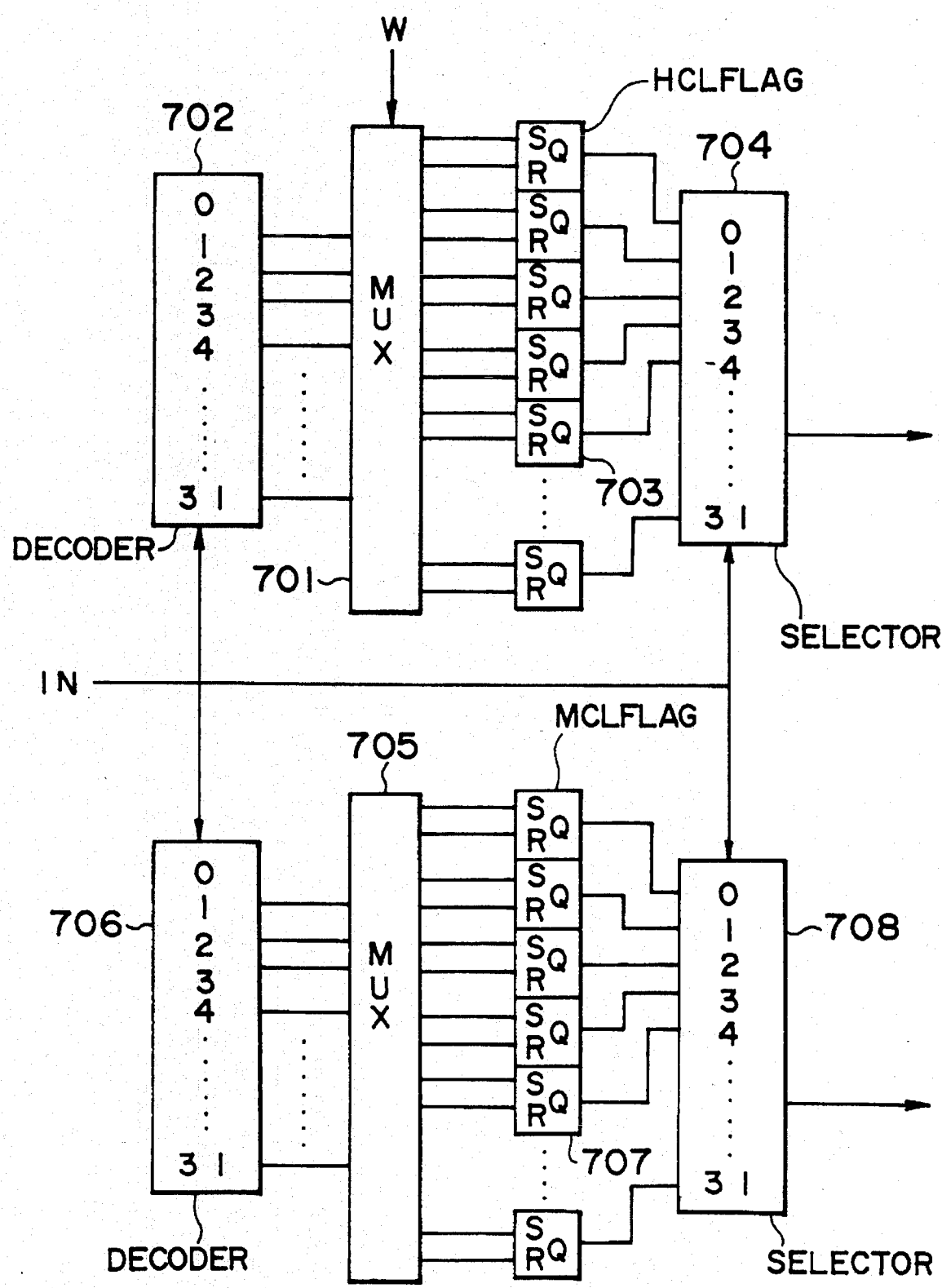
FIG. 56 is a circuit diagram showing the concrete construction of a clipping flag detecting section shown in FIG. 54.

As shown in FIGS. 56, a clipping flag detecting section 70 has a flip-flop circuit group 703 having values 0 to 31. A flag HCL is set in a flip-flop circuit and corresponds to the distribution counting memory 11a with respect to the high memory region. When the flip-flop circuit shows value "1", no sorting processing is required in a memory region corresponding to this value "1". Accordingly, the operation of the sorter is controlled such that no sorting processing is performed at an address having this value "1" in the middle memory region. A flag MCL corresponds to the distribution counting memory 11a with respect to the middle memory region. When the flip-flop circuit shows value "1", no sorting processing is required in a memory region corresponding to this value "1". Accordingly, the operation of the sorter is controlled such that no sorting processing is performed at an address having this value "1" in the low memory region. Namely, inputted data are decoded by a decoder 702 and the output of a corresponding flip-flop circuit in the flip-flop circuit group 703 is outputted from a selector 704. If the output of the flip-flop circuit shows value "1", no sorting processing is required in a memory region corresponding to this value "1". Accordingly, the operation of the sorter is controlled such that no sorting processing is performed at an address having this value "1" in the low memory region.

As mentioned above, in accordance with the present invention, reference value data are divided into two or more data to perform sorting processing. Namely, a distribution counting sorting operation is performed with respect to the reference value data on an upper position side. The distribution sorting operation is performed from a smaller address of the reference value data with respect to only the reference value data on a lower position side in a data group having the same reference value. Sorted data are sequentially written to addresses of a sorting memory. Thus, the sorting operation can be performed at a high speed with respect to data having a long bit length.

Further, in the present invention, the sorter can be constructed such that the sorting operation about the reference value data of lower digits is omitted with respect to the reference value data of upper digits at addresses corresponding to a clipping operation after the reference value data on the upper position side are completely sorted. Accordingly, three-dimensional clipping and picking operations for removing polygons having arbitrary reference value data can be performed without excessively transferring the reference value data. Accordingly, the three-dimensional clipping and picking operations can be performed at high speeds. In this case, the reference value data are sorted by dividing them into upper and lower digits.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sorter for sorting a plurality of inputted reference value data constructed by plural digits, said sorter comprising:

data number generating means for generating a data number corresponding to each of the inputted reference value data;

reference value data memory regions of plural digits for dividing the inputted reference value data into two or more data groups, and storing the divided data to addresses corresponding to respective data numbers;

a counting start region having a first memory region corresponding to a designated data group addressed on the basis of the reference value data of each of the divided data groups;

the counting start region storing the data number generated from the data number generating means to the first memory region when each of the reference value data corresponding to the first memory region is first inputted;

a counting end region having a second memory region addressed on the basis of said reference value data;

the counting end region updating and storing the data number generated from the data number generating means to the second memory region every time said reference value data corresponding to the second memory region are inputted;

a pointer region for designating an address next to an address designated on the basis of the data number;

first control means for writing a new updated data number to the pointer region designated by the data number before update every time the data number of said counting end region is updated;

a sorting memory having sorting address regions corresponding to said divided data groups and storing sorted results;

second control means for chaining and writing data numbers written to the counting start region, the pointer region and the counting end region on an upper position side to the sorting memory after the data numbers are completely written to the counting start and end regions on the upper position side in accordance with the reference value data on the upper position side of said divided data groups; and third control means for chaining and writing data numbers written to the counting start region, the pointer region and the counting end region on a lower position side to the sorting memory after the reference value data on said upper position side are completely sorted and reference value data from a memory region for reference value data on the lower position side corresponding to the reference value data on said upper position side having the same reference value on the upper position side are completely written to the counting start and end regions on the lower position side, wherein said sorter further comprises flag setting means having a flag group corresponding to an address based on the reference value data on the upper position side;

the flag setting means sets a flag of said flag group at an address corresponding to a memory region for performing clipping or picking processing; and the third control means omits a sorting operation of the reference value data on the lower position side with respect to the reference value data on the upper position side at the address corresponding to the clipping processing after the reference value data on the upper position side are completely sorted.

2. A sorter as claimed in claim 1, wherein the sorter further comprises:

a first flag region corresponding to said counting start region; and a second flag region corresponding to said counting end region;

the first flag region is set when data are stored to the counting start region; and the second flag region is set when data are updated in the counting end region.

3. A sorter as claimed in claim 2, wherein the inputted reference value data are divided into two data groups of upper and lower digits.

4. A sorter as claimed in claim 2, wherein the inputted reference value data are divided into three data groups of upper, middle and lower digits.

5. A sorter as claimed in claim 1, wherein the inputted reference value data are divided into two data groups of upper and lower digits.

6. A sorter as claimed in claim 1, wherein the inputted reference value data are divided into three data groups of upper, middle and lower digits.

7. A sorter for sorting a plurality of inputted reference value data constructed by plural digits, said sorter comprising:

data number generating means for generating a data number corresponding to each of the inputted reference value data;

reference value data memory regions of upper and lower digits for dividing the inputted reference value data into data of upper and lower digits, and storing the divided data to addresses corresponding to respective data numbers;

an upper digit counting start region having a first memory region addressed on the basis of the reference value data of the upper digit;

the upper digit counting start region storing the data number generated from the data number generating means to the first memory region when the reference value data of the upper digit corresponding to the first memory region are first inputted;

an upper digit counting end region having a second memory region addressed on the basis of said reference value data;

the upper digit counting end region updating and storing the data number generated from the data number generating means to the second memory region every time the reference value data of the upper digit corresponding to the second memory region are inputted;

an upper digit pointer region for designating an address next to an address designated on the basis of the data number;

a lower digit counting start region having a third memory region addressed on the basis of the reference value data of the lower digit;

the lower digit counting start region storing the data number generated from the data number generating means to the third memory region when the reference value data of the lower digit corresponding to the third memory region are first inputted;

a lower digit counting end region having a fourth memory region addressed on the basis of said reference value data;

the lower digit counting end region updating and storing the data number generated from the data number generating means to the fourth memory region every time the reference value data of the lower digit corresponding to the fourth memory region are inputted;

a lower digit pointer region for designating an address next to an address designated on the basis of the data number;

first control means for writing a new updated data number to the upper or lower digit pointer region designated by the data number before update every time the data number in said upper or lower digit counting end region is updated;

a sorting memory having sorting address regions corresponding to the upper and lower digits and storing sorted results;

second control means for chaining and writing data numbers written to the upper digit counting start region, the upper digit pointer region and the upper digit counting end region to the sorting memory after the data numbers are completely written to the upper digit counting start and end regions in accordance with said reference value data of the upper digit; and third control means for chaining and writing data numbers written to the lower digit counting start region, the lower digit pointer region and the lower digit counting end region to the sorting memory after said reference value data of the upper digit are completely sorted and reference value data from a memory region for reference value data of the lower digit corresponding to the reference value data of the upper digit having the same reference value of the upper digit are completely written to the lower digit counting start and end regions.

8. A sorter as claimed in claim 7, wherein the sorter further comprises:

a first flag region corresponding to each of the upper and lower digit counting start regions; and a second flag region corresponding to each of the upper and lower digit counting end regions;

the first flag region is set when data are stored to the counting start regions; and the second flag reel on is set when data are updated in the counting end regions.

9. A sorter as claimed in claim 7, wherein said sorter further comprises flag setting means having a flag group corresponding to an address based on the reference value data of the upper digit;

the flag setting means sets a flag of said flag group at an address corresponding to a memory region for performing clipping or picking processing; and the third control means omits a sorting operation of the reference value data of the lower digit with respect to the reference value data of the upper digit at the address corresponding to the clipping processing after the reference value data of the upper digit are completely sorted.

10. A sorter as claimed in claim 8, wherein said sorter further comprises flag setting means having a flag group corresponding to an address based on the reference value data of the upper digit;

the flag setting means sets a flag of said flag group at an address corresponding to a memory region for performing clipping or picking processing; and the third control means omits a sorting operation of the reference value data of the lower digit with respect to the reference value data of the upper digit at the address corresponding to the clipping processing after the reference value data of the upper digit are completely sorted.

11. A sorter for sorting a plurality of inputted reference value data constructed by plural digits, said sorter comprising:

data number generating means for generating a data number corresponding to each of the inputted reference value data;

reference value data memory regions of plural digits for dividing the inputted reference value data into two or more data groups, and storing the divided data to addresses corresponding to respective data numbers;

a counting start region having a first memory region corresponding to a designated data group addressed on the basis of the reference value data of each of the divided data groups;

the counting start region storing the data number generated from the data number generating means to the first memory region when each of the reference value data corresponding to the first memory region is first inputted;

a counting end region having a second memory region addressed on the basis of said reference value data;

the counting end region updating and storing the data number generated from the data number generating means to the second memory region every time said reference value data corresponding to the second memory region are inputted;

a pointer region for designating an address next to an address designated on the basis of the data number;

first control means for writing a new updated data number to the pointer region designated by the data number before update every time the data number of said counting end region is updated;

a sorting memory having sorting address regions corresponding to said divided data groups and storing sorted results;

second control means for chaining and writing data numbers written to the counting start region, the pointer region and the counting end region on an upper position side to the sorting memory after the data numbers are completely written to the counting start and end region on the upper position side in accordance with the reference value data on the upper position side of said divided data groups;

third control means for chaining and writing data numbers written to the counting start region, the pointer region and the counting end region on a lower position side to the sorting memory after the reference value data on said upper position side are completely sorted and reference value data from a memory region for reference value data on the lower position side corresponding to the reference value data on said upper position side having the same reference value on the upper position side are completely written to the counting start and end regions on the lower position side;

a first flag region corresponding to said counting start region; and a second flag region corresponding to said counting end region;

the first flag region is set when data are stored to the counting start region; and the second flag region is set when data are updated in the counting end region, wherein said sorter further comprises flag setting means having a flag group corresponding to an address based on the reference value data on the upper position side;

the flag setting means sets a flag of said flag group at an address corresponding to a memory region for performing clipping or picking processing; and the third control means omits a sorting operation of the reference value data on the lower position side with respect to the reference value data on the upper position side at the address corresponding to the clipping processing after the reference value data on the upper position side are completerly sorted.

12. A sorter as claimed in claim 11, wherein the inputted reference value data are divided into two data groups of upper and lower digits.

13. A sorter as claimed in claim 11, wherein the inputted reference value data are divided into three data groups of upper, middle and lower digits.

* * * * *